United States Patent
Hayashi et al.

(10) Patent No.: US 9,898,807 B2
(45) Date of Patent: Feb. 20, 2018

(54) IMAGE PROCESSING DEVICE, IMAGING DEVICE, IMAGE PROCESSING METHOD, AND PROGRAM

(71) Applicant: FUJIFILM Corporation, Tokyo (JP)

(72) Inventors: Kenkichi Hayashi, Saitama (JP); Masahiko Sugimoto, Saitama (JP); Yousuke Naruse, Saitama (JP); Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 15/255,560

(22) Filed: Sep. 2, 2016

(65) Prior Publication Data

US 2016/0371821 A1 Dec. 22, 2016

Related U.S. Application Data

(63) Continuation of application No. PCT/JP2015/054165, filed on Feb. 16, 2015.

(30) Foreign Application Priority Data

Mar. 28, 2014 (JP) ................................ 2014-070122

(51) Int. Cl.
*G06K 9/00* (2006.01)
*G06T 5/00* (2006.01)
(Continued)

(52) U.S. Cl.
CPC .............. *G06T 5/003* (2013.01); *G06T 5/009* (2013.01); *G06T 5/40* (2013.01); *H04N 1/4092* (2013.01);
(Continued)

(58) Field of Classification Search
CPC combination set(s) only.
See application file for complete search history.

(56) References Cited

U.S. PATENT DOCUMENTS 6,603,878 B1 * 8/2003 Takemoto ............... G06T 5/004
358/520
6,975,778 B1 * 12/2005 Loce ....................... H04N 1/409
101/485

(Continued)

FOREIGN PATENT DOCUMENTS

JP 2006-129236 A 5/2006
JP 2006-333061 A 12/2006

(Continued)

OTHER PUBLICATIONS

English Translation of International Preliminary Report on Patentability (including PCT/IB/373 and PCT/ISA/237) for PCT/JP2015/054165, dated Oct. 4, 2016.

(Continued)

*Primary Examiner* — Alex Liew
(74) *Attorney, Agent, or Firm* — Birch, Stewart, Kolasch & Birch, LLP

(57) ABSTRACT

The image processing device includes a gradation correction unit (gamma correction processing unit 33) which performs gradation correction, a restoration processing unit, a sharpening processing unit, a sharpening and recovery control unit 37 which is able to adjust a restoration rate of restoration processing and a sharpening rate of sharpening processing by controlling the restoration processing unit and the sharpening processing unit, a sharpening and recovery control unit 37 which acquires a total sharpening and restoration rate based on the restoration rate and the sharpening rate and one rate of the restoration rate and the sharpening rate and calculates the other rate of the restoration rate and the sharpening rate based on the total sharpening and restoration rate, and a brightness information acquisition unit. The sharpening and recovery control unit adjusts the restoration rate and the sharpening rate according to acquired brightness information.

20 Claims, 34 Drawing Sheets

(51) Int. Cl.
*H04N 1/409* (2006.01)
*H04N 5/357* (2011.01)
*H04N 9/04* (2006.01)
*H04N 5/208* (2006.01)
*H04N 9/69* (2006.01)
*G06T 5/40* (2006.01)

(52) U.S. Cl.
CPC ........... *H04N 5/208* (2013.01); *H04N 5/3572* (2013.01); *H04N 9/045* (2013.01); *H04N 9/69* (2013.01); *G06T 2207/10004* (2013.01); *G06T 2207/20192* (2013.01)

(56) References Cited

U.S. PATENT DOCUMENTS

| | | | |
|---|---|---|---|
| 2003/0184663 A1* | 10/2003 | Nakano | H04N 1/4092 348/241 |
| 2006/0093233 A1 | 5/2006 | Kano et al. | |
| 2006/0291841 A1 | 12/2006 | Fukumoto et al. | |
| 2010/0310165 A1* | 12/2010 | Chen | G06T 5/003 382/167 |
| 2012/0320240 A1 | 12/2012 | Kano | |
| 2017/0024863 A1* | 1/2017 | Sugimoto | G06T 5/003 |

FOREIGN PATENT DOCUMENTS

| | | |
|---|---|---|
| JP | 2011-59813 A | 3/2011 |
| JP | 2012-49759 A | 3/2012 |
| JP | 2013-20610 A | 1/2013 |

OTHER PUBLICATIONS

International Search Report for PCT/JP2015/054165 (PCT/ISA/210) dated May 19, 2015.
Written Opinion of the International Searching Authority for PCT/JP2015/054165 (PCT/ISA/237) dated May 19, 2015.

\* cited by examiner

FIG. 11

| | BEFORE/AFTER GRADATION CORRECTION | | COLOR DATA/BRIGHTNESS DATA | |
|---|---|---|---|---|
| | ANTILOGARITHM (BEFORE GRADATION CORRECTION) | LOGARITHM (AFTER GRADATION CORRECTION) | COLOR DATA (RGB) | BRIGHTNESS DATA (Y) |
| RESTORABILITY IN IDEAL SYSTEM | A | B | A | B |
| BRIGHTNESS SYSTEM TOUGHNESS IN SYSTEM DEVIATED FROM IDEAL SYSTEM (RINGING DEGREE OR THE LIKE) | B | A | — | — |
| COLOR SYSTEM CORRECTION ABILITY | — | — | A | — |
| COLOR SYSTEM TOUGHNESS IN SYSTEM DEVIATED FROM IDEAL SYSTEM (COLORING DEGREE, BLURRING DEGREE, OR THE LIKE) | — | — | B CONSPICUOUS | AS CURRENT SITUATION |
| PROCESSING SCALE | B 2-BYTE SYSTEM | A 8bit | B 3ch | A 1ch |

SCENERY IMAGING MODE

PORTRAIT IMAGING MODE

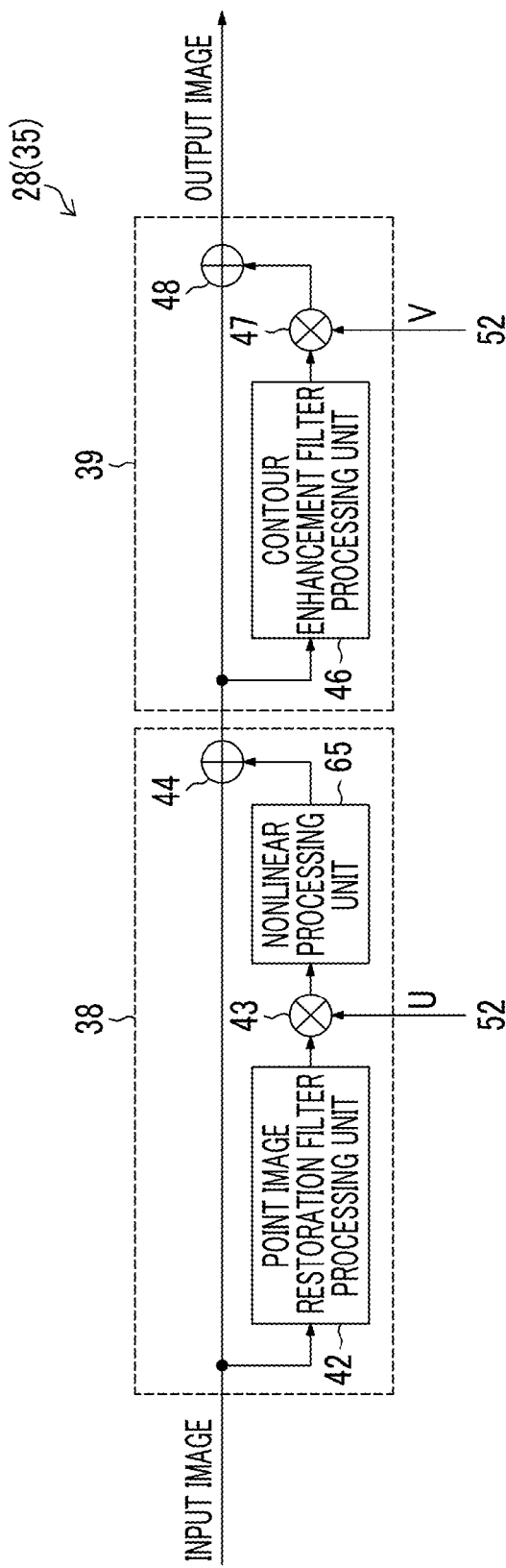

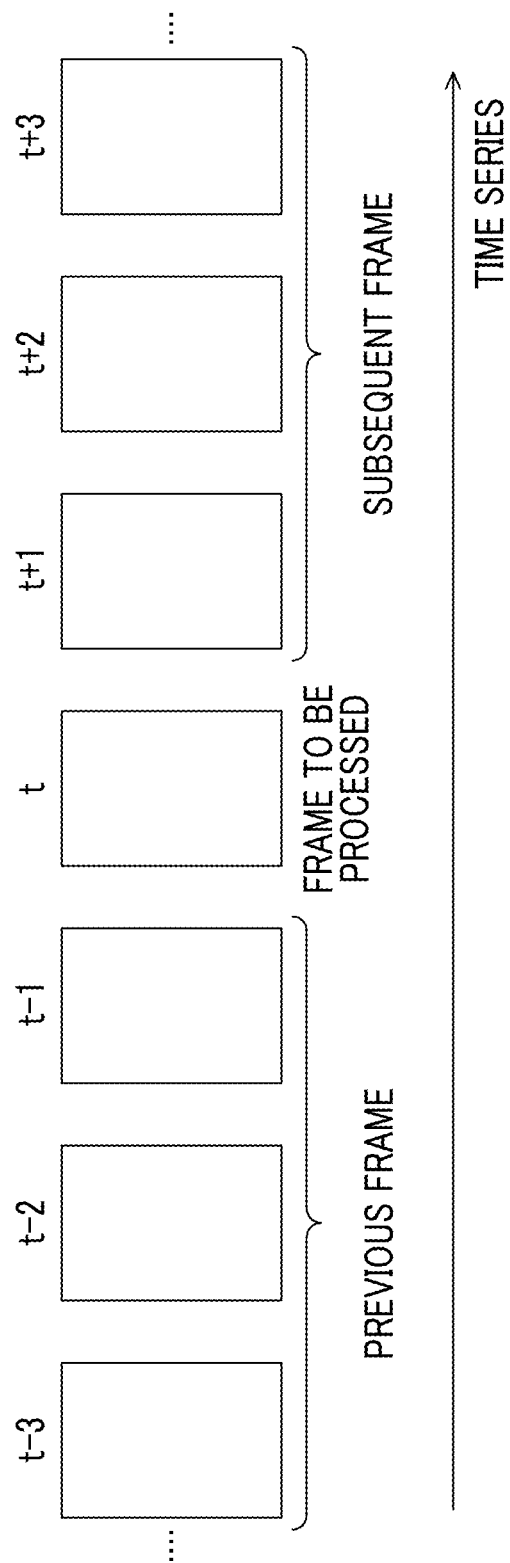

FIG. 31

| FRAME | DIAPHRAGM VALUE (F VALUE) | |
|---|---|---|
| FRAME (t-3) | F2 | → RESTORATION PROCESSING (FILTER FOR F2) |
| FRAME (t-2) | F2 | → RESTORATION PROCESSING (FILTER FOR F2) |
| FRAME (t-1) | F2 | → RESTORATION PROCESSING (FILTER FOR F2) |
| FRAME ( t ) | F2.8 | |
| FRAME (t+1) | F2 | |
| FRAME (t+2) | F2 | |
| FRAME (t+3) | F2 | |

FIG. 32

| FRAME | DIAPHRAGM VALUE (F VALUE) | |
|---|---|---|
| FRAME (t-3) | F2 | |
| FRAME (t-2) | F2 | |
| FRAME (t-1) | F2 | |
| FRAME ( t ) | F2.8 | → RESTORATION PROCESSING (FILTER FOR F2) |
| FRAME (t+1) | F1.4 | |
| FRAME (t+2) | F1.4 | → RESTORATION PROCESSING (FILTER FOR F1.4) |
| FRAME (t+3) | F1.4 | |

IMAGE PROCESSING DEVICE, IMAGING DEVICE, IMAGE PROCESSING METHOD, AND PROGRAM

CROSS-REFERENCE TO RELATED APPLICATIONS

This application is a Continuation of PCT International Application No. PCT/JP2015/054165 filed on Feb. 16, 2015, which claims priority under 35 U.S.C § 119(a) to Patent Application No. 2014-070122 filed in Japan on Mar. 28, 2014, all of which are hereby expressly incorporated by reference into the present application.

BACKGROUND OF THE INVENTION

1. Field of the Invention

The present invention relates to an image processing device, an imaging device, an image processing method, and non-transitory computer readable recording medium storing a program regarding restoration processing based on a point spread function.

2. Description of the Related Art

In an object image captured through an optical system, a so-called point spread phenomenon in which a point object has minute spread due to the influence of diffraction, aberration, or the like caused by the optical system may be observed. A function representing a response to a point light source of an optical system is called a point spread function (PSF), and is known as a parameter responsible for resolution deterioration (blurring) of a captured image.

The captured image deteriorated in image quality due to the point spread phenomenon can be recovered in image quality through point image restoration processing based on the PSF. The point image restoration processing is processing in which a deterioration characteristic (point image characteristic) caused by aberration or the like of a lens (optical system) is determined in advance, and point spread of the captured image is cancelled or reduced through image processing using a restoration filter (recovery filter) according to the point image characteristic.

Various methods for the point image restoration processing have been suggested, and for example, JP2011-059813A discloses an image processing device which performs image recovery for an image subjected to nonlinear correction using blind deconvolution. This image processing device comprises a correction unit which performs correction for reducing nonlinear gradation correction for a captured image subjected to nonlinear gradation correction, and an image recovery unit which performs image recovery by applying blind deconvolution to the captured image with reduced gradation correction.

JP2013-020610A discloses an image processing device which reduces over-recovery of image data by image recovery processing. In this image processing device, image recovery processing is performed for color image data in an RGB format before gamma processing, the difference between amplification and attenuation of a pixel signal value by gamma correction is absorbed, and a limit value of a variation is calculated such that the maximum value of the variation of the pixel signal value becomes constant even after gamma correction. With this, the technical problems in that "a situation in which a deterioration state of image data actually obtained does not match a deterioration state of image data to be recovered by an image recovery filter occurs due to a saturated pixel", and "image quality deterioration, such as undershoot or overshoot, occurs in an edge portion, and in particular, undershoot in a low brightness portion is amplified by gamma processing after image recovery processing" have been solved.

The point spread function of the optical system is used in a restoration technique of an image with an extended depth of focus, and JP2012-049759A discloses an imaging module which executes image restoration in a short period of time with excellent accuracy. In this imaging module, restoration processing is applied to a brightness signal after synchronization processing (demosaic processing), whereby it is not necessary to separately provide parameters of the restoration processing for RGB, and it is possible to accelerate the restoration processing. Furthermore, adjacent pixels are put together in a predetermined unit and the common restoration processing parameter is applied to this unit to perform a deconvolution processing, whereby the accuracy of the restoration processing is improved.

In addition to the point image restoration processing, image processing for improving image quality may be performed, and for example, the sharpness of an image can be improved by sharpening processing (contour enhancement processing, edge enhancement processing, sharpness enhancement processing).

As a specific processing method relating to the point image restoration processing and the sharpening processing described above, for example, JP2006-333061A discloses that "camera shake correction for performing edge enhancement processing after image restoration processing using an image restoration filter is performed" and "camera shake correction for merely performing edge enhancement processing" is performed. Furthermore, JP2006-129236A discloses that filters having different restoration intensities are selected according to edge intensity, thereby changing the intensity of the restoration filter itself according to edge intensity.

SUMMARY OF THE INVENTION

The above-described point image restoration processing is processing for restoring an image blurred due to the point spread phenomenon (optical characteristic) by the optical system, to an original sharp image, and is a technique for acquiring a recovered image with image quality deterioration eliminated by applying the restoration filter based on the point spread function to source image data with deteriorated image quality.

Accordingly, in order to obtain a recovered image in which an object image is faithfully reproduced, "the characteristic of the restoration filter" for use in the point image restoration processing needs to appropriately match "image quality deterioration of source image data".

That is, if image quality deterioration caused by an optical system is exactly understood, a restoration filter capable of strictly eliminating such image quality deterioration is designed, and image quality deterioration (point spread phenomenon) due to the optical system is accurately reflected in source image data, in principle, it is possible to obtain "a high-quality image in which an object image is faithfully reproduced" from "a captured image with deteriorated image quality".

However, "the characteristic of the restoration filter" may not appropriately match "image quality deterioration of source image data" depending on the characteristic of the object image or imaging equipment.

For example, source image data fluctuates in image quality depending on the imaging ability of the imaging element, and in a case where the object image is very bright, a pixel saturation phenomenon may occur in the imaging element. In a case where pixel saturation occurs, saturated pixel data (a saturated pixel value) is clipped or the like; thus, the obtained source image data does not always reproduce the object image faithfully.

In this way, source image data to be subjected to the restoration processing is affected by not only the deterioration characteristic resulting from the optical system but also the deterioration characteristic resulting from the imaging element, and in particular, in a case where the contrast of the object image is great, unexpected image quality deterioration may occur.

Accordingly, even if the characteristics of the optical system are sufficiently analyzed and a restoration filter capable of suppressing the influence of the point spread phenomenon is designed, "the characteristic of the restoration filter" may not appropriately match "image quality deterioration of source image data" depending on the object image.

If the restoration processing is performed under a condition that "the characteristic of the restoration filter" may not appropriately match "image quality deterioration of source image data", image quality deterioration is not sufficiently eliminated, and a high-quality recovered image is not obtained. In some cases, image quality deterioration is promoted, and ringing or the like is conspicuous in a recovered image.

The degree of image quality deterioration (ringing) occurring in the recovered image depends on various factors. For example, the image quality of the recovered image after the point image restoration processing fluctuates due to the characteristic of the restoration filter for use in the restoration processing, the data characteristic of source image data, to which the restoration processing is applied, or other kinds of image processing performed before and after the restoration processing. Accordingly, in order to more effectively prevent or reduce image quality deterioration in the recovered image, a restoration processing method integrally in consideration of various characteristics is required. In particular, in a case where various object images are captured, an image data characteristic to be subjected to the restoration processing is not constant, and various images, such as an image having great contrast as a whole or locally, a color-shifted image, and an image with some pixel values in a saturated state, will be subjected to the restoration processing. Therefore, a restoration processing method which is excellent in image toughness to flexibly cope with an image to be processed having various characteristics is required.

However, in JP2011-059813A, JP2013-020610A, and JP2012-049759A described above, there is no description of the above-described problems, and there is no suggestion relating to "an image processing method which integrally considers various factors in the processing before and after the restoration processing as well as the restoration processing itself in the restoration processing using the point spread function and is excellent in image toughness to flexibly cope with a source image having various characteristics".

If the point image restoration processing is performed in a state where the deviation of matching between "the characteristic of the restoration filter" and "image quality deterioration of source image data" is great, image quality degradation, such as overcorrection, may occur. In contrast, the inventors have suggested that image toughness is improved by subjecting image data subjected to gradation correction, such as gamma correction, to point image restoration processing (Japanese Patent Application Nos. 2013-069688 and 2013-069687). However, image quality deterioration due to overcorrection or the like may be caused according to the object or imaging scene.

The gradation correction, such as gamma correction, is processing for changing the characteristic of image data; thus, the deviation of matching between "image data after gamma correction" and "the point spread function of the optical system used for imaging" becomes comparatively great. In particular, on a high brightness side (highlight side) rather than a low brightness side, the deviation of matching between "image data after gamma correction" and "the point spread function of the optical system" is likely to become great. Accordingly, in a case where image data (imaging scene) inclines toward the high brightness side, on which image data is bright as a whole, the proportion of a high brightness region in the entire image increases, and the deviation of matching between "image data after gamma correction" and "the point spread function of the optical system" becomes great. For this reason, in a case where image data (imaging scene) inclines toward the high brightness side, on which image data is bright as a whole, "a region where image quality is deteriorated due to overcorrection by the point image restoration processing" is extended in the recovered image.

A method which prevents image deterioration by weakening the restoration intensity of the point image restoration processing for image data or a region of image data undergoing image quality deterioration due to the point image restoration processing is known. Furthermore, in an image processing system capable of switching between the on and off states of the point image restoration processing, it is also possible to prevent image quality deterioration by bringing the point image restoration processing into the off state. However, in this case, if the restoration intensity of the point image restoration processing is merely weakened or the point image restoration processing is brought into the off state, sharpness varies between images, thereby giving a user a sense of discomfort.

There has not been hitherto an effective proposal to prevent variation in image quality sharpness between images subjected to the point image restoration processing having different restoration intensities or divergence in image quality sharpness between "an image for which point image restoration processing is on" and "an image for which point image restoration processing is off". For example, JP2006-333061A and JP2006-129236A do not disclose or suggest that the unification of image sharpness is achieved by integrally adjusting the restoration intensity and the degree of sharpness between the point image restoration processing and the sharpening processing.

The invention has been accomplished in consideration of such a situation, and an object of the invention is to provide an image processing device, an imaging device, an image processing method, and non-transitory computer readable recording medium storing a program capable of enabling restoration processing based on a point spread function with excellent accuracy while suppressing "image quality deterioration due to brightness of an object image" or "image quality deterioration due to imaging conditions responsible for brightness of a captured image", and stably improving image quality even if there is a high brightness region or a low brightness region in an object without excessively changing image sharpness.

An aspect of the invention relates to an image processing device which subjects source image data acquired by capturing an object image using an optical system to restoration processing using a restoration filter based on a point spread function of the optical system to acquire recovered image data. The image processing device comprises a gradation correction unit which subjects the source image data to gradation correction by logarithmic processing, a restoration processing unit which performs the restoration processing by applying the restoration filter having a filter coefficient corresponding to source image data before the logarithmic processing to the source image data subjected to the gradation correction, a sharpening processing unit which subjects the source image data subjected to the gradation correction to sharpening processing using a sharpening filter, a sharpening and recovery control unit which is able to adjust a restoration rate of the restoration processing and a sharpening rate of the sharpening processing by controlling the restoration processing unit and the sharpening processing unit, acquires a total sharpening and restoration rate based on the restoration rate and the sharpening rate and one rate of the restoration rate and the sharpening rate, and calculates the other rate of the restoration rate and the sharpening rate based on the total sharpening and restoration rate, and a brightness information acquisition unit which acquires brightness information of a source image based on the source image data. The sharpening and recovery control unit adjusts the restoration rate and the sharpening rate according to the acquired brightness information.

According to this aspect, it is possible to perform restoration processing control according to the brightness information of the source image data. In particular, since the restoration processing control reflecting the characteristic of the brightness information is performed, it is possible to perform the restoration processing based on the point spread function with excellent accuracy while effectively suppressing image quality deterioration (overcorrection or the like) due to brightness of the object image.

The "logarithmic processing" used herein is processing for converting data expressed by antilogarithm to data expressed by logarithm, and in this application, further includes, for example, gamma correction processing or the like which is performed for image data. That is, the "logarithmic processing" also indicates that image data is converted to image data expressed by logarithm and the gamma correction processing as one of gradation processing is performed for image data. Furthermore, "the filter coefficient corresponding to image data before the logarithmic processing" is a filter coefficient which is derived based on image data before the logarithmic processing, such as the gamma correction processing, and corresponds to image data expressed by antilogarithm.

According to this aspect, since the restoration rate and the sharpening rate are determined based on the total sharpening and restoration rate, the sharpening rate is adjusted according to an increase or a decrease of the restoration rate, or the restoration rate is adjusted according to an increase or a decrease of the sharpening rate. Therefore, it is possible to stably improve image quality of image data without excessively changing the restoration intensity by the restoration processing and the sharpness intensity by the sharpening processing.

"The restoration filter based on the point spread function" is a restoration filter based on an inverse filter, a Wiener filter, or the like generated using the point spread function (PSF) of the optical system, and the "restoration processing" includes processing which applies such a restoration filter to image data. The "point spread function" is a function which represents a response to the point light source of the optical system, and can be expressed based on the PSF and an OTF (modulation transfer function (MTF), phase transfer function (PTF)).

For the "sharpening filter", filters other than "the filter (restoration filter) generated using the inverse filter or the Wiener filter from the point spread function (PSF) of the optical system" are available. Accordingly, as the "sharpening filter", for example, a filter not based on the point spread function of the optical system can be suitably used, and a filter which is calculated based on other elements (parameters) other than the point spread function may be used as the "sharpening filter". As the sharpening filter not based on the point spread function, a filter in which point spread functions are switchable according to different F number or the like may be used as the sharpening filter insofar as a filter is created not based on the point spread function. Similarly, a filter in which point spread functions are switchable according to different image heights may be used as the sharpening filter. The intensity (gain) of the sharpening filter in the sharpening processing may be changed according to the F number or the image height among the color components of image data.

The "sharpening processing" is processing for compensating for or enhancing a high-frequency component of image data, and is processing for enhancing a contour component of an image. Accordingly, the "sharpening processing" used herein can include processing, for example, called contour enhancement processing, edge enhancement processing, or sharpness enhancement processing.

The restoration filter and the sharpening filter can be constituted as a finite impulse response (FIR) filter.

Preferably, the brightness information acquisition unit acquires brightness values of respective pixels constituting the source image and the distribution of the brightness values as the brightness information.

According to this aspect, the restoration rate of the restoration processing and the sharpening rate of the sharpening processing can be determined based on the distribution of the brightness values of the respective pixels constituting the source image and the distribution of the brightness values. With this, according to this aspect, it is possible to adjust the restoration intensity by the restoration processing and the degree of sharpness by the sharpening processing based on the brightness values, and to prevent image quality deterioration caused by the image processing.

The "brightness values" and "the distribution of the brightness values" are indexes which represent brightness of an image directly or indirectly. For example, the "brightness distribution" and the "brightness value" may be determined based on a "brightness signal component" in a case where image data is represented by a brightness signal and a color difference signal (YCbCr color space or the like) or a "brightness dimensional component" in a case where image data is represented by a brightness dimension and a color-opponent dimension (L*a*b*). Furthermore, the "brightness distribution" and the "brightness value" may be determined based on a color component which can become an indirect index of brightness of the image, and for example, the "brightness distribution" and the "brightness value" may be determined based on a color component which can most contribute to brightness of the image.

Preferably, the brightness information acquisition unit acquires information relating to a saturated pixel obtained from the acquired brightness values as the brightness information.

According to this aspect, the restoration rate of the restoration processing and the sharpening rate of the sharpening processing can be determined based on information of the saturated pixel obtained from the brightness values. With this, according to this aspect, it is possible to adjust the restoration intensity by the restoration processing and the degree of sharpness by the sharpening processing based on information of the saturated pixel, and to prevent image quality deterioration caused by the image processing.

Preferably, the sharpening and recovery control unit adjusts at least one of the restoration rate or the sharpening rate in the saturated pixel and pixels in the periphery of the saturated pixel according to the information relating to the saturated pixel obtained from the acquired brightness values.

According to this aspect, at least one of the restoration rate or the sharpening rate in the saturated pixel and the pixels in the periphery of the saturated pixel can be adjusted based on information of the saturated pixel obtained from the brightness values. With this, according to this aspect, it is possible to adjust the restoration intensity by the restoration processing and the degree of sharpness by the sharpening processing for the saturated pixel and the pixels in the periphery of the saturated pixel, and to prevent image quality deterioration caused by the image processing.

Preferably, the brightness information acquisition unit acquires the brightness values of pixels in the periphery of the saturated pixel as the brightness information.

According to this aspect, the restoration rate of the restoration processing and the sharpening rate of the sharpening processing can be determined based on the brightness values of the pixels in the periphery of the saturated pixel. With this, according to this aspect, it is possible to adjust the restoration intensity by the restoration processing and the degree of sharpness by the sharpening processing based on the brightness values of the pixels in the periphery of the saturated pixel, and to prevent image quality deterioration caused by the image processing.

Preferably, the sharpening and recovery control unit acquires individual difference information of the optical system and adjusts at least one of the restoration rate or the sharpening rate according to the acquired individual difference information and brightness information.

According to this aspect, the restoration rate of the restoration processing and the sharpening rate of the sharpening processing can be determined based on the individual difference information of the optical system and the brightness information. With this, according to this aspect, it is possible to adjust the restoration intensity by the restoration processing and the degree of sharpness by the sharpening processing based on the individual difference information and the brightness information, and to prevent image quality deterioration caused by the image processing. The "individual difference information" refers to information of each individual lens and information used for adjusting the restoration rate or the sharpening rate according to the individual difference of the lenses. Furthermore, the "individual difference information" includes information relating to an error which can occur individually in the optical system due to a manufacturing error or the like. The individual difference information may indicate the individual difference directly or indirectly, and for example, a lot number or a serial number allocated to the optical system may be used as individual difference information.

Preferably, the brightness information acquisition unit acquires imaging exposure information as the brightness information.

According to this aspect, the restoration rate of the restoration processing and the sharpening rate of the sharpening processing can be determined based on imaging exposure. With this, according to this aspect, it is possible to adjust the restoration intensity by the restoration processing and the degree of sharpness by the sharpening processing based on imaging exposure, and to prevent image quality deterioration caused by the image processing. The "imaging exposure information" used herein is information relating to the exposure when capturing the source image data. For example, the "imaging exposure information" may be the imaging exposure, and the imaging exposure is the exposure of the optical system when acquiring the source image data, and can fluctuate according to the imaging condition (F number and the shutter speed) when acquiring the source image data.

Preferably, the brightness information acquisition unit acquires a histogram of the brightness values of the respective pixels of the source image as the brightness information.

According to this aspect, the restoration rate of the restoration processing and the sharpening rate of the sharpening processing can be determined based on the histogram of the brightness values. With this, according to this aspect, it is possible to adjust the restoration intensity by the restoration processing and the degree of sharpness by the sharpening processing based on the histogram of the brightness values, and to prevent image quality deterioration caused by the image processing.

Preferably, the brightness information acquisition unit acquires a median value of the histogram as the brightness information.

According to this aspect, the restoration rate of the restoration processing and the sharpening rate of the sharpening processing can be determined based on the median value of the histogram. With this, according to this aspect, it is possible to adjust the restoration intensity by the restoration processing and the degree of sharpness by the sharpening processing based on the median value of the histogram, and to prevent image quality deterioration caused by the image processing.

Preferably, in a case where the source image data is data of one frame among a plurality of frames constituting a motion image, the image processing device further comprises an imaging condition acquisition unit which acquires imaging conditions of a frame corresponding to the source image data and a previous frame or a subsequent frame of the frame corresponding to the source image data in a time series, and the sharpening and recovery control unit adjusts at least one of the restoration rate or the sharpening rate according to the imaging conditions acquired by the imaging condition acquisition unit and the brightness information.

According to this aspect, at least one of the restoration rate or the sharpening rate is adjusted based on the imaging conditions and the brightness information of the previous frame or the subsequent frame of the frame corresponding to the source image data in a time series. With this, according to this aspect, it is possible to adjust the restoration intensity by the restoration processing and the degree of sharpness by the sharpening processing based on the imaging condition and the brightness information, and to prevent image quality deterioration caused by the image processing.

An imaging device according to another aspect of the invention comprises the above-described image processing device.

Still another aspect of the invention relates to an image processing method which subjects source image data acquired by capturing an object image using an optical system to restoration processing using a restoration filter based on a point spread function of the optical system to acquire recovered image data. The image processing method comprises a gradation correction step of subjecting the source image data to gradation correction by logarithmic processing, a restoration processing step of performing the restoration processing by applying the restoration filter having a filter coefficient corresponding to the source image data before the logarithmic processing to the source image data subjected to the gradation correction, a sharpening processing step of subjecting the source image data subjected to the gradation correction to sharpening processing using a sharpening filter, a sharpening and recovery control step of being able to adjust a restoration rate of the restoration processing and a sharpening rate of the sharpening processing by controlling the restoration processing step and the sharpening processing step, acquiring a total sharpening and restoration rate based on the restoration rate and the sharpening rate and one rate of the restoration rate and the sharpening rate, and calculating the other rate of the restoration rate and the sharpening rate based on the total sharpening and restoration rate, a brightness information acquisition step of acquiring brightness information of a source image based on the source image data. In the sharpening and recovery control step, the restoration rate and the sharpening rate are adjusted according to the acquired brightness information.

Still another aspect of the invention relates to non-transitory computer readable recording medium storing a program which causes a computer to subject source image data acquired by capturing an object image using an optical system to restoration processing using a restoration filter based on a point spread function of the optical system to acquire recovered image data. The program causes the computer to execute a gradation correction step of subjecting the source image data to gradation correction by logarithmic processing, a restoration processing step of performing the restoration processing by applying the restoration filter having a filter coefficient corresponding to the source image data before the logarithmic processing to the source image data subjected to the gradation correction, a sharpening processing step of subjecting the source image data subjected to the gradation correction to sharpening processing using a sharpening filter, a sharpening and recovery control step of being able to adjust a restoration rate of the restoration processing and a sharpening rate of the sharpening processing by controlling the restoration processing step and the sharpening processing step, acquiring a total sharpening and restoration rate based on the restoration rate and the sharpening rate and one rate of the restoration rate and the sharpening rate, and calculating the other rate of the restoration rate and the sharpening rate based on the total sharpening and restoration rate, and a brightness information acquisition step of acquiring brightness information of a source image based on the source image data. In the sharpening and recovery control step, the restoration rate and the sharpening rate are adjusted according to the acquired brightness information.

According to the invention, the restoration processing based on the point spread function is controlled based on the brightness information among the characteristics of the source image, and it is possible to perform the restoration processing with excellent accuracy while effectively suppressing image quality deterioration due to brightness of the object image. Furthermore, according to the invention, since the restoration rate and the sharpening rate are determined based on the total sharpening and restoration rate, it is possible to prevent the restoration rate and the sharpening rate of the image by the restoration processing and the sharpening processing from becoming excessively large or small.

BRIEF DESCRIPTION OF THE DRAWINGS

FIG. 11 is a diagram showing the correlation of the "gradation correction processing (gamma correction processing)" and "color data/brightness data" for the point image restoration processing.

FIG. 29 is a diagram showing the configuration of a processing block for performing point image restoration processing and sharpening processing according to a fourth embodiment.

FIG. 30 is a diagram showing an example a frame to be processed and a reference frame.

FIG. 31 is a diagram illustrating an example relating to adjustment of the content of restoration processing performed by a restoration adjustment unit.

FIG. 32 is a diagram illustrating an example relating to adjustment of the content of restoration processing performed by the restoration adjustment unit.

FIG. 37A shows a blurred image before restoration processing, and FIG. 37B shows an image (point image) with blur eliminated after restoration processing.

DESCRIPTION OF THE PREFERRED EMBODIMENTS

Hereinafter, a preferred embodiment of an imaging device and an imaging method according to the invention will be described referring to the accompanying drawings.

An embodiment of the invention will be described referring to the accompanying drawings. In the following embodiment, as an example, a case where the invention is applied to a digital camera (imaging device) which is connectable to a computer (personal computer (PC)) will be described.

Figure 1:
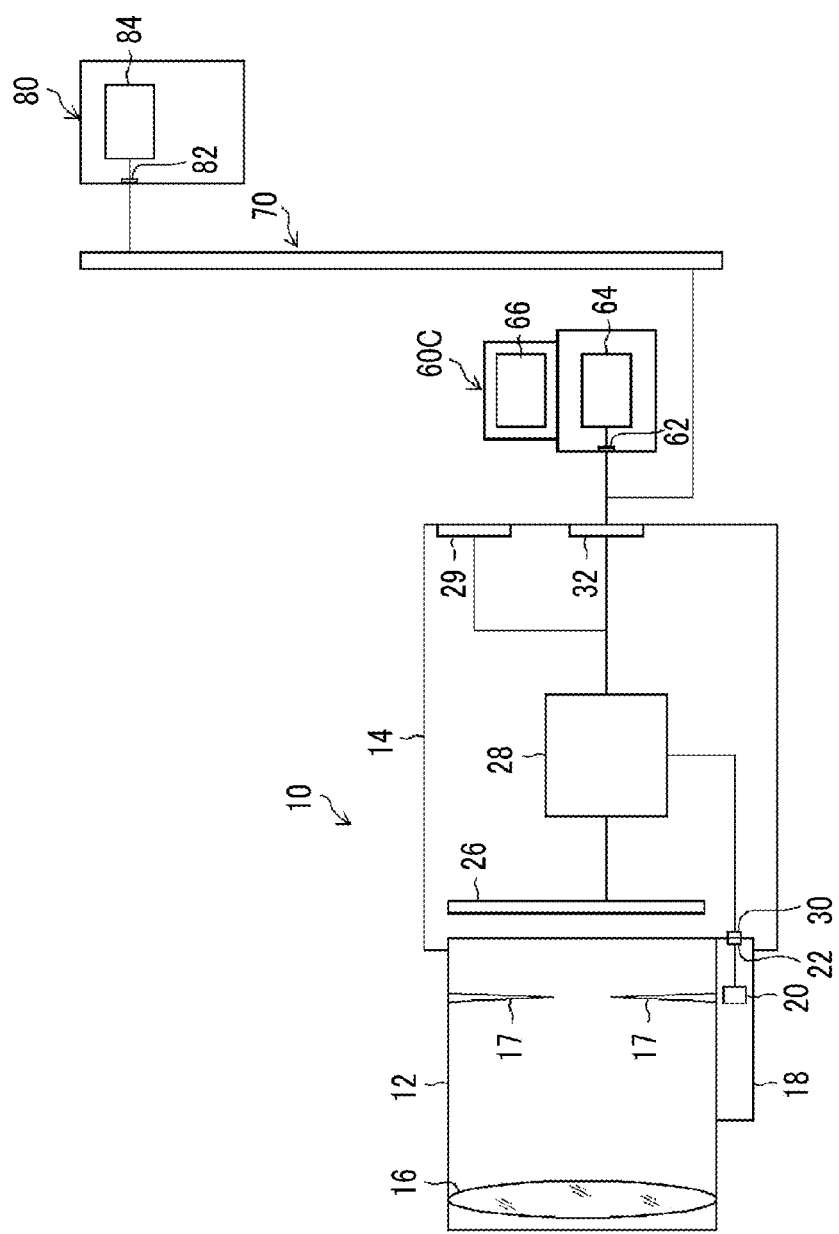
FIG. 1 is a block diagram showing a digital camera which is connected to a computer.

FIG. 1 is a block diagram showing a digital camera which is connected to a computer.

A digital camera 10 comprises an interchangeable lens unit 12, and a camera body 14 provided with an imaging element 26, and the lens unit 12 and the camera body 14 are electrically connected through a lens unit input/output unit 22 of the lens unit 12 and a camera body input/output unit 30 of the camera body 14.

The lens unit 12 is provided with an optical system, such as a lens 16 or a diaphragm 17, and an optical system operating unit 18 which controls the optical system. The optical system operating unit 18 includes a lens unit controller 20 which is connected to the lens unit input/output unit 22, and an actuator (not shown) which operates the optical system. The lens unit controller 20 controls the optical system through an actuator based on a control signal sent from the camera body 14 through the lens unit input/output unit 22, and performs, for example, focus control or zoom control by lens movement, diaphragm amount control of the diaphragm 17, and the like.

The imaging element 26 of the camera body 14 has a condensing microlens, a color filter of R (red), G (green), B (blue), or the like, and an image sensor (a photodiode: a complementary metal oxide semiconductor (CMOS), a charge coupled device (CCD), or the like). The imaging element 26 converts light of an object image emitted through the optical system (the lens 16, the diaphragm 17, or the like) of the lens unit 12 to an electrical signal, and sends an image signal (source image data) to the camera body controller 28.

The imaging element 26 of this example outputs source image data through imaging of the object image using the optical system, and source image data is transmitted to an image processing unit of the camera body controller 28.

Figure 2:
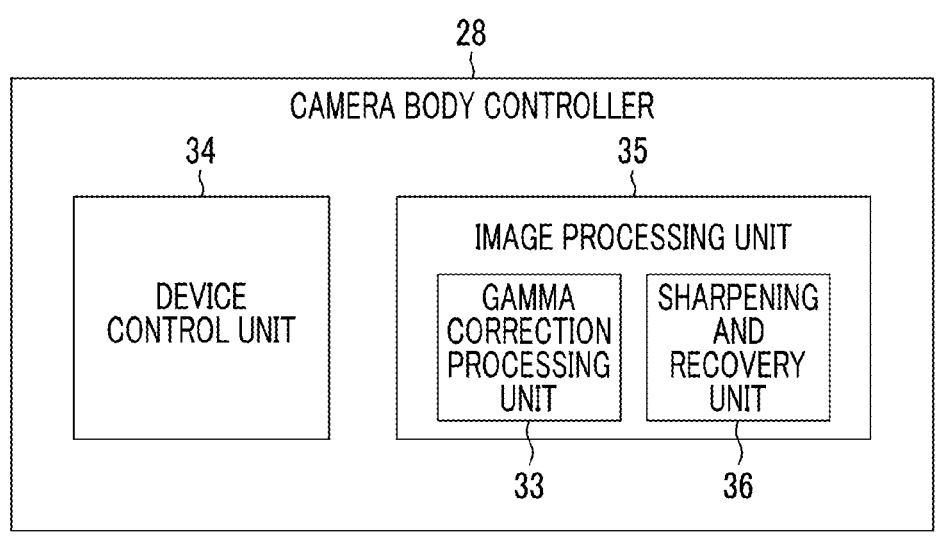
FIG. 2 is a block diagram showing a functional configuration example of a camera body controller.

As shown in FIG. 2, the camera body controller 28 has a device control unit 34 and an image processing unit (image processing device) 35, and integrally controls the camera body 14. For example, the device control unit 34 controls the output of the image signal (image data) from the imaging element 26, generates a control signal for controlling the lens unit 12 and transmits the control signal to the lens unit 12 (lens unit controller 20) through the camera body input/output unit 30, and transmits image data (RAW data, JPEG data, and the like) before and after image processing to external devices (a computer 60C and the like) connected through an input/output interface 32. The device control unit 34 appropriately controls various devices, such as a display unit (not shown) (an electronic view finder (EVF) or a rear liquid crystal display unit), in the digital camera 10.

The image processing unit 35 can subject an image signal from the imaging element 26 to arbitrary image processing as necessary. For example, various kinds of image processing, such as sensor correction processing, demosaic (synchronization) processing, pixel interpolation processing, color correction processing (offset correction processing, white balance processing, color matrix processing, gamma conversion processing (gamma correction processing unit 33), and the like), RGB image processing (sharpness processing, tone correction processing, exposure correction processing, contour correction processing, and the like), RGB/YCrCb conversion processing, and image compression processing, are appropriately performed in the image processing unit 35. In particular, the image processing unit 35 of this example comprises a gamma correction processing unit 33 and a sharpening and recovery unit 36.

The digital camera 10 shown in FIG. 1 is provided with other devices (a shutter and the like) necessary for imaging or the like, and the user can appropriately determine and change various settings (exposure value (EV value) and the like) for imaging through a user interface 29 in the camera body 14. The user interface 29 is connected to the camera body controller 28 (the device control unit 34 and the image processing unit 35), and various settings determined and changed by the user are reflected in various kinds of processing in the camera body controller 28.

Image data subjected to the image processing in the camera body controller 28 is sent to the computer 60C and the like through the input/output interface 32. The format of image data sent from the digital camera 10 (camera body controller 28) to the computer 60C and the like is not particularly limited, and may be an arbitrarily format, such as RAW, JPEG, or TIFF. Accordingly, the camera body controller 28 may constitute a plurality of pieces of associated data, such as header information (imaging information (imaging date and time, model, pixel number, F number, and the like)), main image data, and thumbnail image data, as one image file in association with one another, like a so-called exchangeable image file format (Exif), and may transmit the image file to the computer 60C.

The computer 60C is connected to the digital camera 10 through the input/output interface 32 of the camera body 14 and a computer input/output unit 62, and receives data, such as image data, sent from the camera body 14. A computer controller 64 integrally controls the computer 60C, and subjects image data from the digital camera 10 to image processing or performs communication control with a server 80 or the like connected to the computer input/output unit 62 through a network line, such as the Internet 70. The computer 60C has a display 66, and the processing content in the computer controller 64 is displayed on the display 66 as necessary. The user operates input means (not shown), such as a keyboard, while confirming the display of the display 66, thereby inputting data or commands to the computer controller 64. With this, the user can control the computer 60C or the devices (the digital camera 10 and the server 80) connected to the computer 60C.

The server 80 has a server input/output unit 82 and a server controller 84. The server input/output unit 82 constitutes a transmission/reception connection unit with the external devices, such as the computer 60C, and is connected to the computer input/output unit 62 of the computer 60C through the network line, such as the Internet 70. The server controller 84 cooperates with the computer controller 64 according to a control instruction signal from the computer 60C, performs transmission/reception of data with the computer controller 64 as necessary, downloads data to the computer 60C, and performs calculation processing and transmits the calculation result to the computer 60C.

Each controller (the lens unit controller 20, the camera body controller 28, the computer controller 64, or the server controller 84) includes circuits necessary for control processing, and includes, for example, an arithmetic processing circuit (CPU or the like), a memory, and the like. Communication among the digital camera 10, the computer 60C, and the server 80 may be performed in a wired manner or in a wireless manner. The computer 60C and the server 80 may be constituted integrally, and the computer 60C and/or the server 80 may be omitted. A communication function with the server 80 may be provided in the digital camera 10, and transmission/reception of data may be performed directly between the digital camera 10 and the server 80.

<Point Image Restoration Processing>

Next, point image restoration processing of captured data (image data) of an object image obtained through the imaging element 26 will be described.

In the following example, although an example where the point image restoration processing is carried out in the camera body 14 (the camera body controller 28) will be described, the whole or a part of the point image restoration processing can be carried out in another controller (the lens unit controller 20, the computer controller 64, the server controller 84, or the like).

The point image restoration processing is processing for subjecting source image data acquired from the imaging element 26 by imaging the object image using the optical system (the lens 16, the diaphragm 17, or the like) to restoration processing using a restoration filter based on a point spread function of the optical system to acquire recovered image data.

Figure 3:
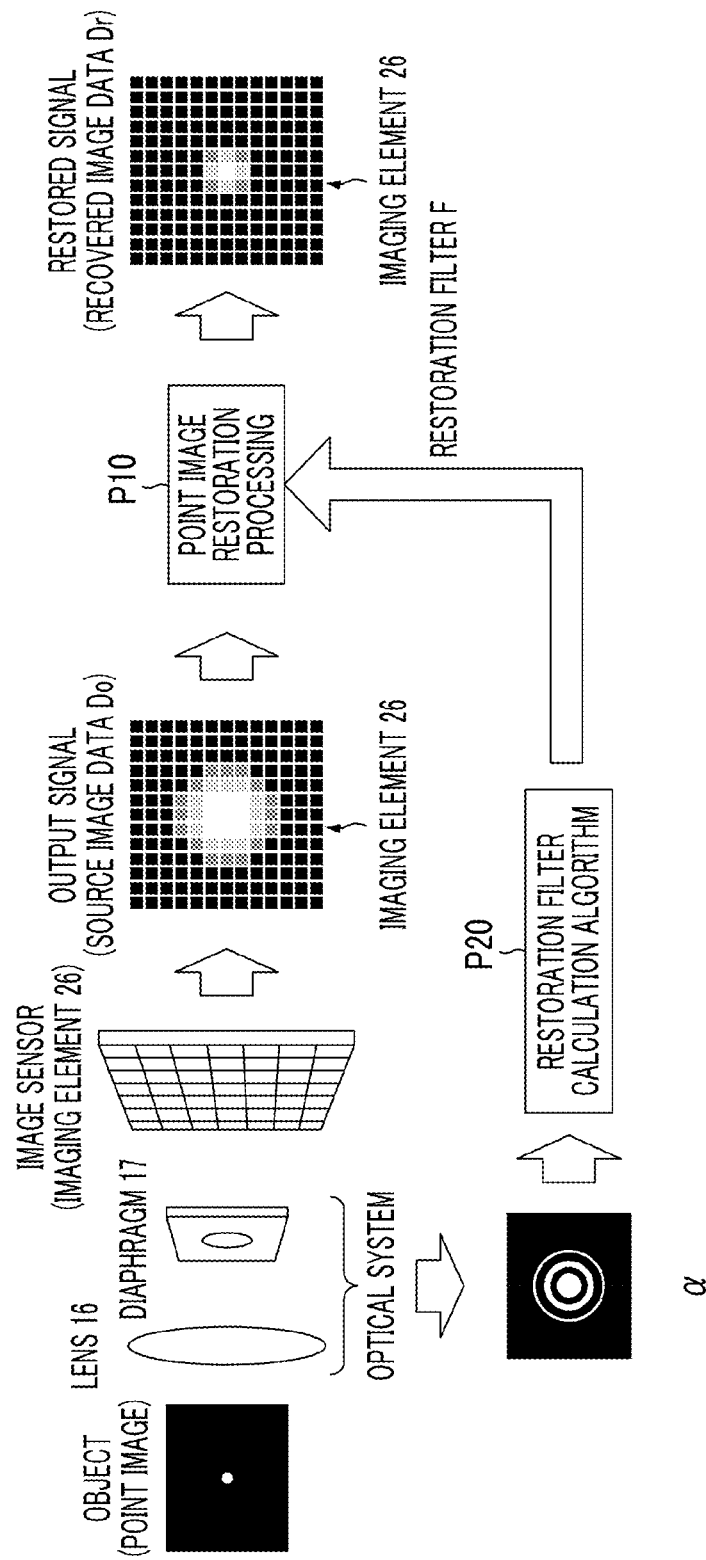
FIG. 3 is a diagram showing an outline from image capturing to point image restoration processing.

FIG. 3 is a diagram showing an outline from image capturing to the point image restoration processing. In a case where imaging is performed with a point image as an object, an object image is received by the imaging element 26 (image sensor) through the optical system (the lens 16, the diaphragm 17, or the like), and source image data Do is output from the imaging element 26. Source image data Do becomes image data, in which an original object image is in a blurred state, by a point spread phenomenon resulting from the characteristic of the optical system.

In order to restore the original object image (point image) from source image data Do of the blurred image, source image data Do is subjected to point image restoration processing P10 using a restoration filter F, whereby recovered image data Dr representing an image (recovered image) closer to the original object image (point image) is obtained.

The restoration filter F used for the point image restoration processing P10 is obtained from point image information (point spread function) of the optical system according to the imaging conditions at the time of acquiring source image data Do, by a predetermined restoration filter calculation algorithm P20. The point image information (point spread function) of the optical system fluctuates depending on various imaging conditions, such as a diaphragm amount, a focal length, a zoom amount, an image height, a recording pixel number, and a pixel pitch, as well as the type of lens 16; therefore, for calculating the restoration filter F, the imaging conditions are acquired. Symbol α in FIG. 3 represents the point image information (point spread function) (for each diaphragm, each focal length, and each image height) according to the imaging conditions.

Figure 4:
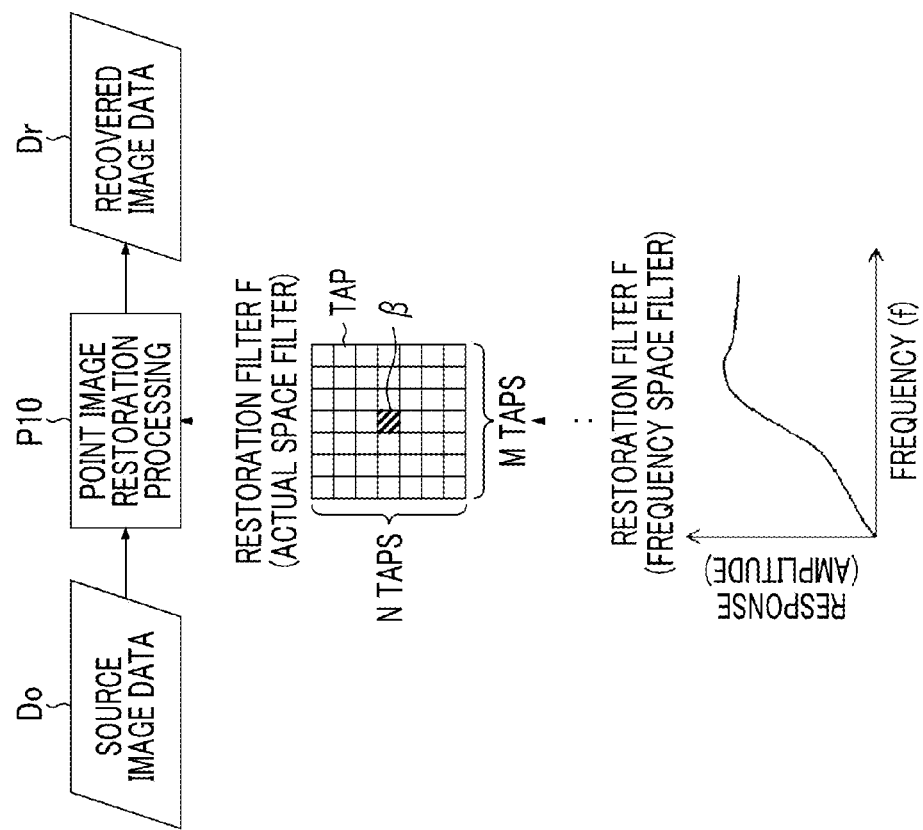
FIG. 4 is a block diagram showing an example of the point image restoration processing.

FIG. 4 is a block diagram showing an example of the point image restoration processing.

As described above, the point image restoration processing P10 is processing which creates recovered image data Dr from source image data Do through filtering processing using the restoration filter F, and the restoration filter F on an actual space constituted of, for example, N×M (where N and M are integers equal to or greater than two) taps is applied to image data to be processed. With this, weighted average calculation (deconvolution calculation) of a filter coefficient allocated to each tap and corresponding pixel data (pixel data to be processed of source image data Do and adjacent pixel data) is performed, whereby pixel data (recovered image data Dr) after the point image restoration processing can be calculated. The weighted average processing using the restoration filter F is applied to all pixel data constituting image data while changing a target pixel in order, thereby performing the point image restoration processing. Symbol β in FIG. 4 represents a tap (filter coefficient) which is applied to pixel data to be processed.

The restoration filter on the actual space constituted of the N×M taps can be derived by inverse Fourier transform of a restoration filter on a frequency space. Accordingly, the restoration filter on the actual space can be appropriately calculated by specifying a restoration filter on a frequency space as the basis and designating the number of taps constituting the restoration filter of the actual space.

Next, an adverse effect in image quality caused by the point image restoration processing will be described.

Figure 5:
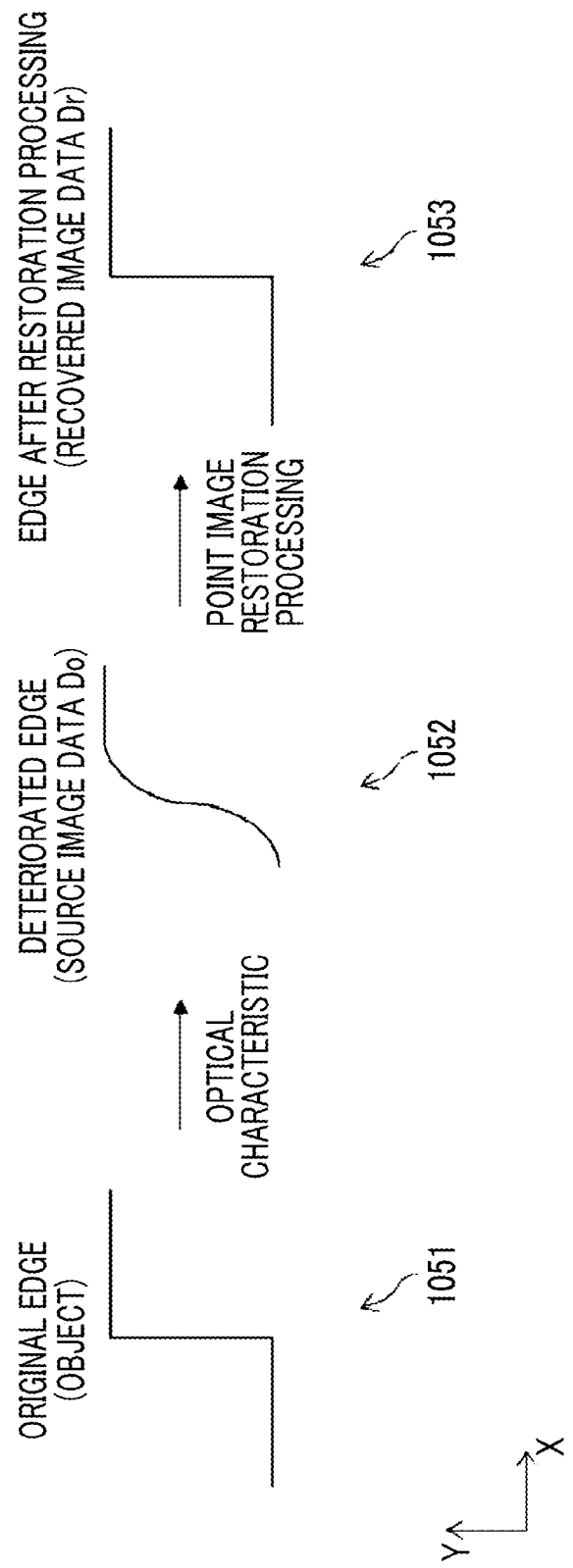
FIG. 5 is a diagram showing an example of a change in image quality of an edge portion (image boundary portion) in an object image, and shows a case where ideal point image restoration processing (no saturation of a pixel value and no clipping) is performed.

FIG. 5 is a diagram showing an example of a change in image quality of an edge portion (image boundary portion) in an object image, and shows a case where ideal point image restoration processing (no saturation of a pixel value and no clipping) is performed. Reference numeral 1051 of FIG. 5 indicates contrast inherent in the object image, reference numeral 1052 indicates contrast in source image data Do before the point image restoration processing, and reference numeral 1053 indicates contrast in recovered image data Dr after the point image restoration processing. The transverse direction (X direction) of FIG. 5 indicates a position (one-dimensional position) in the object image, and the longitudinal direction (Y direction) indicates strength of contrast.

As described above, "an edge portion having a difference in level of contrast" (see reference numeral 1051 of FIG. 5) in the object image has image blur in the captured image (source image data Do) undergoing the point spread phenomenon of the optical system at the time of imaging (see reference numeral 1052 of FIG. 5), and recovered image data Dr is obtained through the point image restoration processing (see reference numeral 1053 of FIG. 5).

In the point image restoration processing, in a case where the "actual image deterioration characteristics (image blur characteristics)" match "the point spread function (PSF or the like) as the basis of the restoration filter to be used", the image is appropriately restored, and recovered image data Dr in which the edge portion or the like is appropriately restored can be obtained (see FIG. 5).

However, in actual point image restoration processing, there may be a case where the "actual image deterioration characteristics (image blur characteristics)" do not completely match "the point spread function as the basis of the restoration filter to be used".

Figure 6:
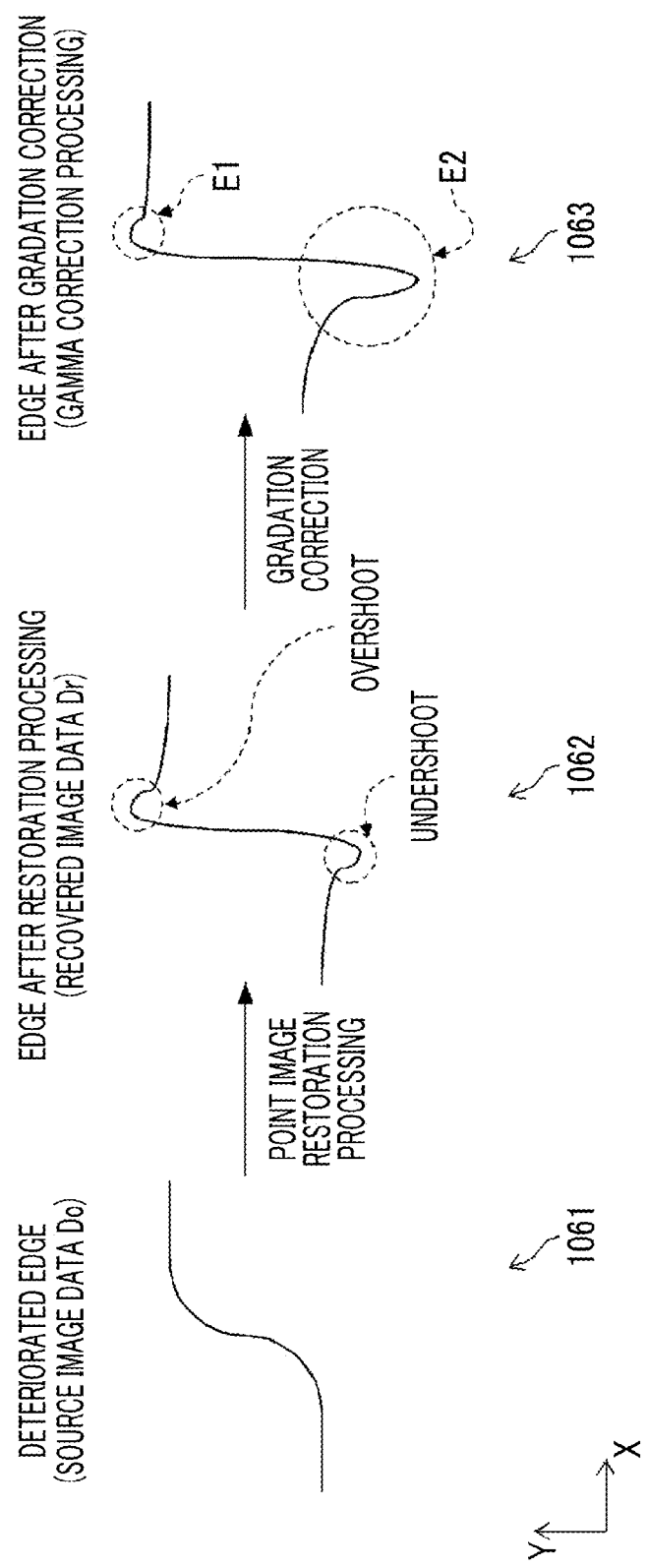
FIG. 6 is a diagram showing an example of source image data, recovered image data, and image data after gamma correction processing in a case where "actual image deterioration characteristics (image blur characteristics)" do not completely match "a point spread function as the basis of a restoration filter to be used".

FIG. 6 is a diagram showing an example of source image data, recovered image data, and image data after the gamma correction processing in a case where the "actual image deterioration characteristics (image blur characteristics)" do not completely match "the point spread function as the basis of the restoration filter to be used". The transverse direction (X direction) in FIG. 6 indicates a position (one-dimensional position) in an image, and the longitudinal direction (Y direction) indicates a pixel value. In a case where the "actual image deterioration characteristics (image blur characteristics)" do not completely match "the point spread function as the basis of the restoration filter to be used", overshoot (undershoot) may occur in the edge portion where a contrast difference is comparatively great (see reference numerals 1061 and 1062 of FIG. 6). Even in a case where image quality deterioration, such as overshoot (undershoot), occurs, as long as the point image restoration processing is excellent in image reproducibility and image toughness (image invulnerability), recovered image data Dr in which image quality is recovered to such an extent that image quality deterioration is not visually recognized (inconspicuous) can be acquired.

However, even if recovered image data which has been recovered to such an extent that image quality deterioration is inconspicuous has been obtained through the point image restoration processing, image quality deterioration in recovered image data may be enhanced and made conspicuous through other kinds of processing (the gradation correction processing, such as the gamma correction processing) after the point image restoration processing.

For example, as shown in FIG. 6, even in a case where overshoot (undershoot) itself caused by the point image restoration processing is small and the influence thereof is particularly inconspicuous visually, and if the gradation correction processing (the gamma correction processing) is performed subsequently, overshoot (undershoot) may be enhanced more than necessary (see "E1" and "E2" of reference numeral 1063 of FIG. 6). In particular, a great gain (amplification factor) is applied to an overshoot (undershoot) portion on a shadow side through the subsequent gamma correction processing, and the overshoot (undershoot) portion constitutes a portion which greatly inclines toward a black side in the image edge portion (see "E2" of reference numeral 1063 of FIG. 6). This phenomenon is not limited to the point image restoration processing, and is common for a case where overshoot occurs in the edge portion as a result of subjecting image data in an antilogarithm space to a contour correction processing.

Accordingly, in a case of actually designing the point image restoration processing as a part of the image processing flow, it is preferable to design an overall image processing flow in consideration of not only the point image restoration processing itself but also the relevance to the processing before and after the point image restoration processing.

<Point Image Restoration Processing/Gradation Correction Processing>

Hereinafter, the relationship between the point image restoration processing and the gradation correction processing in the invention will be described.

Figure 7:
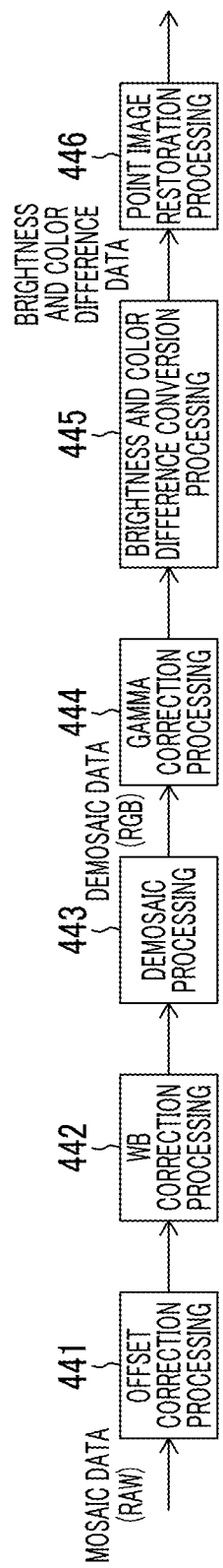
FIG. 7 is a block diagram illustrating an image processing flow in an image processing unit, and shows an example where the point image restoration processing is performed for brightness data (Y) after the gamma correction processing (gradation correction processing).
Figure 8:
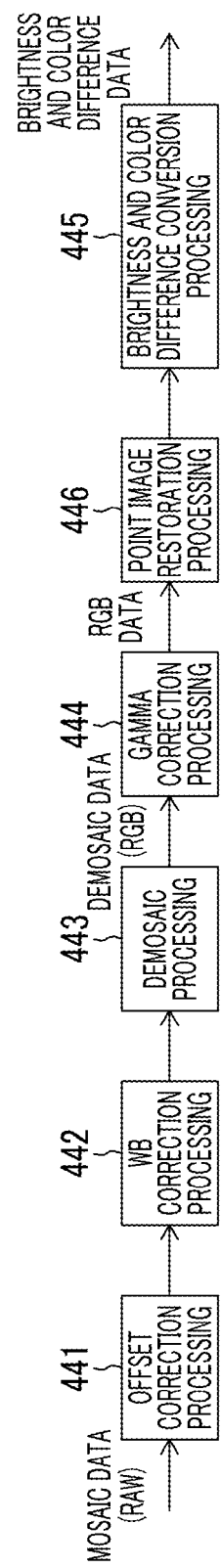
FIG. 8 is a block diagram illustrating the image processing flow in the image processing unit, and shows an example where the point image restoration processing is performed for RGB color data after the gamma correction processing.
Figure 9:
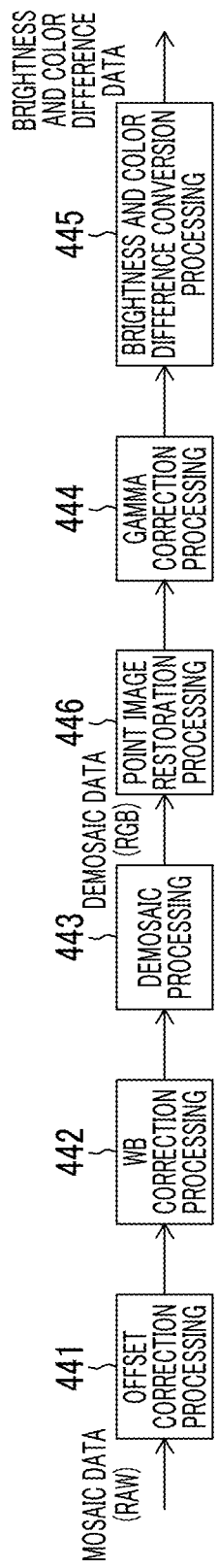
FIG. 9 is a block diagram illustrating the image processing flow in the image processing unit, and shows an example where the point image restoration processing is performed for RGB color data before the gamma correction processing.
Figure 10:
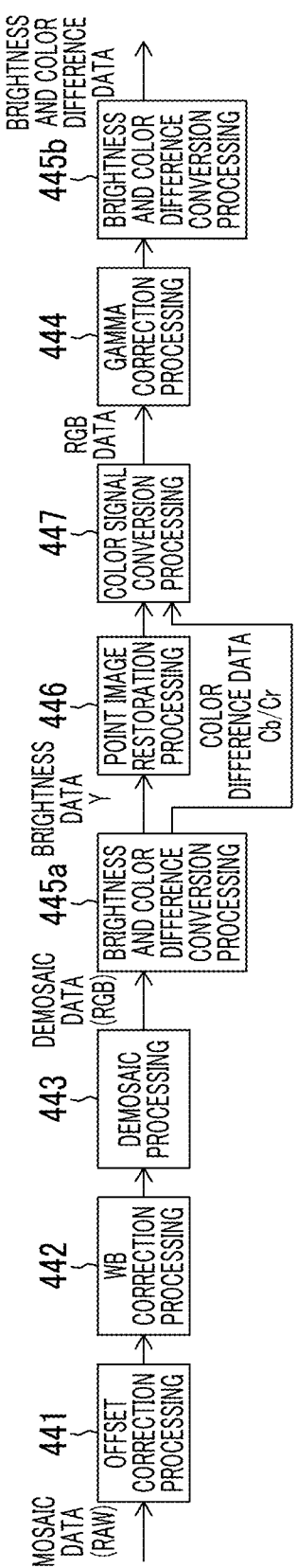
FIG. 10 is a block diagram illustrating the image processing flow in the image processing unit, and shows an example where the point image restoration processing is performed for brightness data (Y) before the gamma correction processing.

FIGS. 7 to 10 are block diagrams illustrating various image processing flows in the image processing unit 35 (the camera body controller 28). FIG. 7 shows an example where brightness data (Y) is subjected to the point image restoration processing after the gamma correction processing (gradation correction processing), and FIG. 8 shows an example where RGB color data is subjected to the point image restoration processing after the gamma correction processing. FIG. 9 shows an example where RGB color data is subjected to the point image restoration processing before the gamma correction processing, and FIG. 10 shows an example where brightness data (Y) is subjected to the point image restoration processing before the gamma correction processing.

In the example of FIG. 7, if mosaic data (RAW image data; source image data) is input, the image processing unit 35 sequentially performs "offset correction processing 441 for adjusting brightness of an image", "WB correction processing 442 for adjusting white balance (WB) of an image", "demosaic processing 443 for acquiring color data of each color of RGB in regard to all pixels through pixel interpolation processing", "gamma correction processing 444 (a gradation correction step; the gamma correction processing unit 33) for performing gradation correction through logarithmic processing to adjust the gradation of pixel data", "brightness and color difference conversion processing 445 for calculating brightness data (Y) and color difference data (Cb/Cr) from RGB color data", and "point image restoration processing (a restoration processing step) 446 for subjecting image data (brightness data) to the point image restoration processing using the restoration filter based on the point spread function of the optical system used in imaging". Color data corresponds to the color of a color filter in the imaging element 26 which captures and acquires mosaic data (source image data), and brightness data and color difference data can be calculated from color data using a known calculation expression.

In the example of FIG. 8, the processing order of the brightness and color difference conversion processing 445 and the point image restoration processing 446 in the image processing example of FIG. 7 are replaced. Accordingly, although, in the example of FIG. 7, brightness data of source image data after the gamma correction processing (gradation correction) 444 is subjected to the point image restoration processing 446, in the example of FIG. 8, RGB color data of source image data subjected to the gamma correction processing (gradation correction) 444 is subjected to the point image restoration processing 446, and thereafter, brightness data and color difference data are calculated.

In the example of FIG. 9, the processing order of the gamma correction processing 444 and the point image restoration processing 446 in the image processing example of FIG. 8 are replaced. Accordingly, although, in the example shown in FIG. 8, the point image restoration processing 446 is performed after the gamma correction processing 444, in the example shown in FIG. 9, the point image restoration processing 446 is performed before the gamma correction processing 444.

In the example of FIG. 10, although the offset correction processing 441, the WB correction processing 442, and the demosaic processing 443 are the same as the examples of FIGS. 7 to 9, brightness and color difference conversion processing 445a is performed after the demosaic processing 443, and after brightness data is subjected to the point image restoration processing 446, color signal conversion processing 447 for calculating RGB color data from brightness data and color difference data is performed. Then, RGB color data is sequentially subjected to the gamma correction processing 444 and brightness and color difference conversion processing 445b, whereby brightness data and color difference data are acquired.

Each of FIGS. 7 to 10 is just an example of the processing flow, and other kinds of processing may be performed at arbitrary stages as necessary, and a part of the processing shown in FIGS. 7 to 10 may be omitted.

In regard to the difference in the point image restoration processing effect among various image processing flows, "the gradation correction processing (gamma correction processing) and the point image restoration processing" have the relevance shown in FIG. 11.

FIG. 11 is a diagram showing the correlation of the "gradation correction processing (gamma correction processing)" and "color data/brightness data" for the point image restoration processing. In FIG. 11, A represents that the effect is great, B represents that the effect is small to intermediate, and—represents that there is no correspondence or no change.

A column indicated by "antilogarithm (before gradation correction)" of FIG. 11 indicates image characteristics in a case where image data (antilogarithm image data) before the gradation correction processing (gamma correction processing) is subjected to the image restoration processing (see FIGS. 9 and 10). A column indicated by "logarithm (after gradation correction)" of FIG. 11 indicates image characteristics in a case where image data (logarithm image data) after the gradation correction processing (gamma correction processing) is subjected to the point image restoration processing (see FIGS. 7 and 8). A column indicated by "color data (RGB)" of FIG. 11 indicates image characteristics in a case where color data (RGB data) is subjected to the point image restoration processing (FIGS. 8 and 9), and a column indicated by "brightness data (Y)" indicates image characteristics in a case where brightness data is subjected to the point image restoration processing (see FIGS. 7 and 10).

When comparing antilogarithm image data and logarithm image data, in an ideal system, point image restoration of antilogarithm image data (image data before gradation correction) is more excellent in image restorability than point image restoration of logarithm image data (image data after gradation correction) (see "restorability in ideal system of FIG. 11").

The ideal system used herein indicates an ideal system in which conditions for performing appropriate point image restoration processing, such as "the number of taps of the restoration filter for use in the point image restoration processing is sufficiently great", "the number of calculation bits is sufficiently great", "the actual blur characteristics of the optical system match optical system blur characteristics data stored in the image processing unit 35", "input image data (source image data) does not include saturated pixel data in which the pixel value is saturated", and the like, are sufficiently satisfied.

In an actual processing system deviated from the ideal system, it is experimentally confirmed that point image restoration of logarithm image data (image data after gradation correction) is small in the degree of appearance of a side effect, such as ringing, in the image subjected to the point image restoration (recovered image) compared to point image restoration of antilogarithm image data (image data before gradation correction) (see "brightness system toughness (degree of ringing or the like) in the system deviated from the ideal system" of FIG. 11).

One reason that "the point image restoration processing for logarithm image data (image data on a logarithm space)" is small in the degree of appearance of a side effect, such as ringing, compared to "the point image restoration processing for antilogarithm image data (image data on an antilogarithm space)" in a real processing system different from the ideal system is that, in pixel data (image data) after the gamma correction processing (the gradation processing in the logarithmic processing), the gradation of a low brightness portion is enhanced and the gradation of a high brightness portion is not enhanced. Furthermore, one reason that image deterioration, such as ringing, is made conspicuous is that overshoot (undershoot) occurs at the edge (boundary portion) of the image due to the point image restoration processing, and overshoot (undershoot) is enhanced due to gradation correction (see FIG. 6).

If color data (color signal) of each color of RGB is input to the sharpening and recovery unit 36 comprising a restoration processing unit 38 (FIG. 15) as assumed, that is, as stored deterioration information (the point spread function information of the optical system), "the point image restoration processing for color data (RGB data)" can perform effective color data correction, and it is possible to effectively reduce chromatic aberration or the like compared to "the point image restoration processing for brightness data (Y data)" (see "restorability in the ideal system", "color system correction ability" of FIG. 11). However, in a case where the actual behavior of an input signal is not as assumed, in the point image restoration processing for color data (RGB data), side effects, such as an increase in the number of places where unnecessary coloring occurs and a conspicuous unnatural tone of color, may occur (see "color system toughness (degree of coloring, degree of blurring, or the like) in a system deviated from the ideal system" of FIG. 11).

In regard to the processing scale (the scale of a processing circuit in a case where a processing system is made to hardware) on software, there is a difference shown in FIG. 11. That is, the point image restoration processing of logarithm image data (image data on the logarithm space) has a small processing scale and is advantageous since calculation processing is simple compared to antilogarithm image data (image data on the antilogarithm space). Furthermore, while a processing system for three channels (3ch) is required in the point image restoration processing for color data (RGB data), a processing system for one channel (1ch) is sufficient in the point image restoration processing for brightness data (Y data); thus, in the point image restoration processing for brightness data, the calculation processing is simplified and the processing scale can be made compact.

Accordingly, in an actual image processing system, it is preferable to construct an appropriate system according to user's needs in consideration of various characteristics shown in FIG. 11. For example, in a case where the processing conditions are out of the ideal processing system, such as "various types are input as an input image signal (image data)", "the processing system is incorporated into hardware on as a small scale as possible", "there is no guarantee that actual image deterioration information completely matches image deterioration information stored in the processing system", or the like, the point image restoration processing for logarithm image data is excellent in image toughness (image invulnerability) compared to the point image restoration processing for antilogarithm image data. Accordingly, in the actual image processing system, from the viewpoint of improving image toughness, it is preferable to carry out the point image restoration processing at the post stage of the gradation correction processing (gamma correction processing). Furthermore, when focusing on suppression of a side effect of an image processing or reduction in the scale of the processing system, an image processing system which carries out the point image restoration processing for brightness data rather than color data is preferably applied, and when focusing on color reproducibility, an image processing system which carries out the point image restoration processing for color data rather than brightness data is preferably applied.

In a case of performing gradation correction by the logarithmic processing (the gamma correction processing), a restoration filter itself may have a filter coefficient corresponding to image data before the logarithmic processing, or may have a filter coefficient corresponding to image data after the logarithmic processing.

In a case where recovery processing (point image restoration processing) is performed by applying "a restoration filter having a filter coefficient corresponding to a pixel value (antilogarithm pixel data) before gradation correction (before the logarithmic processing)" to "the pixel value (logarithm pixel data) of image data after gradation correction (after the logarithmic processing)", toughness for image quality deterioration (ringing or the like) occurring in a recovered image (restored image) can be improved, and ringing can be made inconspicuous on the recovered image. This is because, in pixel data (image data) after the logarithmic processing, the gradation of the low brightness portion is enhanced and the gradation of the high brightness portion is not enhanced.

Figure 12:
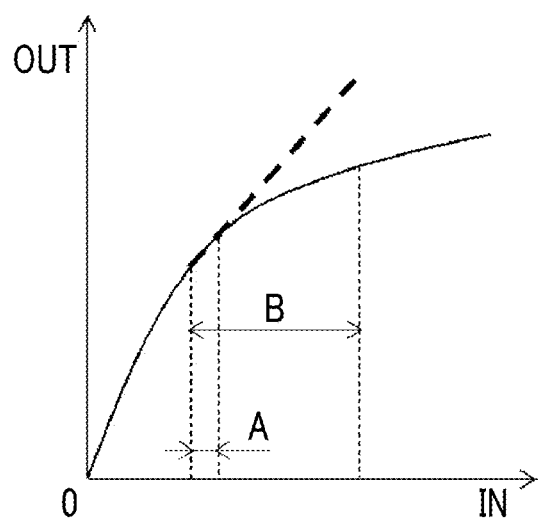
FIG. 12 is a diagram (graph) showing an example of the relationship between pre-processing data and post-processing data by the gamma correction processing (gradation processing in logarithmic processing).

FIG. 12 is a diagram (graph) showing an example of the relationship between pre-processing data and post-processing data by the gamma correction processing (the gradation processing in the logarithmic processing). The horizontal axis of FIG. 12 indicates pre-processing data (gamma correction processing input data "IN"), the vertical axis indicates post-processing data (gamma correction processing output data "OUT"), and a solid line in the graph indicates a gamma correction processing gradation curve.

In general point image restoration processing for image data, a region where the effect of the point image restoration processing is easily visually recognized is a region with low contrast, and is "a region with a comparatively small level difference of the pixel value" to be approximated linearly in the gamma correction processing gradation curve (see "A" of FIG. 12). Meanwhile, in a region with high contrast, that is, in "a region with a comparatively great level difference of the pixel value" constituting a curved portion in the gamma correction processing gradation curve, original contrast is high and blur is hardly recognized (see "B" of FIG. 12).

In addition, in a region including a saturated pixel out of the region with high contrast, if the point image restoration processing is performed for pixel data (pixel data before gradation correction) whose pixel value is antilogarithm, and then gradation correction (the logarithmic processing, the gamma correction processing) is performed, undershoot/overshoot (ringing) is likely to be conspicuous. Meanwhile, in a case where the point image restoration processing is performed for pixel data after the logarithmic processing, high contrast is compressed through the logarithmic processing, and intensity of ringing due to the point image restoration processing is reduced.

That is, the recovery processing (point image restoration processing) is performed for pixel data after the logarithmic processing using the restoration filter having the filter coefficient corresponding to pixel data whose pixel value is antilogarithm, whereby it is possible to carry out the point image restoration processing for the low contrast region, which is generally likely to be visually recognized, with no deterioration, and it is possible to reduce the degree of enhancement of ringing in the high contrast region where ringing is likely to occur due to the point image restoration processing.

In particular, in a case where the image processing device (imaging device or the like) can execute a plurality of types of gradation correction (gamma correction processing) and stores data of a plurality of types of gamma correction processing gradation curves, in the related art (see JP2013-020610A), it is necessary to calculate the limit value of the variation of the pixel signal value for each of a plurality of types of gradation correction. However, according to this system, since the point image restoration processing is applied to pixel data after gradation correction, switching of the processing according to the type of gradation correction is not required.

Figure 13:
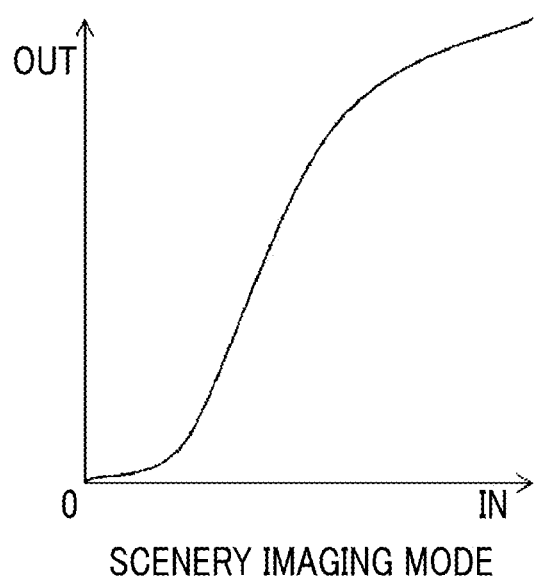
FIG. 13 illustrates the relationship (gamma correction processing gradation curve) between an input value (IN) and an output value (OUT) in gradation correction (gamma correction processing), and is a diagram (graph) showing an example of the gamma correction processing gradation curve which is used at the time of selecting a scenery imaging mode.
Figure 14:
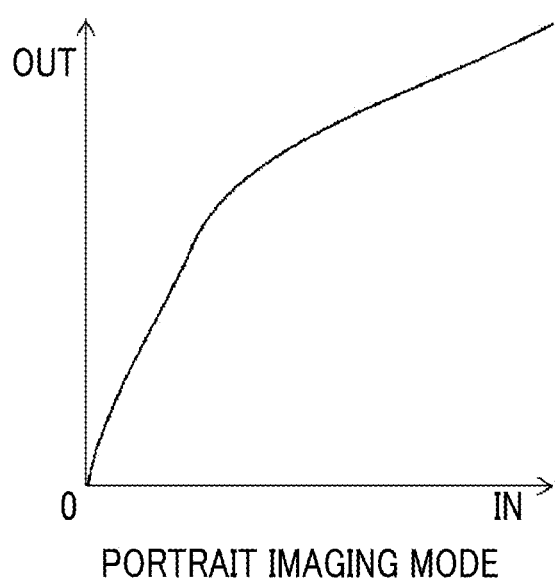
FIG. 14 illustrates the relationship (gamma correction processing gradation curve) between an input value (IN) and an output value (OUT) in gradation correction (gamma correction processing), and is a diagram (graph) showing an example of the gamma correction processing gradation curve which is used at the time of selecting a portrait imaging mode.

FIGS. 13 and 14 illustrate the relationship (gamma correction processing gradation curve) between an input value (IN) and an output value (OUT) in gradation correction (the gamma correction processing), FIG. 13 shows an example of the gamma correction processing gradation curve which is used at the time of selecting the scenery imaging mode, and FIG. 14 shows an example of the gamma correction processing gradation curve which is used at the time of selecting a portrait imaging mode. In a case where a plurality of types of gamma correction processing gradation curves for use in the gradation correction processing (gamma correction processing) are stored, the imaging device, such as the digital camera 10 (see FIG. 1), or the image processing device selects an optimum gamma correction processing gradation curve according to the imaging mode from among the stored gamma correction processing gradation curves. In this case, in a case where the point image restoration processing is performed for image data before gradation correction (gamma correction processing), it is necessary to determine the limit value of the point image restoration processing for each gradation correction and to switch the point image restoration processing according to the type of the gamma correction processing (for example, see JP2013-020610A). However, in a case where the point image restoration processing is performed for pixel data after the gamma correction processing, it is not necessary to switch the point image restoration processing according to the type of the gamma correction processing. Accordingly, in "a case where the point image restoration processing is performed for pixel data after the gamma correction processing" without requiring switching of the processing, in a case where the restoration filter is created in advance, it is possible to suppress memory consumption, and in a case where the restoration filter is calculated successively for each processing, it is possible to facilitate the processing and to suppress the calculation time.

In general, the point spread function (PSF) is based on the assumption that the input is linear, and a restoration filter based on the assumption is easily generated using a "linear coefficient", that is, "a filter coefficient corresponding to antilogarithm pixel data".

The restoration filter has a filter coefficient corresponding to the pixel value before the gamma correction processing (gradation correction), whereby it is possible to reduce a memory, a processing time, a development or design load, and the like, and it is very effective and useful for practical use.

Meanwhile, the recovery processing (point image restoration processing) is performed for the pixel value (logarithm pixel data) after gradation correction (the logarithmic processing) using the restoration filter having the filter coefficient corresponding to the pixel value (logarithm pixel data) after the logarithmic processing, whereby it is possible to improve toughness with respect to image quality deterioration due to ringing caused by the point image restoration processing, and to make caused ringing inconspicuous on the image.

That is, in a case where pixel data has the pixel value (logarithm pixel data) after gradation correction (the logarithmic processing), the point image restoration processing is performed using the restoration filter having the filter coefficient corresponding to the pixel value (logarithm pixel data) after the logarithmic processing, whereby it is possible to accurately perform the point image restoration processing itself. In this case, target image data of the point image restoration processing is set to "source image data after gradation correction", high contrast is compressed through gradation correction (the logarithmic processing), and it is possible to reduce strength of ringing caused by the point image restoration processing.

The restoration filter for use in the point image restoration processing may be generated in advance, or may be successively calculated and generated according to the execution of the point image restoration processing. From the viewpoint of reducing the calculation amount at the time of the point image restoration processing, it is preferable that the restoration filter is generated in advance. Furthermore, from the viewpoint of using the restoration filter excellent in adaptability, it is preferable that the restoration filter is successively calculated at the time of the point image restoration processing.

In a case where the restoration filter is generated in advance, the filter coefficient of the restoration filter may be determined by performing calculation based on the pixel value determined through the logarithmic processing (the gamma correction processing) for the input pixel value (input image data). The pixel value which is used for generating the restoration filter may be a brightness value or a pixel value (for example, the pixel value of G) relating to one channel representatively selected among RGB color data. Furthermore, the pixel value which is used for generating the restoration filter may be a pixel value of a main object, or may be a pixel value which is determined from the average value of the entire image.

The point image restoration processing may be processing for restoring only an amplitude component of source image data to obtain recovered image data, or may be processing for restoring an amplitude component and a phase component of source image data to obtain recovered image data. That is, it is possible to calculate a restoration filter based on at least one of a modulation transfer function (MTF) or a phase transfer function (PTF) of an optical system. The blur characteristics of the optical system can be expressed by a so-called optical transfer function (OTF), and a function which is obtained by subjecting the OTF to inverse Fourier transform is called a point spread function (PSF). The MTF is an absolute value component of the OTF, and the PTF represents a phase shift as a function of a spatial frequency. Accordingly, the restoration filter which is used for the point image restoration processing can be appropriately designed based on the OTF (MTF/PTF) or the PSF of the optical system.

As described above, in the invention, the point image restoration processing is performed by applying the restoration filter having the filter coefficient corresponding to source image data before the logarithmic processing to source image data subjected to gradation correction. With this, it is possible to prevent image quality deterioration due to the occurrence of ringing.

Since gradation correction, such as gamma correction, is processing for changing the characteristics of image data, the deviation of matching between "image data after gamma correction" and "the point spread function of the optical system used for imaging" becomes comparatively great. In particular, on the high brightness side (highlight side) rather than the low brightness side, the deviation of matching between "image data after gamma correction" and "the point spread function of the optical system" is likely to become great. As described above, if the point image restoration processing is performed at a place where the deviation of matching between "image data after gamma correction" and "the point spread function of the optical system" is great, image quality deterioration is caused by overcorrection or the like.

Accordingly, there is a case where, for image data or a region of image data (or a pixel value of image data) undergoing image quality deterioration due to the point image restoration processing, the restoration intensity of the point image restoration processing should be weakened in order to prevent such image deterioration. Furthermore, in an image processing capable of switching between the on and off states of the point image restoration processing, it is possible to prevent such image deterioration by bringing the point image restoration processing into the off state.

Even in a case where the restoration intensity is weakened or the point image restoration processing is brought into the off state, it is possible to perform "image processing determined based on a standard different from the PSF" designed without consideration of the optical characteristics (PSF, OTF) of the lens or the Wiener filter design standards. As "the image processing determined based on a standard different from the PSF", for example, image processing based on designer's subjective evaluation, image quality fine adjustment based on user's preference, sharpness fine adjustment by the user in consideration of individual variation of the lens, and the like are known.

Comparing "an image for which point image restoration processing is on" with "an image for which point image restoration processing is off (an image for which "the image processing determined based on a standard different from the PSF" is on)", in "the image for which the point image restoration processing is off", sharpness becomes more intense than in "the image for which the point image restoration processing is on". This is reasonable in terms of the processing content; however, since even an image subjected to the point image restoration processing (image quality recovery processing) has weaker sharpness than an image not subjected to the point image restoration processing, the user is given a sense of incoincidence between image quality of an actual image and intuition. Furthermore, there is also a case where divergence in sharpness between "the image for which the point image restoration processing is on" and "the image for which the point image restoration processing is off" becomes excessively large, and the user feels inconvenience of operability. Furthermore, in a case where the point image restoration processing is performed by changing the restoration intensity for the purpose of avoiding image quality deterioration or the like, the user feels inconvenience similarly, and sharpness varies between the images subjected to the point image restoration processing, thereby giving the user a sense of discomfort.

Accordingly, in the invention, the point image restoration processing and "the image processing determined based on a standard different from the PSF" (for example, sharpening processing) are controlled so as to prevent variation in image quality sharpness between images subjected to the point image restoration processing with different restoration intensities or divergence in image quality sharpness between "the image for which the point image restoration processing is on" and "the image for which the point image restoration processing is off". Hereinafter, the point image restoration processing and the sharpening processing will be described.

<Point Image Restoration Processing/Sharpening Processing>

Figure 15:
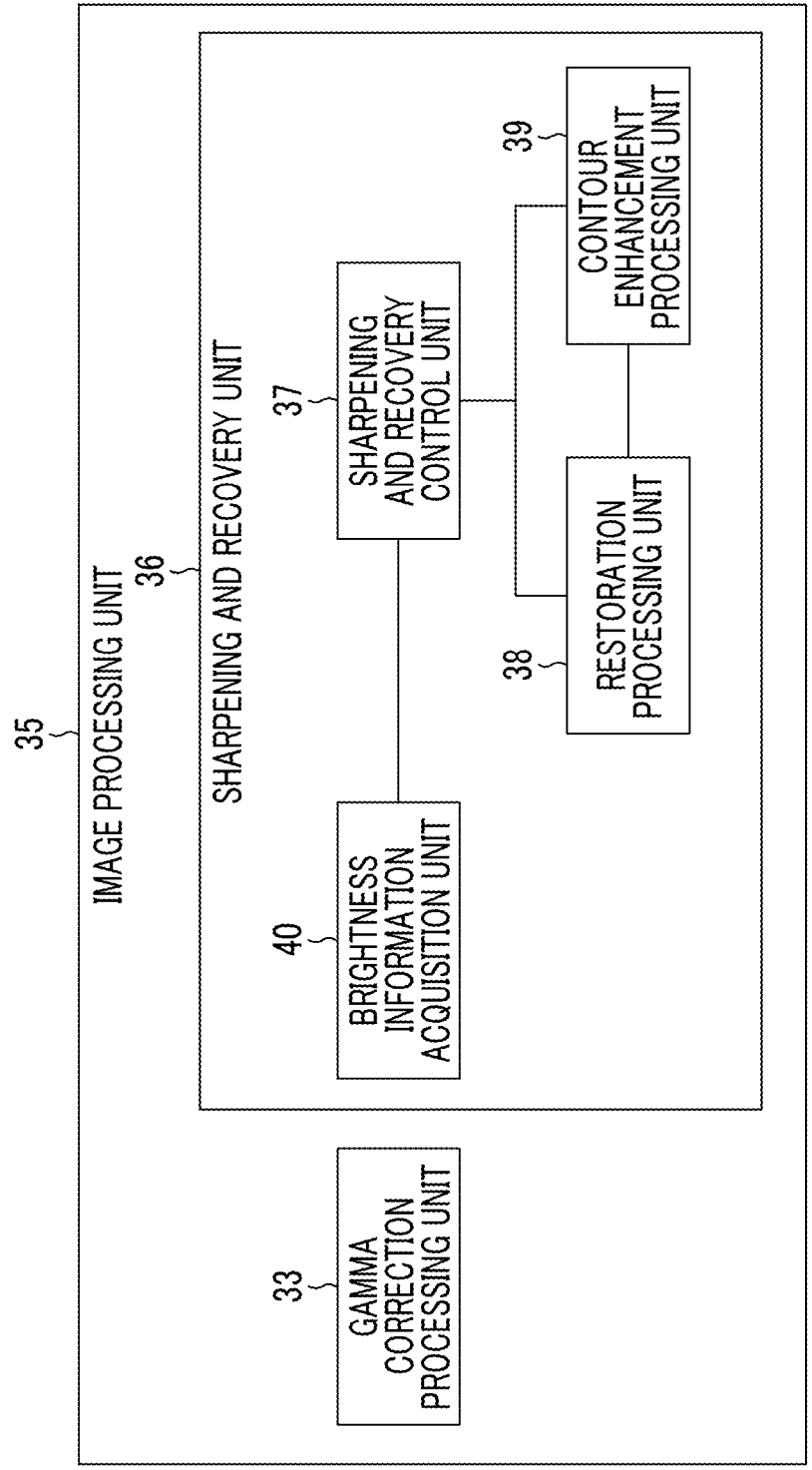
FIG. 15 is a block diagram showing a configuration example of the image processing unit.

FIG. 15 is a block diagram showing a configuration example of the image processing unit 35.

The image processing unit 35 of this example has a gamma correction processing unit (gradation correction unit) 33, a sharpening and recovery control unit 37, a restoration processing unit 38, a contour enhancement processing unit (sharpening processing unit) 39, and a brightness information acquisition unit 40.

The restoration processing unit 38 subjects image data acquired from the imaging element 26 by imaging the object using the optical system (the lens 16 or the like) to restoration processing using a restoration filter based on a point spread function (restoration processing step). The restoration filter is a filter for recovering PSF deterioration, and for example, a Wiener filter can be suitably used as the restoration filter.

The contour enhancement processing unit 39 subjects image data to sharpening processing using a sharpening filter not based on the point spread function (sharpening processing step). The sharpening filter is not particularly limited insofar as a filter does not directly reflect the point spread function, and a known contour enhancement filter can be used as the sharpening filter.

For each of the restoration filter and the sharpening filter, a single filter may be prepared in the entire image, or a different filter may be prepared at each position (each image height) in the image.

The sharpening and recovery control unit 37 performs control such that the restoration processing unit 38 and the contour enhancement processing unit 39 adjust the restoration rate of image data by the restoration processing and the sharpening rate of image data by the sharpening processing. For the adjustment of the restoration rate and the sharpening rate, the sharpening and recovery control unit 37 of this example acquires a total sharpening and restoration rate based on the restoration rate and sharpening rate, acquires one rate of the restoration rate and the sharpening rate, and calculates the other rate of the restoration rate and the sharpening rate based on the total sharpening and restoration rate.

The brightness information acquisition unit 40 acquires brightness information of a source image based on image data (source image data) acquired by imaging. The brightness information is a concept including various kinds of information relating to brightness of the source image. For example, the brightness information is the brightness value of each pixel, the distribution of the brightness values, information of a saturated pixel obtained from the brightness values, imaging exposure information, a histogram of the brightness values, or a median value of the histogram of the brightness values. The brightness information acquired by the brightness information acquisition unit 40 is sent to the sharpening and recovery control unit 37. The sharpening and recovery control unit 37 adjusts the restoration rate and the sharpening rate according to the brightness information.

In a case of performing the point image restoration processing in addition to the sharpening processing, according to the method of the related art, sharpening and restoration intensity may become excessively intense to cause image overcorrection or the like, thereby damaging image quality. Accordingly, in a case of performing both of the sharpening processing and the point image restoration processing, it is preferable to weaken the sharpening intensity in the sharpening processing or the restoration intensity in the point image restoration processing compared to a case of performing only the sharpening processing or only the point image restoration processing.

The point image restoration processing may cause artifact (ringing or the like) due to erroneous depending on the imaging scene (object). Furthermore, in a case of using different restoration filters according to the imaging conditions, variation may occur in the restoration rate of the image after the point image restoration processing or the sense of resolution (sharpness). Erroneous correction or variation in the sharpness of the image is more conspicuous if the sharpening processing is performed.

The following embodiment relates to a technique which effectively prevents overcorrection or erroneous correction described above even in a case where the point image restoration processing and the sharpening processing are combined, and recovers image quality damaged due to the point spread phenomenon of the optical system to obtain a clear image.

Figure 16:
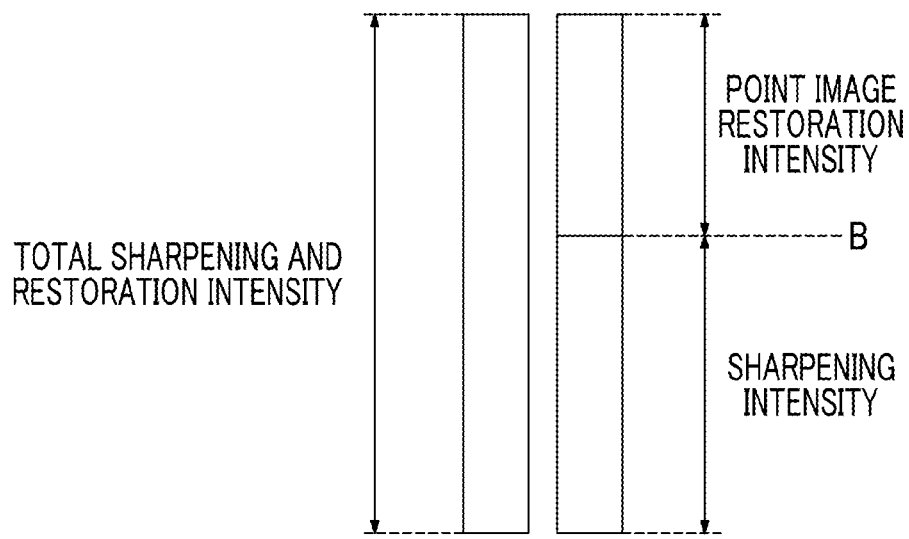
FIG. 16 is a conceptual diagram illustrating adjustment of point image restoration intensity and sharpening intensity.

FIG. 16 is a conceptual diagram illustrating adjustment of point image restoration intensity and sharpening intensity. "Total sharpening and restoration intensity (total sharpening and restoration rate)" of FIG. 16 is a final sharpness target intensity value determined from desired image quality, and indicate the ratio of magnitude of the input and the output with respect to entire image processing directly or indirectly. The "total sharpening and restoration intensity (total sharpening and restoration rate)" of this example fluctuates according to imaging setting conditions (optical characteristic information) but becomes a constant value if the imaging setting conditions are determined. The imaging setting conditions can include, for example, various imaging conditions and setting conditions, such as a lens, a diaphragm, a zoom, an object distance, sensitivity, and an imaging mode. The "point image restoration intensity" is restoration intensity by the point image restoration processing, and is determined according to the imaging setting conditions (optical characteristic information). The "sharpening intensity" is the intensity of sharpening by the sharpening processing.

The total sharpening and restoration intensity, the point image restoration intensity, and the sharpening intensity are indexes representing the degree of image change before and after respective image processing, and are determined according to an arbitrary standard capable of appropriately representing the degree of image change. Accordingly, in a case where each of the point image restoration processing and the sharpening processing includes filter application processing and gain control processing, change before and after "the filter application processing and the gain control processing" is represented by the point image restoration intensity and the sharpening intensity.

For example, a case in which the point image restoration processing and the sharpening processing are performed in parallel, "the degree (point image restoration intensity) of image restoration by the point image restoration processing" and "the degree (sharpening intensity) of image sharpening by the sharpening processing" are determined by the "total sharpening and restoration intensity" is assumed. In this case, the relationship of "point image restoration intensity+sharpening intensity=total sharpening and restoration intensity" is established, the sharpening intensity is increased or decreased by an increment or a decrement of the point image restoration intensity, and a boundary position (B) of the point image restoration intensity and the sharpening intensity shown in FIG. 16 may fluctuate. Accordingly, for example, if the total sharpening and restoration intensity and the point image restoration intensity are determined, it is possible to calculate optimum sharpening intensity from both of the total sharpening and restoration intensity and the point image restoration intensity. Similarly, if the total sharpening and restoration intensity and the sharpening intensity are determined, it is possible to calculate optimum point image restoration intensity from both of the total sharpening and restoration intensity and the sharpening intensity.

FIG. 16 just shows an intuitive conceptual diagram for ease of understanding, and does not show that the relationship of "point image restoration intensity+sharpening intensity=total sharpening and restoration intensity" is constantly established in a processing system in which the point image restoration processing and the sharpening processing are performed. For example, in a case where the point image restoration processing and the sharpening processing are performed in series, the total sharpening and restoration intensity is determined based on the product of the point image restoration intensity and the sharpening intensity. Accordingly, in the following embodiment, the point image restoration intensity and the sharpening intensity are determined such that "a frequency amplification rate by both of the point image restoration intensity and the sharpening intensity" matches "a frequency amplification rate by the total sharpening and restoration intensity".

For example, the point image restoration intensity can be set preferentially and the sharpening intensity can be adjusted according to the set point image restoration intensity. In this case, it is possible to perform the point image restoration processing according to the PSF of the optical system (the lens 16 or the like) with high accuracy. Furthermore, although the point image restoration processing is delicate processing and is likely to cause a harmful influence, such as overcorrection, if basic parameters are not accurate, the harmful influence, such as overcorrection, is effectively prevented by preferentially determining the point image restoration intensity.

The sharpening intensity may be preferentially set and the point image restoration intensity may be adjusted according to the set sharpening intensity. In this case, the sharpening processing which is stable processing with little harmful influence is preferentially performed. A case where the sharpening processing is preferentially performed is suitable for a case where imaging is performed using the optical system (the lens 16 or the like) having accuracy with excellent optical characteristics, a case where an imaging scene is night view or portrait, a case where art filter processing is performed, a case where the effect of the point image restoration processing is hardly obtained, a case where a harmful influence of the point image restoration processing is likely to appear, or the like.

The adjustment of the point image restoration intensity and the sharpening intensity can be performed according to various standards, and for example, the total sharpening and restoration intensity is performed such that the frequency amplification rate becomes equal at a specific frequency or a specific image position (image height position).

In this way, it is possible to suppress variation in the degree of sharpness (restoration rate and sense of resolution) subjected to the point image restoration processing and the sharpening processing and to improve overall image quality of an output image by setting the total sharpening and restoration intensity and adjusting the point image restoration intensity and the sharpening intensity.

A specific embodiment relating to the adjustment of the point image restoration intensity and the sharpening intensity will be described below.

First Embodiment

Figure 17:
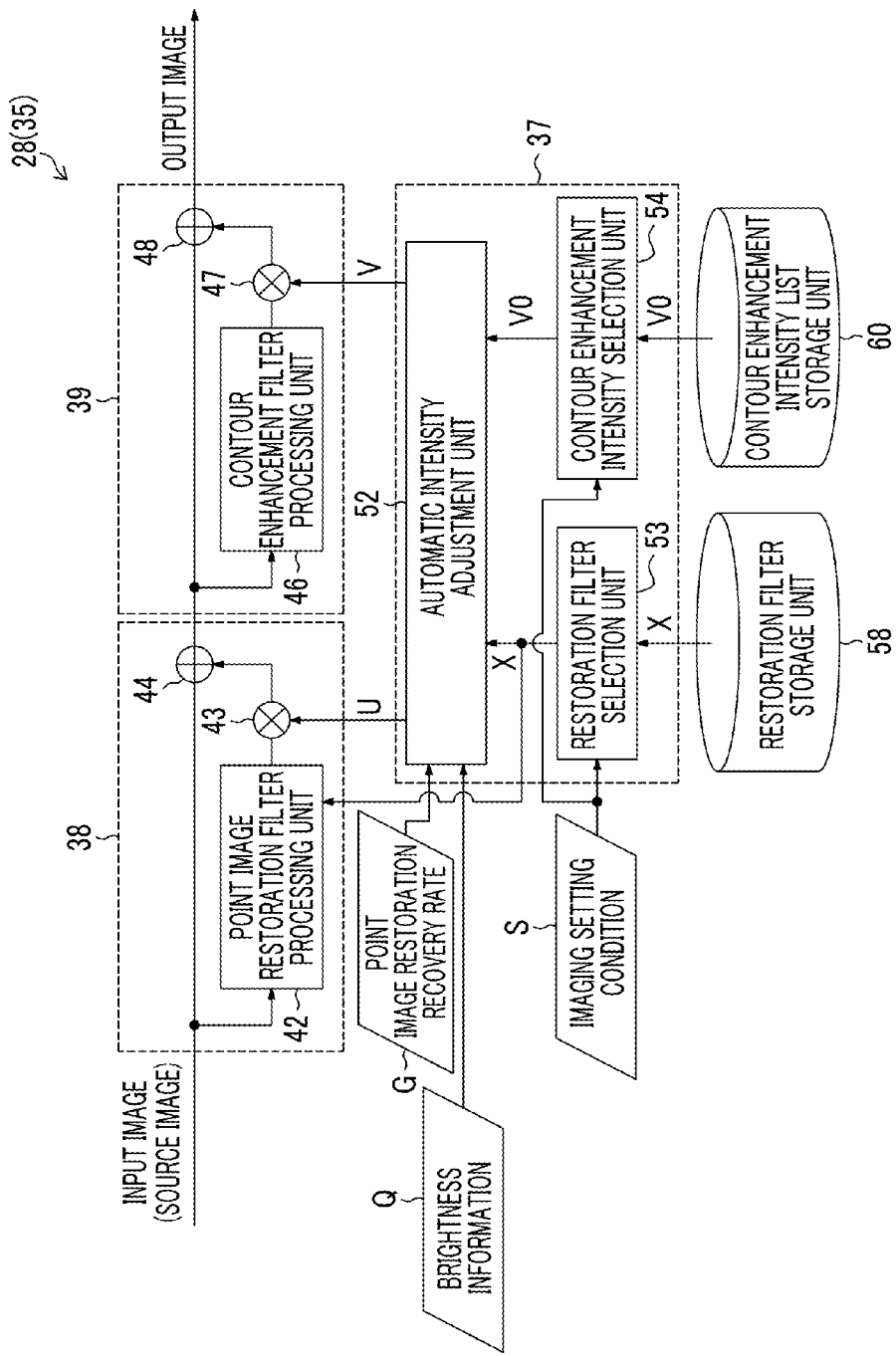
FIG. 17 is a diagram showing the configuration of a processing block for performing point image restoration processing and sharpening processing according to a first embodiment.

FIG. 17 is a diagram showing the configuration of a processing block for performing point image restoration processing and sharpening processing according to a first embodiment.

The sharpening and recovery control unit 37 of this embodiment acquires the restoration rate in the point image restoration processing and calculates the "sharpening rate" in the sharpening processing based on the total sharpening and restoration rate and the restoration rate. The sharpening and recovery control unit 37 of this embodiment adjusts the restoration rate in the point image restoration processing and the sharpening rate in the sharpening processing according to the brightness information.

In an image processing system model of this embodiment, "a signal processing block for point image restoration processing" and "a signal processing block for arbitrary sharpness enhancement processing" are connected in series (cascade connection), and continuous signal intensity adjustment can be performed in both signal processing blocks. That is, the restoration processing unit 38 and the contour enhancement processing unit 39 are provided in series, and image data (source image data) is subjected to one kind of processing (in the example shown in FIG. 17, the "point image restoration processing") of the point image restoration processing and the sharpening processing and is then subjected to the other kind of processing (in the example shown in FIG. 17, the "sharpening processing"). In this embodiment, although an example where "the signal processing block for point image restoration processing" and "the signal processing block for arbitrary sharpness enhancement processing" are connected in series (cascade connection) has been described, the invention is not limited thereto. For example, "the signal processing block for point image restoration processing" and "the signal processing block for arbitrary sharpness enhancement processing" may be connected in parallel.

The restoration processing unit 38 includes a point image restoration filter processing unit 42, a restoration multiplier 43, and a restoration adder 44. The point image restoration filter processing unit 42 applies a restoration filter corresponding to the point spread function of the optical system (the lens 16 or the like) to input image data (source image data). The restoration multiplier 43 performs gain control by multiplying image data obtained in the point image restoration filter processing unit 42 by a restoration intensity magnification U. The restoration adder 44 multiplies input image data by a magnification (1-U) and adds image data to image data multiplied by the restoration intensity magnification U. The point image restoration processing is constituted by a series of processing in the point image restoration filter processing unit 42, the restoration multiplier 43, and the restoration adder 44.

The restoration processing unit 38 can reflect the restoration intensity magnification U in image data by an arbitrary method, and in this embodiment and other embodiments, other methods equivalent to the above-described method may be used instead of the above-described method. After the restoration filter corresponding to the point spread function of the optical system is applied to input image data in the point image restoration filter processing unit 42, increment/decrement data of the image is calculated, gain control of increment/decrement data is performed in the restoration multiplier 43, and multiplication of increment/decrement data and the restoration intensity magnification U is performed. Thereafter, addition of image data (input image) before being input to the point image restoration filter processing unit 42 and increment/decrement data multiplied by the restoration intensity magnification U may be performed in the restoration adder 44.

The contour enhancement processing unit 39 includes a contour enhancement filter processing unit 46, a sharpening multiplier 47, and a sharpening adder 48. In this example, image data after the point image restoration processing is input to the contour enhancement filter processing unit 46 as input image data. The contour enhancement filter processing unit 46 applies a sharpening filter (contour enhancement filter) to input image data. The sharpening filter is determined by an arbitrary method, and the contour enhancement filter processing unit 46 may use a single sharpening filter or may use a filter appropriately selected from among a plurality of filters as the sharpening filter. The sharpening multiplier 47 performs gain control by multiplying image data obtained in the contour enhancement filter processing unit 46 by a sharpening intensity magnification V. The sharpening adder 48 multiplies input image data by a magnification (1-V) and adds image data to image data multiplied by the sharpening intensity magnification V. The sharpening processing is constituted by a series of processing in the contour enhancement filter processing unit 46, the sharpening multiplier 47, and the sharpening adder 48.

Similarly to the reflection method of the restoration intensity magnification U, the contour enhancement processing unit 39 can reflect the sharpening intensity magnification V in image data by an arbitrary method, and in this embodiment and other embodiments, other methods equivalent to the above-described method may be used instead of the above-described method. For example, after the sharpening filter (contour enhancement filter) is applied to input image data in the contour enhancement filter processing unit 46, increment/decrement data of the image is calculated, gain control of increment/decrement data is performed in the sharpening multiplier 47, and multiplication of increment/decrement data and the sharpening intensity magnification V is performed. Thereafter, addition of image data (input image) before being input to the contour enhancement filter processing unit 46 and increment/decrement data multiplied by the sharpening intensity magnification V may be performed in the sharpening adder 48.

The sharpening and recovery control unit 37 includes an automatic intensity adjustment unit 52, a restoration filter selection unit 53, and a contour enhancement intensity selection unit 54. The restoration filter selection unit 53 selects a restoration filter X based on the point spread function of the optical system (the lens 16 or the like) used for capturing image data from the restoration filter storage unit 58 based on imaging setting conditions S (zoom step, F number, object distance, and the like). The restoration filter selection unit 53 transmits the selected restoration filter X to the automatic intensity adjustment unit 52 and the point image restoration filter processing unit 42 of the restoration processing unit 38. The point image restoration filter processing unit 42 applies the restoration filter X sent from the restoration filter selection unit 53 to the input image.

The contour enhancement intensity selection unit 54 selects a sharpening intensity magnification (contour enhancement intensity) V0 corresponding to the imaging setting conditions S from a contour enhancement intensity list storage unit 60 and transmits the selected sharpening intensity magnification V0 to the automatic intensity adjustment unit 52. In this example, the sharpening intensity magnification V0 selected by the contour enhancement intensity selection unit 54 is a sharpening intensity magnification in a case where the point image restoration processing is not substantially performed in the restoration processing unit 38 (point image restoration filter processing unit 42).

"The sharpening intensity magnification in a case where the point image restoration processing is not substantially performed" corresponds to the total sharpening and restoration rate (total sharpening and restoration intensity). That is, in this example, the point image restoration intensity and the sharpening intensity are determined by the total sharpening and restoration intensity (see FIG. 16), and the total sharpening and restoration intensity in a case where the point image restoration processing is not performed is determined only by the sharpening intensity. Accordingly, the contour enhancement intensity selection unit 54 of this example which acquires, as the sharpening intensity magnification V0, the sharpening intensity magnification in a case where the point image restoration processing is not performed and supplies the sharpening intensity magnification to the automatic intensity adjustment unit 52 substantially supplies the total sharpening and restoration rate (total sharpening and restoration intensity) to the automatic intensity adjustment unit 52.

The restoration filter storage unit 58 stores a plurality of restoration filters based on the point spread functions of a plurality of optical systems (the lens 16 and the like) for the respective imaging setting conditions. The contour enhancement intensity list storage unit 60 stores contour enhancement intensity for each imaging setting condition, and in particular, in this example, the sharpening intensity magnification V0 (maximum contour enhancement intensity) in a case where the point image restoration processing is off is stored in the contour enhancement intensity list storage unit 60. The restoration filter storage unit 58 and the contour enhancement intensity list storage unit 60 may be provided in the camera body 14, or may be provided in the lens unit 12.

The automatic intensity adjustment unit 52 determines the restoration intensity magnification U and the sharpening intensity magnification V according to a point image restoration recovery rate (restoration rate) G based on the restoration filter X from the restoration filter selection unit 53 and the sharpening intensity magnification V0 from the contour enhancement intensity selection unit 54 (however, "restoration intensity magnification U≥0" and "sharpening intensity magnification V≥0" are satisfied). The automatic intensity adjustment unit 52 transmits the determined restoration intensity magnification U to the restoration multiplier 43 and transmits the sharpening intensity magnification V to the sharpening multiplier 47. The restoration intensity magnification U and the sharpening intensity magnification V are respectively intensity adjustment parameters in the restoration processing unit 38 and the contour enhancement processing unit 39, and the restoration multiplier 43 and the sharpening multiplier 47 performs multiplication processing using the restoration intensity magnification U and the sharpening intensity magnification V sent from the automatic intensity adjustment unit 52.

The automatic intensity adjustment unit 52 acquires the frequency characteristic of the filter to be used by each of the point image restoration filter processing unit 42 and the contour enhancement filter processing unit 46. For example, the restoration filter X to be used by the point image restoration filter processing unit 42 is sent from the restoration filter selection unit 53 to the automatic intensity adjustment unit 52. Furthermore, the automatic intensity adjustment unit 52 acquires the sharpening filter to be used by the contour enhancement filter processing unit 46 by an arbitrary method. For example, in a case where the sharpening filter to be used by the contour enhancement filter processing unit 46 is fixed, the automatic intensity adjustment unit 52 may acquire the frequency characteristic of the sharpening filter by storing the frequency characteristic of the sharpening filter in advance. The sharpening filter to be used may be transmitted from the contour enhancement filter processing unit 46 to the automatic intensity adjustment unit 52, and the automatic intensity adjustment unit 52 may acquire the frequency characteristic of the sharpening filter by analyzing the received sharpening filter. The automatic intensity adjustment unit 52 takes the frequency characteristics of the filters to be used by the point image restoration filter processing unit 42 and the contour enhancement filter processing unit 46 into consideration when determining the restoration intensity magnification U and the sharpening intensity magnification V based on a total sharpness evaluation value described below. Specifically, the automatic intensity adjustment unit 52 reflects the frequency characteristic of each filter to the total sharpness evaluation value and determines the restoration intensity magnification U and the sharpening intensity magnification V based on the total sharpness evaluation value reflecting the frequency characteristics of the filters.

The determination of the restoration intensity magnification U and the sharpening intensity magnification V in the automatic intensity adjustment unit 52 can be performed, for example, according to the following flow.

First, the imaging setting conditions S are acquired by the camera body controller 28, and the restoration filter X corresponding to the imaging setting conditions S is selected by the restoration filter selection unit 53. Furthermore, the sharpening intensity magnification V0 in a case when the point image restoration processing is off is selected by the contour enhancement intensity selection unit 54 according to the imaging setting conditions S.

The restoration filter X is designed so as to minimize the degree of image deterioration based on the PSF of the optical system (the lens 16 or the like) corresponding to the imaging setting conditions S by a least-squares standard, and an ideal frequency characteristic of the restoration filter X can be designed by Wiener filter characteristics. In this example, after the ideal frequency characteristic of the restoration filter X is determined, an FIR filter reflecting the frequency characteristic is determined as the restoration filter X. The restoration filter X may be any of an actual space filter and a frequency space filter, and in a case where the restoration filter X is constituted of an actual space filter having a plurality of taps, it is preferable that an FIR filter which is approximated to the best within a range in which the ideal frequency characteristic can be realized by a desired number of taps is determined as the restoration filter X. In general, since the shape of the PSF is different depending on the image height, it is preferable that the restoration filter X has a different frequency characteristic according to the image height in the image. Accordingly, a set having a plurality of restoration filters determined according to the intra-image positions is called the "restoration filter X" in a broad sense, and a restoration filter which is applied to the position (pixel) of the coordinates (i,j) in the image is represented as "$X_{i,j}$".

As described above, while the restoration filter X is determined based on the imaging setting conditions S in capturing image data, the imaging setting conditions S can include "setting conditions affecting the point spread function" and "imaging conditions not affecting the point spread function". The "setting conditions" can include, for example, at least one of diaphragm information, zoom information, object distance information, or lens type information of the optical system. The "imaging conditions" can include at least one of imaging sensitivity information or imaging mode information.

The imaging setting conditions S can be input to the restoration filter selection unit 53 and the contour enhancement intensity selection unit 54 by an arbitrary system, and the imaging setting conditions S are appropriately transmitted from a control processing unit (not shown), which manages the imaging setting conditions S, out of the device control unit 34 and the image processing unit 35 of the camera body controller 28 to the restoration filter selection unit 53 and the contour enhancement intensity selection unit 54.

The point image restoration recovery rate G is designated by the user in advance before image processing in the restoration processing unit 38 and the contour enhancement processing unit 39. The designation method of the point image restoration recovery rate G by the user is not particularly limited, and for example, adjustment means, such as a slider or the like for designating the point image restoration recovery rate G is displayed on the user interface 29 (rear display unit or the like), the can easily determine the point image restoration recovery rate G by performing an operation through the adjustment means. The point image restoration recovery rate G is basic data for controlling the restoration intensity magnification U of the point image restoration processing by the restoration multiplier 43. For example, excluding a case where the value of the point image restoration recovery rate G is greater than a predetermined threshold value, the restoration intensity magnification U and the point image restoration recovery rate G are equal (restoration intensity magnification U=point image restoration recovery rate G). A case where the point image restoration recovery rate G is 0 (zero) corresponds to that the point image restoration processing is off. The restoration intensity magnification U in the point image restoration processing may change so as to take a continuous value, may change so as to take a discrete value, or may change according to the on/off state (a predetermined magnification or "0 (zero)"), and a processing circuit or the like which can change the restoration intensity magnification U by an arbitrary system can be mounted.

A way of determining the point image restoration recovery rate G is not limited to the designation by the user, and the point image restoration recovery rate G may be calculated and determined based on arbitrary information. That is, the sharpening and recovery control unit 37 (automatic intensity adjustment unit 52) may determine the point image restoration recovery rate (restoration rate) G based on the designated recovery rate designated by the user, or may use the point image restoration recovery rate G determined based on optical characteristic information representing the characteristics of the optical system. The "optical characteristic information" used herein can include type information of the lens 16 in the optical system, individual difference information of the optical system, other imaging setting conditions, and the like. The point image restoration recovery rate G itself reflecting the optical characteristics of the optical system may be included in the "optical characteristic information". The optical characteristic information is stored in an arbitrary storage unit, and for example, the optical characteristic information may be stored in a storage unit (optical system storage unit) of the lens unit 12, or the optical characteristic information may be stored in a storage unit (body storage unit) of the camera body 14. Accordingly, in the sharpening and recovery control unit 37 (camera body controller 28) or the like, the point image restoration recovery rate G may be determined based on the optical characteristic information stored in the storage unit (the optical system storage unit or the body storage unit).

The value of the point image restoration recovery rate G may depend on the imaging setting conditions S, or the point image restoration recovery rate G of a different value may be selected by the sharpening and recovery control unit 37 (camera body controller 28) or the like according to the imaging setting conditions S. In this case, for example, in order to suppress artifact, the degree of occurrence of which changes depending on the F number, the point image restoration recovery rate G may be intentionally set to be relatively low at a specific F number (imaging setting conditions S).

The brightness information Q is information relating to the brightness of the input image (source image data) acquired by the brightness information acquisition unit 40. The automatic intensity adjustment unit 52 acquires the brightness information Q from the brightness information acquisition unit 40 and adjusts the calculated restoration intensity magnification U and the sharpening intensity magnification V described below according to the brightness information Q.

The frequency characteristic of a filter to be used in the contour enhancement filter processing unit 46 (a filter for extracting a contour enhancement component in the sharpening processing) is referred to as "$\varphi(\omega_x,\omega_y)$", and the frequency characteristic of a restoration filter $X_{i,j}$ (a filter for extracting a restoration component in the point image restoration processing) is referred to as "$x_{i,j}(\omega_x,\omega_y)$". In this case, the frequency characteristic of the entire image processing system shown in FIG. 17 in which the restoration processing unit 38 and the contour enhancement processing unit 39 (the point image restoration processing and the sharpening processing) are combined is represented by Expression 1 described below.

$$F(\omega_x,\omega_y|U,V,x_{i,j})=[1+U\times x_{i,j}(\omega_x,\omega_y)]\times[1+V\times\varphi(\omega_x,\omega_y)] \quad \text{(Expression 1)}$$

"$F(\omega_x,\omega_y|U,V,x_{i,j})$" indicates a function on $(\omega_x,\omega_y)$ (frequencies relating to x direction and y direction) with the restoration intensity magnification U, the sharpening intensity magnification V, and the frequency characteristic $x_{i,j}$ as parameters, and this function is determined depending on the configuration of the image processing system.

The intensity adjustment of the point image restoration processing (the determination of the restoration intensity magnification U for use in the restoration multiplier 43) is carried out so as to maintain a total sharpness evaluation value (total sharpening and restoration rate) $C(U,V,x_{i,j})$ defined by Expression 2 described below at a constant value.

$$C(U, V, x_{i,j}) = \sum_{i,j} \int\int w_{i,j}(\omega_x, \omega_y) F(\omega_x, \omega_y | U, V, x_{i,j}) d\omega_x d\omega_y \quad \text{(Expression 2)}$$

"$w_{i,j}(\omega_x,\omega_y)$" is an arbitrary weighting defined for each intra-image position (pixel position) (i,j), and the total sharpness evaluation value (total sharpness evaluation function) $C(U,V,x_{i,j})$ is defined by weighting calculation of the frequency characteristics of the entire system. It is preferable that the weighting function $w_{i,j}(\omega_x,\omega_y)$ is designed so as to become a great value in a visually significant frequency component and/or intra-image position. With the use of the total sharpness evaluation value $C(U,V,x_{i,j})$ defined by Expression 2 described above, even if the intensity of the point image restoration processing is changed, the degree of frequency enhancement is not changed and great divergence of sharpness does not occur in a frequency band and/or intra-image position of interest. In a frequency band and/or intra-image position where the weighting function $w_{i,j}(\omega_x,\omega_y)$ is comparatively small, a difference in image quality due to the point image restoration processing is likely to be conspicuous.

In light of the above, the values of the restoration intensity magnification U and the sharpening intensity magnification V can be determined as follows. That is, the value of the restoration intensity magnification U is determined based on the point image restoration recovery rate G input to the automatic intensity adjustment unit 52 by a monotone increasing function, and then, the value of the sharpening intensity magnification V is determined such that the total sharpness evaluation value $C(U,V,x_{i,j})$ is maintained at a constant value. Accordingly, the automatic intensity adjustment unit 52 carries out adjustment such that, if the value of the restoration intensity magnification U becomes great, the value of the sharpening intensity magnification V become small, and if the value of the restoration intensity magnification U becomes small, the value of the sharpening intensity magnification V becomes great. However, if the value of the restoration intensity magnification U is excessively great, even if the value of the sharpening intensity magnification V is set to zero "0", there can be a case where the total sharpness evaluation value $C(U,V,x_{i,j})$ is not maintained constant. That is, there can be a restriction on the range of the restoration intensity magnification U in which the total sharpness evaluation value $C(U,V,x_{i,j})$ can be maintained constant.

If an upper limit value of the restoration intensity magnification U is represented as "$U_{MAX}$", since the total sharpness evaluation value $C(U,V,x_{i,j})$ satisfies the relationship of "$C(U_{MAX},0,x_{i,j})=C(0,V0,x_{i,j})$", a maximum value of the restoration intensity magnification U is restricted as shown in Expression 3 described below.

$$U = \begin{cases} G & (G \le U_{MAX}) \\ U_{MAX} & \text{otherwise} \end{cases} \quad \text{(Expression 3)}$$

Expression 3 described above indicates that, in a case where the point image restoration recovery rate G is equal to or less than the upper limit value $U_{MAX}$ of the restoration intensity magnification U, the point image restoration recovery rate G is set as the restoration intensity magnification U (U=G), and in a case where the point image restoration recovery rate G exceeds the upper limit value $U_{MAX}$ of the restoration intensity magnification U, the upper limit value $U_{MAX}$ of the restoration intensity magnification U is set as the restoration intensity magnification U ($U=U_{MAX}$).

The value of the sharpening intensity magnification V is calculated by searching for the sharpening intensity magnification V for which the total sharpness evaluation value satisfies the relationship of "$C(U,V,x_{i,j})=C(0,V0,x_{i,j})$" in the image processing system of FIG. 17. This is equal to determination of a solution of a linear equation, and the automatic intensity adjustment unit 52 easily determines the sharpening intensity magnification V. The difficulty of calculation of the sharpening intensity magnification V depends on the definition of a frequency characteristic $Fa(\omega_x,\omega_y|U,V,x_{i,j})$ of the entire system. In a case where the frequency characteristic $Fa(\omega_x,\omega_y|U,V,x_{i,j})$ becomes a nonlinear function and it is difficult to search for the sharpening intensity magnification V for which the above-described equation is strictly established, formulation of using the sharpening intensity magnification V for which the total sharpness evaluation value $C(U,V,x_{i,j})$ is closest to the total sharpness evaluation value $C(0,V0,x_{i,j})$ may be performed.

It is possible to calculate the restoration intensity magnification U and the sharpening intensity magnification V for maintaining the total sharpness evaluation value $C(U,V,x_{i,j})$ constant by a series of processing described above.

As described above, since the restoration intensity magnification U and the sharpening intensity magnification V are determined based on the total restoration sharpness (total sharpness evaluation value), variation in sharpness of an image (output image) subjected to the point image restoration processing and the sharpening processing is suppressed, and it is possible to stabilize overall resolution or image quality in the output image.

In particular, the total sharpness evaluation value is determined such that weighting becomes great in a visually principal frequency band and/or intra-image position, whereby the restoration intensity and the sharpening intensity are maintained constant in the visually principal frequency band and/or intra-image position, and divergence of sharpness is prevented from being excessively large.

Although the point image restoration processing can realize high-accuracy image recovery processing according to the PSF of the optical system, artifact is likely to occur according to the imaging scene or the imaging conditions, and the degree of influence on image quality is high. Accordingly, as in this embodiment, the restoration intensity magnification U (restoration rate) of the point image restoration processing is preferentially set, thereby effectively improving overall resolution or image quality. For example, it is possible to make artifact or ringing, which can occur according to the imaging scene or the like, inconspicuous and to improve sharpness through the sharpening processing by setting the restoration rate (the point image restoration recovery rate G and the restoration intensity magnification U) to be low.

The control of the intensity adjustment parameters of the two kinds of image processing (the point image restoration processing and the sharpening processing) generally requires control of "two variables (restoration intensity and sharpening intensity)", and the degree of freedom for control becomes "2". However, according to the intensity enhancement processing of this embodiment, the required degree of freedom for control becomes "1", and it is possible to determine appropriate restoration intensity and sharpening intensity (the restoration intensity magnification U and the sharpening intensity magnification V) only by determining the point image restoration recovery rate G.

<Adjustment of Restoration Rate and Sharpening Rate according to Brightness Information>

In the embodiment of the invention, the restoration intensity magnification U and the sharpening intensity magnification V determined in the above-described manner are further adjusted according to the brightness information Q. That is, the automatic intensity adjustment unit 52 increases or decreases the restoration intensity magnification U or increases or decreases the sharpening intensity magnification V according to the brightness information Q of the source image. Hereinafter, a specific example where the automatic intensity adjustment unit 52 adjusts the restoration intensity magnification U and the sharpening intensity magnification V according to the brightness information Q will be described.

FIRST EXAMPLE

In a first example, the automatic intensity adjustment unit 52 adjusts the restoration intensity magnification U and the sharpening intensity magnification V according to "the brightness values of the respective pixels constituting the source image and the distribution of the brightness values" as the brightness information Q.

Figure 18:
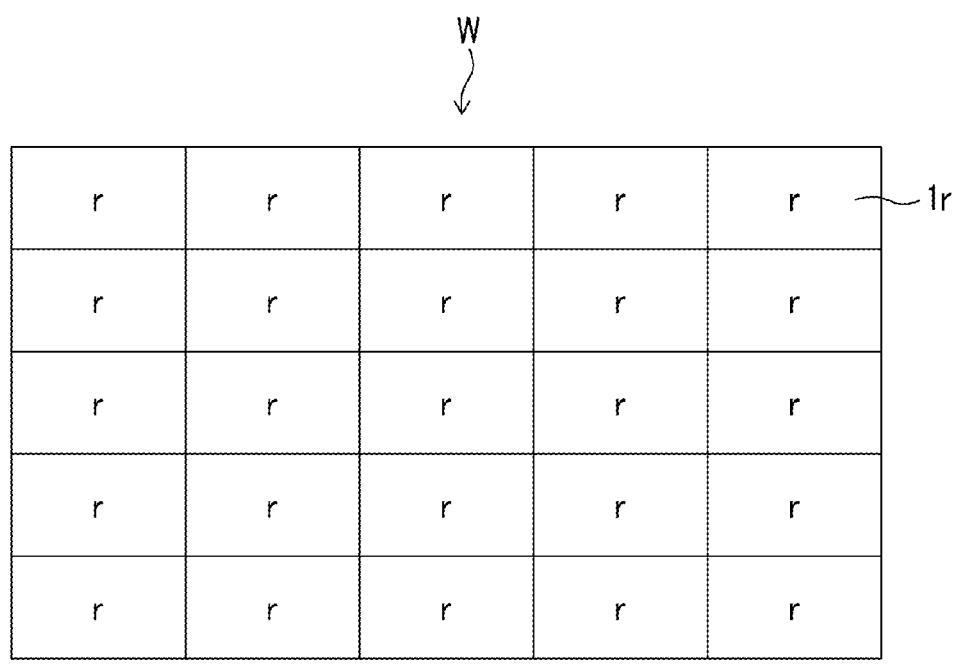
FIG. 18 is a conceptual diagram illustrating adjustment of a restoration rate and a sharpening rate for each region of an image.

FIG. 18 is a conceptual diagram illustrating adjustment of the restoration intensity magnification U and the sharpening intensity magnification V for each region of a source image Q. The source image W has equally divided 5×5 regions r. The source image W has a region r (indicated by reference numeral 1r) (hereinafter, referred to as a region r (reference numeral 1r)) where "the brightness value of the region r determined from the pixel values in the region r" is high. "The brightness value of the region r determined from the pixel values in the region r" can be determined by various methods. For example, "the brightness value of the region r determined from the pixel values in the region r" may be set to the total sum of the brightness values determined from the pixel values in the region r, or may be set to the average of the pixel values in the region r.

The brightness information acquisition unit 40 acquires information relating to the region r (reference numeral 1r) as the brightness information Q of the source image W. For example, the brightness information Q is the brightness value of the region r(1r), positional information of the region r(1r) in the source image W, or the like. The brightness information acquisition unit 40 sends the acquired brightness information Q to the automatic intensity adjustment unit 52.

For example, the automatic intensity adjustment unit 52 decreases the restoration intensity magnification U and increases the sharpening intensity magnification V according to the sent brightness information Q. That is, the automatic intensity adjustment unit 52 adjusts a restoration magnification for the region r(1r) of the source image W to be smaller than the restoration intensity magnification U and adjusts the sharpening intensity magnification for the region r(1r) of the source image W to be greater than the sharpening intensity magnification V. In this case, the automatic intensity adjustment unit 52 adjusts the restoration intensity magnification U and the sharpening intensity magnification V according to the brightness information Q so as to maintain the total sharpening and restoration intensity constant.

In this way, the automatic intensity adjustment unit 52 adjusts the restoration intensity magnification U and the sharpening intensity magnification V for each region r of the source image W according to the brightness information Q, whereby in this aspect, it is possible to prevent image quality deterioration due to the restoration processing on a region [region r(1r)] where the brightness value is high.

Figure 19:
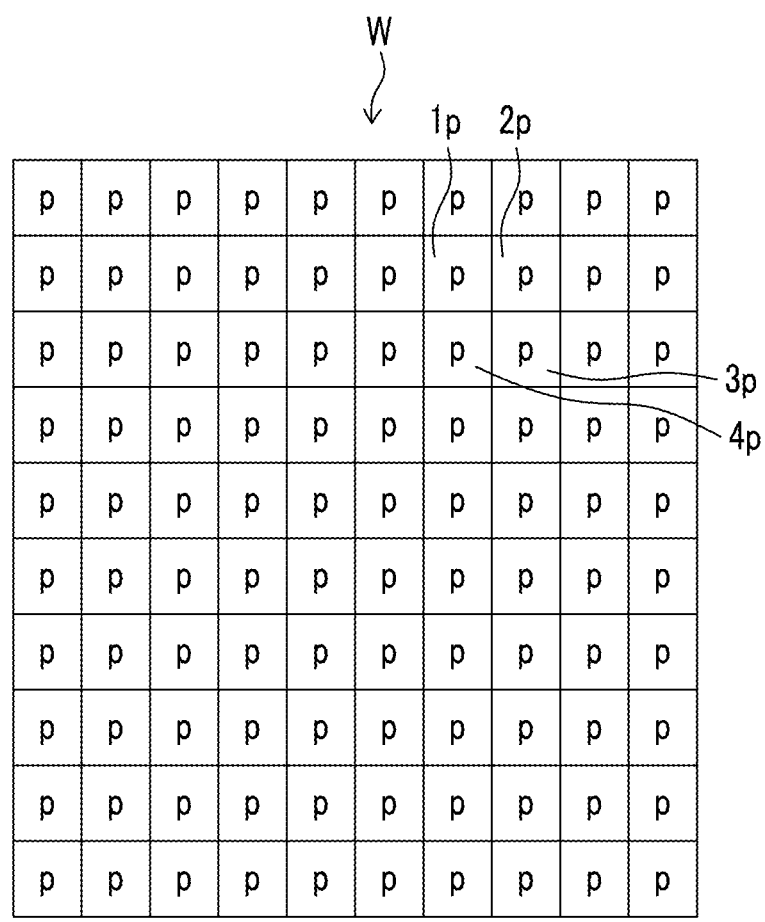
FIG. 19 is a conceptual diagram illustrating adjustment of a restoration rate and a sharpening rate for each pixel of an image.

FIG. 19 is a conceptual diagram illustrating adjustment of the restoration intensity magnification U and the sharpening intensity magnification V for each pixel of a source image W. The source image W is constituted of 10×10 pixels p. The source image W has pixels p (indicated by reference numerals 1p to 4p) where the brightness value is high. FIG. 19 is just for illustration, and the number of pixels constituting the image shown in the drawing is smaller than that of an actual image.

The brightness information acquisition unit 40 acquires information relating to pixels having a high brightness value as the brightness information Q of the source image W. Thereafter, the brightness information acquisition unit 40 sends the acquired brightness information Q to the automatic intensity adjustment unit 52. For example, the brightness information Q is positional information of pixels having a high brightness value, the distribution of the brightness values of the respective pixels, or the like. The brightness information Q may be information (positional information of a saturated pixel, or the like) of a saturated pixel obtained from the brightness values. The saturated pixel is a pixel in which the pixel value (brightness value) indicates the maximum number of gradations, for example, 255 in 8-bit data.

The automatic intensity adjustment unit 52 adjusts the restoration intensity magnification U and the sharpening intensity magnification V according to the brightness information Q similarly to a case of adjusting the restoration intensity magnification U and the sharpening intensity magnification V for each region described above. In a case where a pixel is a pixel having a very high brightness value like a saturated pixel, the automatic intensity adjustment unit 52 may determine "not to perform the restoration processing". In this case, the automatic intensity adjustment unit 52 adjusts the sharpening rate so as to maintain the total sharpening and restoration rate constant.

In this way, the automatic intensity adjustment unit 52 adjusts the restoration intensity magnification U and the sharpening intensity magnification V of the brightness value of each pixel according to the brightness information Q, whereby it is possible to prevent image quality deterioration due to the restoration processing on a pixel having a high brightness value. The automatic intensity adjustment unit 52 adjusts the restoration rate and the sharpening rate so as to maintain the total sharpening and restoration rate constant, the occurrence of a sense of discomfort with image blur or the like is suppressed.

SECOND EXAMPLE

In a second example, the automatic intensity adjustment unit 52 may adjust at least one of the restoration intensity magnification U or the sharpening intensity magnification V for the pixel values of the saturated pixel and the pixels in the periphery of the saturated pixel according to "information of the saturated pixel" as the brightness information Q.

Figure 20:
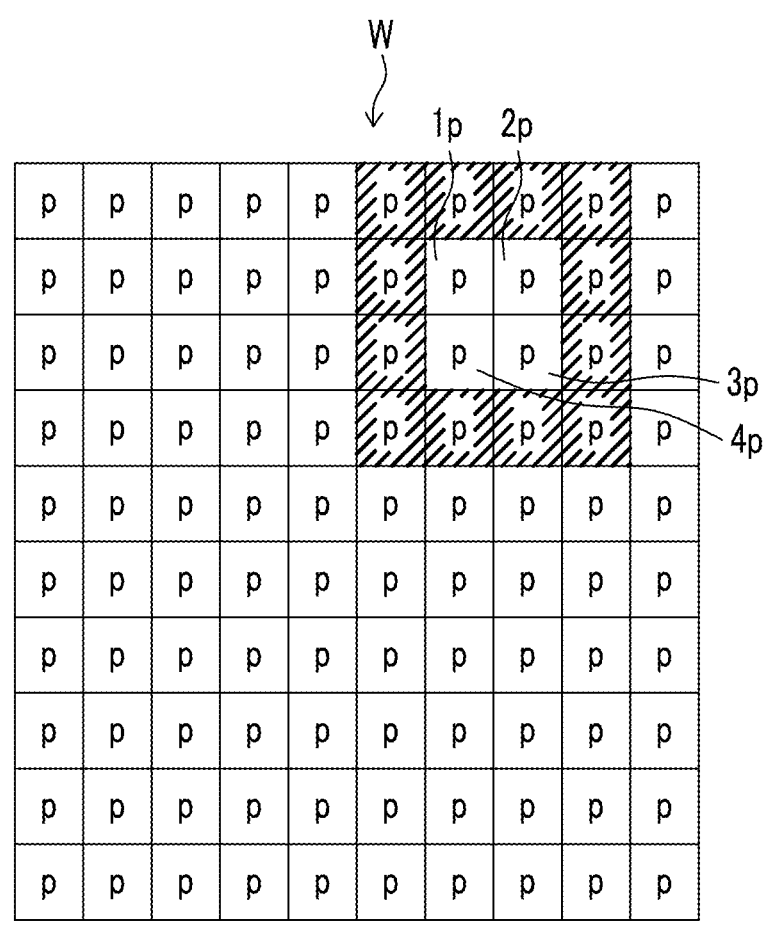
FIG. 20 is a conceptual diagram illustrating adjustment of a restoration rate and a sharpening rate in a saturated pixel and pixels in the periphery of the saturated pixel.

FIG. 20 is a conceptual diagram illustrating adjustment of the restoration intensity magnification U and the sharpening intensity magnification V in the saturated pixel and the pixels in the periphery of the saturated pixel. In FIG. 20, the pixels p (reference numerals 1p to 4p) of the source image W of FIG. 19 are indicated as saturated pixels, and the pixels in the periphery of the saturated pixels (1p to 4p) are indicated by oblique lines.

The brightness information acquisition unit 40 acquires information of the saturated pixels as the brightness information Q. The brightness information acquisition unit 40 may acquire the brightness values of the pixels in the periphery of the saturated pixel as the brightness information Q. As a range of the pixels in the periphery of the saturated pixels, a range of a pixel region of about two times of the number of taps of the restoration filter may be determined, a range of a pixel region of the number of taps of the restoration filter may be applied, or a range of a pixel region half the number of taps of the restoration filter may be set.

The automatic intensity adjustment unit 52 decreases the restoration intensity magnification U and increases the sharpening intensity magnification V according to the sent brightness information Q. That is, the automatic intensity adjustment unit 52 adjusts at least one of the restoration intensity magnification U or the sharpening intensity magnification V for the pixel values of the saturated pixels (1p to 4p) and the pixels in the periphery of the saturated pixels according to information of the saturated pixels. For example, the automatic intensity adjustment unit 52 adjusts the restoration intensity magnification U to ⅓ for the pixel values of the saturated pixels (1p to 4p) and adjusts the restoration intensity magnification U to ⅔ for the pixel values of the pixels in the periphery of the saturated pixels (1p to 4p). In this case, the automatic intensity adjustment unit 52 adjusts the sharpening intensity magnification V so as to maintain the total sharpening and restoration rate constant. The automatic intensity adjustment unit 52 may adjust the sharpening intensity magnification V similarly.

The restoration intensity magnification U and the sharpening intensity magnification V are adjusted in this way, whereby it is possible to realize smooth image processing without giving a sense of discomfort with change, such as image blur.

THIRD EXAMPLE

In a third example, the automatic intensity adjustment unit 52 adjusts the restoration intensity magnification U and the sharpening intensity magnification V according to "a histogram of the brightness values" or "a median value of the histogram of the brightness values" as the brightness information Q. That is, in the third example, the automatic intensity adjustment unit 52 adjusts the restoration intensity magnification U and the sharpening intensity magnification V according to the imaging scene where the source image is captured. Hereinafter, the adjustment of the restoration intensity magnification U and the sharpening intensity magnification V according to the imaging scene will be described.

In a case where image data (imaging scene) inclines toward the high brightness side to be bright as a whole, the proportion of a high brightness region in the entire image comparatively increases, and an image region where the deviation of matching with the point spread function of the optical system is great increases. Accordingly, in the point image restoration processing for image data inclining toward the high brightness side, a region where overcorrection or the like occurs increases comparatively and image degradation is likely conspicuous in an entire image.

In this way, image data of a scene inclining toward the high brightness side as a whole after the gamma correction processing has a great pixel ratio on the high brightness side on which the deviation of matching with the point spread function is great. If the point image restoration processing using "the restoration filter corresponding to antilogarithm (image data before the gamma correction processing)" where the deviation of matching with the point spread function is great is applied to such image data, image quality deterioration due to the point image restoration processing is likely to be more conspicuous. In addition, since such image data has a small pixel ratio on the low brightness side, beneficial effects of "the point image restoration processing using the restoration filter corresponding to image data before the gamma correction processing for image data after the gamma correction processing" may be weakened.

Figure 21:
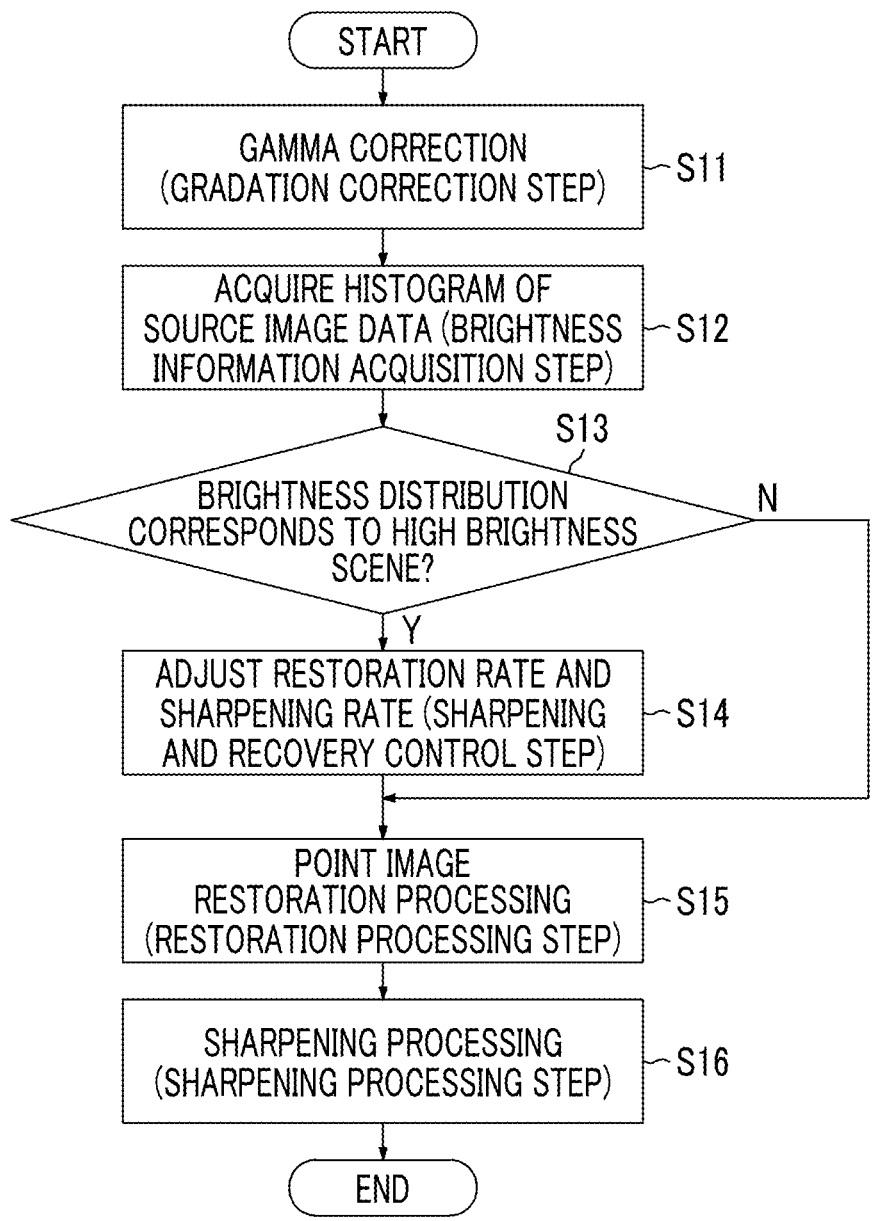
FIG. 21 is a flowchart showing the flow of image processing including point image restoration processing in a third example.

FIG. 21 is a flowchart showing the flow of image processing including the restoration processing in the third example. Prior to the restoration processing, the gamma correction processing is performed for source image data in the image processing unit 35 (gamma correction processing unit 33) (S11 of FIG. 21: gradation correction step). Source image data after the gamma correction processing is input to the sharpening and recovery unit 36, and the histogram of the brightness values of source image data after the gamma correction processing is acquired by the brightness information acquisition unit 40 (S12: brightness information acquisition step).

The automatic intensity adjustment unit 52 of the sharpening and recovery control unit 37 determines whether or not source image data after the gamma correction processing satisfies a brightness state of a high brightness scene (highlight scene) based on "the histogram of the brightness values of source image data" or "the median value of the histogram of the brightness values" as the brightness information Q (S13).

"The brightness state of the high brightness scene" is a state in which the brightness state of image data inclines toward the high brightness side, and refers to a state in which image quality deterioration (overcorrection or the like) is likely to occur or is likely conspicuous in a case where the restoration processing is performed. Accordingly, the determination method of the high brightness scene can be defined from various viewpoints. The details of "the determination method of the high brightness scene" will be described below.

In a case where source image data satisfies the brightness state of the high brightness scene (Yes in S13), the automatic intensity adjustment unit 52 of the sharpening and recovery control unit 37 adjusts the restoration intensity magnification U and the sharpening intensity magnification V (S14: sharpening and recovery control step). Thereafter, the restoration processing based on the restoration intensity magnification U after adjustment is performed in the restoration processing unit 38, and the sharpening processing is performed in the contour enhancement processing unit 39 (S15 and S16). Specifically, in a case where source image data is in the brightness state of the high brightness scene, the automatic intensity adjustment unit 52 adjusts the restoration intensity magnification U to be lower than in a case where source image data does not satisfy the brightness state of the high brightness scene. The sharpening intensity magnification V is adjusted so as to maintain the total sharpening and restoration rate constant. Although FIG. 21 shows an example where the restoration intensity magnification U in a case where source image data is in the brightness state of the high brightness scene, the automatic intensity adjustment unit 52 may control the restoration intensity magnification U such that the restoration processing is not performed on source image data in a case where source image data is in the brightness state of the high brightness scene.

In a case where source image data is not in the brightness state of the high brightness scene (No in S13), the automatic intensity adjustment unit 52 of the sharpening and recovery unit 36 does not adjust the restoration intensity magnification U and the sharpening intensity magnification V, the restoration processing is performed by the restoration processing unit 38, and the sharpening processing is performed by the contour enhancement processing unit 39 (S15 and S16).

As described above, in the third example, the automatic intensity adjustment unit 52 determines the imaging scene of the source image according to "the histogram of the brightness values" or "the median value of the histogram of the brightness values", and adjusts the restoration intensity magnification U and the sharpening intensity magnification V. With this, it is possible to prevent image quality deterioration due to the point image restoration processing on image data of the high brightness scene.

<High Brightness Scene>

Next, the relationship between brightness of image data and image quality deterioration (overcorrection or the like) due to the point image restoration processing will be described.

Figure 22:
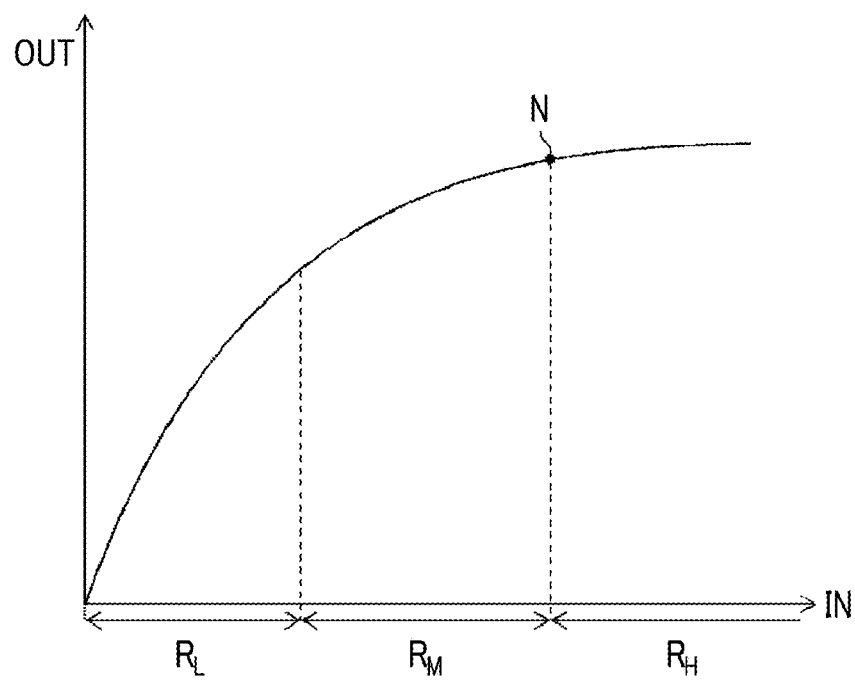
FIG. 22 is a diagram (graph) showing an example of the relationship between pre-processing data and post-processing data by the gamma correction processing (gradation processing in the logarithmic processing), and is, in particular, a diagram illustrating a region where image quality deterioration due to overcorrection or the like is likely to occur.

FIG. 22 is a diagram (graph) showing an example of the relationship between pre-processing data and post-processing data through the gamma correction processing (logarithmic processing), and in particular, is a diagram illustrating a region where image quality deterioration due to overcorrection or the like is likely to occur. The horizontal axis of FIG. 22 indicates data before the gamma correction processing (gamma correction processing input data "IN"), and the vertical axis indicates data after the gamma correction processing (gamma correction processing output data "OUT"). Reference numeral "$R_L$" of FIG. 22 indicates a low brightness region, reference numeral "$R_M$" indicates an intermediate brightness region, and reference numeral "$R_H$" indicates a high brightness region (highlight region). A gamma correction processing gradation curve indicated by a solid line in the graph of FIG. 22 is just an example, and the distinction of the low brightness region $R_L$, the intermediate brightness region $R_M$, and the high brightness region $R_H$ indicates just a relative relationship, and a specific position of each region should not be interpreted uniquely.

A region where image quality deterioration due to overcorrection or the like is likely to occur due to the point image restoration processing exists in the high brightness region $R_H$ rather than the low brightness region $R_L$ and the intermediate brightness region $R_M$ in consideration of the gamma correction processing characteristics. For example, in the high brightness region $R_H$ where a brightness signal (Y) component in a case where image data is represented by a brightness signal (Y)/a color difference signal (CrCb) has a value equal to or greater than 80% with respect to the highest brightness value, image quality deterioration due to the point image restoration processing is likely conspicuous. However, in actual gamma correction processing, since a unique gamma correction processing gradation curve is applied to each brightness region (low brightness region, intermediate brightness region, high brightness region, and the like), a range in which image quality deterioration due to the point image restoration processing is conspicuous may fluctuate according to the gamma correction processing characteristics. For example, it is possible to perform gamma correction processing based on a gamma correction processing gradation curve which "improves appearance of noise by suppressing the gain amount of the gamma correction processing in the low brightness region, enhances a modulation feeling by increasing the gain amount of the gamma correction processing in the intermediate brightness region, and moderates a change in gradation by suppressing the gain amount of the gamma correction processing in the high brightness region". In a case where the gamma correction processing based on the gamma correction processing gradation curve is performed, it may be determined that image quality deterioration (overcorrection or the like) due to the point image restoration processing is likely more conspicuous in a region on the high brightness side than a point (knee point: see reference numeral "N" of FIG. 22) where the gain amount of the gamma correction processing is suppressed in order to moderate a change in gradation in the high brightness region.

<Restoration Processing Control based on Proportion of High Brightness Region>

Figure 23:
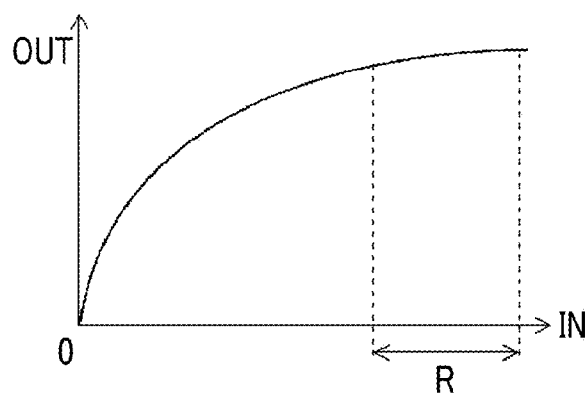
FIG. 23 shows an example of the relationship between pre-processing data and post-processing data by the gamma correction processing (gradation processing in the logarithmic processing).
Figure 24:
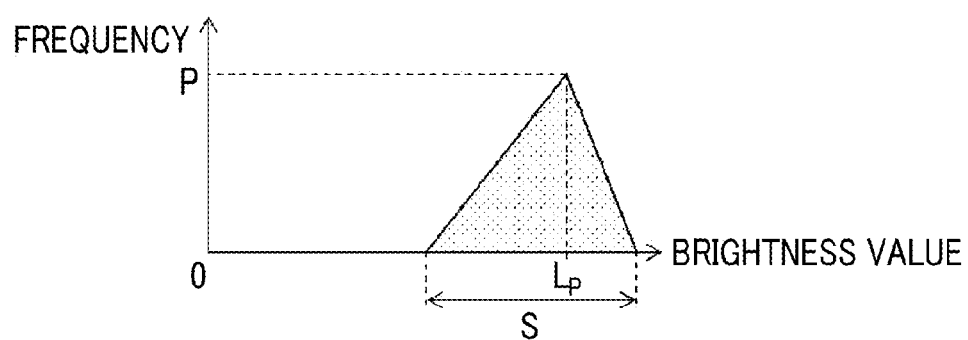
FIG. 24 is a diagram showing a brightness distribution example in image data.
Figure 25:
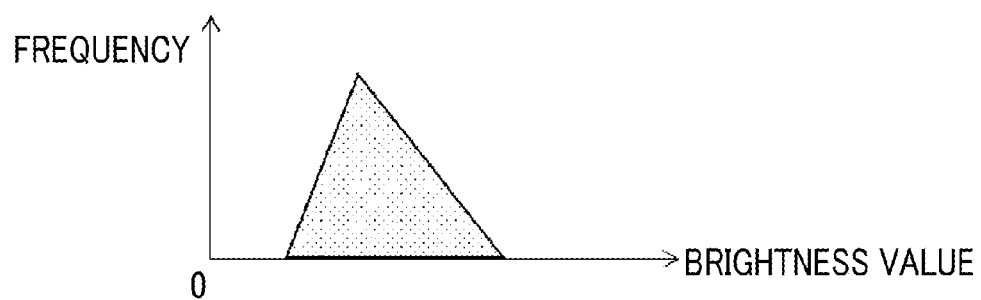
FIG. 25 is a diagram showing a brightness distribution example in image data.

FIGS. 23 to 25 are diagrams showing a brightness region where image quality deterioration (overcorrection or the like) due to the point image restoration processing is likely to occur and the brightness distribution of image data. FIG. 23 is a diagram (graph) showing an example of the relationship between pre-processing data and post-processing data through the gamma correction processing (the logarithmic processing), the horizontal axis thereof indicates data before the gamma correction processing (gamma correction processing input data "IN"), and the vertical axis thereof indicates data after the gamma correction processing (gamma correction processing output data "OUT"). FIGS. 24 and 25 respectively show a brightness distribution example of source image data, FIG. 24 shows a brightness distribution example where image quality deterioration (overcorrection or the like) due to the point image restoration processing is likely to occur, and FIG. 25 shows a brightness distribution example where image quality deterioration (overcorrection or the like) due to the point image restoration processing hardly occurs. In FIGS. 24 and 25, the horizontal axis indicates a brightness value, indicates a great brightness value (high brightness) toward the right side on the paper surface, and indicates a small brightness value (low brightness) toward the left side. In FIGS. 24 and 25, the vertical axis indicates frequency, indicates a high appearance frequency of a corresponding brightness value in source image data toward the upper side on the paper surface, and indicates a low appearance frequency of a corresponding brightness value toward the lower side.

As described above, in the high brightness region indicated by reference numeral "R" of FIG. 23, image quality deterioration (overcorrection or the like) due to the point image restoration processing is likely to occur. Accordingly, as shown in FIG. 24, in a case where the brightness distribution of source image data inclines toward the high brightness region, image quality deterioration (overcorrection or the like) due to the point image restoration processing is likely conspicuous. For this reason, for example, even in a case where it is determined by a spot type automatic exposure (AE) mechanism (a face recognition type automatic exposure mechanism (face AE) or the like) that a specific region of an image does not incline toward the high brightness side, in a case where source image data has a brightness distribution inclining toward the high brightness side as the entire image, image quality deterioration (overcorrection or the like) due to the point image restoration processing is likely conspicuous. However, according to this embodiment, even in image data in which image quality deterioration (overcorrection or the like) due to the point image restoration processing is likely conspicuous, the restoration intensity of the point image restoration processing is lowered or the point image restoration processing is not performed, and it is possible to effectively prevent image quality deterioration (overcorrection or the like) due to the point image restoration processing.

As shown in FIG. 25, in a case where the brightness distribution of source image data does not incline toward the high brightness side, image quality deterioration (overcorrection or the like) due to the point image restoration processing is hardly conspicuous. According to this embodiment, a normal point image restoration processing is performed for image data in which image quality deterioration (overcorrection or the like) due to the point image restoration processing is hardly conspicuous, and it is possible to obtain recovered image data with image quality recovered satisfactorily.

<Specific Example of High Brightness Scene>

In this example, as described above, the adjustment of the restoration intensity is controlled according to whether or not source image data inclines toward the high brightness side (that is, whether or not source image data corresponds to a high brightness scene), and image quality deterioration (overcorrection or the like) due to the point image restoration processing is effectively prevented. Determination regarding whether or not source image data inclines toward the high brightness side (that is, whether or not source image data corresponds to a high brightness scene) can be performed based on the brightness distribution (distribution of brightness) in which image quality deterioration is likely to occur or is likely conspicuous due to the point image restoration processing.

Specifically, as the determination method of whether or not source image data inclines toward the high brightness side (that is, whether or not source image data corresponds to a high brightness scene), a method based on "whether or not a brightness value of a frequency peak position of the brightness distribution (distribution of brightness) of source image data is equal to or greater than a threshold value (first threshold value)", "the proportion of brightness values equal to or greater than the first threshold value in the brightness distribution (distribution of brightness) of source image data is equal to or greater than a second threshold value", or the like is considered.

For example, the sharpening and recovery control unit 37 (automatic intensity adjustment unit 52) can control the point image restoration processing by controlling the restoration rate (restoration intensity magnification) based on the brightness value (see reference numeral "$L_p$" of FIG. 24) indicating the peak (see reference numeral "P" of FIG. 24) of the frequency in the brightness distribution indicating the frequency per brightness of pixels constituting source image data. Specifically, in a case where the brightness value indicating the peak of the frequency in the brightness distribution indicating the frequency per brightness of the pixels constituting source image data is equal to or greater than a threshold value (first threshold value), the sharpening and recovery control unit 37 (automatic intensity adjustment unit 52) may determine that source image data satisfies the brightness state of the high brightness scene.

In this way, in the determination based on "whether or not the brightness value of the frequency peak position of the brightness distribution (distribution of brightness) of source image data is equal to or greater than the threshold value (first threshold value)", a value corresponding to about 80% of the highest brightness value may be set as the threshold value used herein. For example, in a case where the brightness value can be expressed in 256 gradations of 0 to 255, the brightness value "205" corresponding to about 80% of the highest brightness value can be used as the threshold value. Accordingly, the sharpening and recovery control unit 37 (automatic intensity adjustment unit 52) may determine that source image data corresponds to a high brightness scene "in a case where the brightness value of the frequency peak position of the brightness distribution of source image data is equal to or greater than "205"", and may determine that source image data does not correspond to a high brightness scene "in a case where the brightness value of the frequency peak position of the brightness distribution of source image data is less than "205"".

For example, the sharpening and recovery control unit 37 (automatic intensity adjustment unit 52) may control the point image restoration processing by controlling the restoration rate (restoration intensity magnification) based on the proportion of pixels equal to or greater than a first brightness value in the brightness distribution indicating the frequency per brightness of the pixels constituting source image data. Specifically, the sharpening and recovery control unit 37 (automatic intensity adjustment unit 52) may determine that source image data satisfies the brightness state of the high brightness scene in a case where the proportion of the pixels having a brightness value equal to or greater than the first threshold value in the brightness distribution indicating the frequency per brightness of the pixels constituting source image data is equal to or greater than the second threshold value.

In this way, in the determination based on "whether or not the proportion of the brightness values equal to or greater than the first threshold value in the brightness distribution (distribution of brightness) of source image data is equal to or greater than the second threshold value", a value corresponding to about 80% of the highest brightness value can be used as the first threshold value, and a value corresponding to about 50% of the total number of pixels can be used as the second threshold value. For example, in a case where the brightness value can be expressed in 256 gradations of 0 to 255, the brightness value "205" corresponding to about 80% of the highest brightness value may be used as the first threshold value, and the number of pixels which is 50% of the total number of pixels constituting source image data may be used as the second threshold value. Accordingly, the sharpening and recovery control unit 37 (automatic intensity adjustment unit 52) may determine that source image data corresponds to a high brightness scene "in a case where the proportion of pixels having the brightness value equal to or greater than "205" in the brightness distribution of source image data is equal to or greater than 50% of the number of pixels of the entire image" and may determine that source image data does not correspond to a high brightness scene "in a case where the proportion of pixels having the brightness value equal to or greater than "205" in the brightness distribution of source image data is less than 50% of the number of pixels of the entire image".

Second Embodiment

In this embodiment, description of the same configuration and action as the first embodiment described above will not be repeated.

Figure 26:
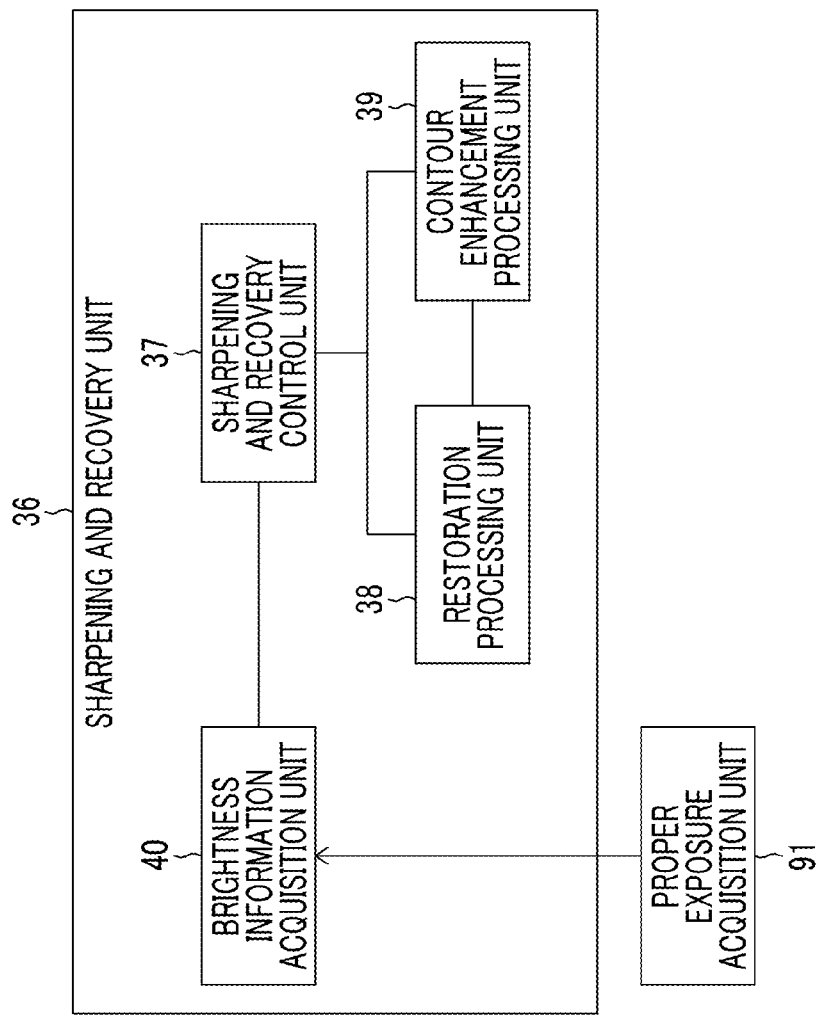
FIG. 26 is a functional block diagram showing an example of a sharpening and recovery unit according to a second embodiment.

FIG. 26 is a functional block diagram showing an example of the sharpening and recovery unit 36 according to the second embodiment.

The brightness information acquisition unit 40 of this embodiment acquires "imaging exposure information" as the brightness information Q.

The sharpening and recovery control unit 37 performs control such that the restoration processing unit 38 and the contour enhancement processing unit 39 control the point image restoration processing and the sharpening processing based on the imaging exposure information (imaging exposure) acquired by the brightness information acquisition unit 40. Specifically, the sharpening and recovery control unit 37 performs control such that the restoration processing unit 38 and the contour enhancement processing unit 39 control the point image restoration processing and the sharpening processing based on the difference between a proper exposure acquired by a proper exposure acquisition unit 91 and the imaging exposure.

The "imaging exposure information" used herein is an imaging exposure, the imaging exposure is an exposure at the time of imaging with the digital camera (imaging device) 10, and is a value which can fluctuate according to imaging conditions (a F number, a shutter speed) for acquiring source image data.

The "proper exposure" is an exposure which is estimated to be proper, and may be determined according to a photometry mode using an exposure meter (not shown). The proper exposure is acquired by the proper exposure acquisition unit 91 using an arbitrary method. For example, in a case where the proper exposure is determined in advance, the proper exposure determined in advance may be stored in a memory (not shown) and the proper exposure may be read and acquired as necessary. In a case where the proper exposure fluctuates according to the imaging conditions or the like, the proper exposure may be calculated and acquired by the proper exposure acquisition unit 91. Information of the acquired proper exposure is sent from the proper exposure acquisition unit 91 to the brightness information acquisition unit 40.

The exposure meter is not particularly limited, and an exposure meter may be embedded in the camera body 14, like a through the lens (TTL) type exposure meter, or an exposure meter may be externally mounted on the camera body 14. A reflected light type exposure meter which measures reflected light of an object may be used, or an incident light type exposure meter which measures light other than reflected light of an object may be used. Furthermore, the photometry mode is not particularly limited, and a multi-division photometry mode in which photometry is performed over the entire image, a centrally weighted average photometry mode in which photometry is performed in the central portion of the image with emphasis, a spot photometry mode in which photometry is performed based on an extremely narrow portion of an object, or other photometry modes may be used.

The brightness information acquisition unit 40 can acquire the imaging exposure using an arbitrary method. For example, in a case where the imaging exposure is stored in the memory (not shown), the imaging exposure may be acquired directly from the memory, or the imaging exposure may be calculated and acquired indirectly from data, such as source image data, a photometric value of the exposure meter, and the imaging conditions. In particular, since the imaging exposure is individually changeable by the user, for example, in a case where the user sets the shutter speed or the F number manually or in a case where the user sets or changes exposure setting (EV value) manually, the imaging exposure can be a value different from the proper exposure.

The proper exposure is a proper exposure which is derived from the viewpoint of preventing an image from being excessively dark or excessively bright. However, actually, there may be a case where the proper exposure is not necessarily a proper value due to various factors, and the proper exposure does not meet user's preference or needs. Accordingly, a function of allowing the user to change the imaging exposure is a function which is mounted in the digital camera 10 (the user interface 29, the camera body controller 28, or the like) in order to realize imaging according to user's preference or needs by complementing imperfection of the proper exposure.

In this way, in a case where the imaging exposure can be set to a value different from the proper exposure, if the imaging exposure is set such that the EV value becomes great (the image becomes bright), the image (source image data) obtained through imaging easily corresponds to the high brightness scene inclining toward the high brightness side.

In this embodiment, in a case where source image data is acquired with the imaging exposure such that captured image data (source image data) easily corresponds to the high brightness scene inclining toward the high brightness side, the restoration intensity of the point image restoration processing is lowered or the point image restoration processing is not performed, whereby image quality deterioration (overcorrection or the like) due to the point image restoration processing is prevented.

Specifically, the sharpening and recovery control unit 37 determines whether or not the difference between the imaging exposure for acquiring source image data and the proper exposure is equal to or greater than a threshold value (third threshold value), and controls the intensity of the restoration processing based on the determination result. The threshold value (third threshold value) used herein is appropriately determined according to whether or not there is a high possibility that an image inclining toward the high brightness side (an image corresponding to the high brightness scene) is captured, and can be determined by the relative magnitude of the imaging exposure with respect to the proper exposure.

For example, in a case where the difference between the imaging exposure and the proper exposure is equal to or greater than a threshold value $t3$ (third threshold value) ((imaging exposure−proper exposure)≥$t3$), the sharpening and recovery control unit 37 may perform control such that the restoration processing unit 38 performs the point image restoration processing such that the restoration intensity is weakened compared to a case where the difference between the imaging exposure and the proper exposure is less than the threshold value $t3$, and does not perform and skips the point image restoration processing.

Various kinds of processing of "point image restoration processing of normal restoration intensity", "point image restoration processing of weaker restoration intensity than normal", and "skipping of the point image restoration processing" may be switched according to the magnitude of the difference between the imaging exposure and the proper exposure. For example, the sharpening and recovery control unit 37 may perform control such that the restoration processing unit 38 performs "the point image restoration processing of normal restoration intensity" when the difference between the imaging exposure and the proper exposure is less than the threshold value $t3$ (third threshold value) ((imaging exposure−proper exposure)<$t3$), performs "the point image restoration processing of weaker restoration intensity than normal" when the difference between the imaging exposure and the proper exposure is equal to or greater than the threshold value $t3$ and less than another threshold value $t4$ (fourth threshold value; however, "$t4$>$t3$") ($t4$>(imaging exposure−proper exposure)≥$t3$), and "skips the point image restoration processing" when the difference between the imaging exposure and the proper exposure is equal to or greater than the threshold value $t4$ ($t4$≤(imaging exposure−proper exposure)).

"The difference between the imaging exposure and the proper exposure" may be based on the difference between the absolute values of the imaging exposure and the proper exposure, and may be based on other indexes indicating the difference between the absolute values of the imaging exposure and the proper exposure. As a setting form of the EV value, for example, there is a case where a plurality of stages of EV value candidates are determined on an overexposure side and/or an underexposure side based on the proper exposure, and the user can appropriately select the imaging exposure from among the EV value candidates. For example, there is a case where the EV value candidates of three stages (+1 to +3) on the overexposure side and three stages (−1 to −3) on the underexposure side are determined in addition to the proper exposure (0), and the user can appropriately select the imaging exposure from among the EV value candidates (+3 to −3). In this case, for example, the sharpening and recovery control unit 37 may perform control such that the restoration processing unit 38 performs "the point image restoration processing of normal restoration intensity" in a case where "+2" is set as the above-described threshold value t3 (third threshold value) and the EV value candidates (that is, "−3 to +1") less than "+2" are selected by the user, and performs "the point image restoration processing of weaker restoration intensity than normal" in a case where the EV value candidates (that is, "+2 to +3") equal to or greater than "+2" are selected by the user. Furthermore, for example, the sharpening and recovery control unit 37 may set "+1" as the threshold value t3 (third threshold value) and "+2" as the threshold value t4 (fourth threshold value), and similarly to the above-described form, may perform control such that the restoration processing unit 38 switches various kinds of processing of "the point image restoration processing of normal restoration intensity", "the point image restoration processing of weaker restoration intensity than normal", and "skipping of the point image restoration processing".

The threshold values (third threshold value and fourth threshold value) used for determining "whether or not source image data is acquired with the imaging exposure with which source image data is likely to correspond to the high brightness scene inclining toward the high brightness side" may be set in advance, may be individually set or changed by the user, or may be set or changed according to the imaging conditions, such as an imaging mode.

Figure 27:
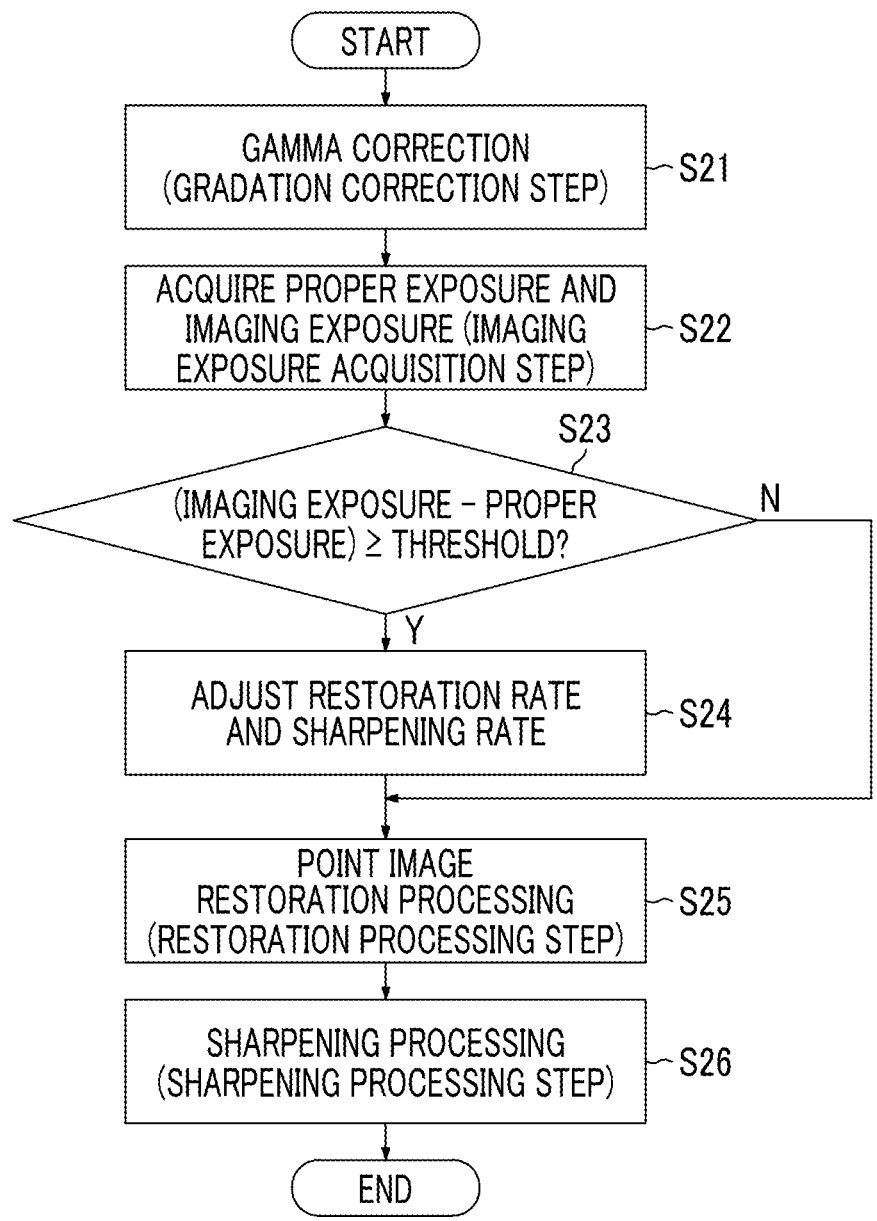
FIG. 27 is a flowchart showing the flow of image processing including point image restoration processing according to the second embodiment.

FIG. 27 is a flowchart showing the flow of image processing including the point image restoration processing according to the second embodiment. FIG. 27 shows a processing flow example when image quality deterioration (overcorrection or the like) due to the point image restoration processing is prevented by lowering the restoration intensity of the point image restoration processing in a case where the difference between the imaging exposure and the proper exposure is equal to or greater than the threshold value (third threshold value) compared to a case where the difference between the imaging exposure and the proper exposure is less than the threshold value (third threshold value), or skipping the point image restoration processing.

In this example, prior to the point image restoration processing, the gamma correction processing is performed for the source image data in the image processing unit (gamma correction processing unit 33) 35 (S21 of FIG. 27: gradation correction step).

Source image data after the gamma correction processing is input to the sharpening and recovery unit 36, the proper exposure is acquired by the proper exposure acquisition unit 91, and the imaging exposure is acquired by the brightness information acquisition unit 40 (S22: photographing exposure acquisition step).

The sharpening and recovery control unit 37 determines whether or not the difference between the imaging exposure and the proper exposure is equal to or greater than the threshold value (third threshold value) based on the acquired proper exposure and imaging exposure (S23). As described above, this step is a step of determining whether or not imaging is performed under a condition that source image data acquired through imaging is likely to correspond to the high brightness scene inclining toward the high brightness side, and the threshold value (third threshold value) as a determination criterion is appropriately determined.

In a case where the difference between the imaging exposure and the proper exposure is equal to or greater than the threshold value (third threshold value) (Yes in S23), the sharpening and recovery control unit 37 (automatic intensity adjustment unit 52) adjusts the restoration intensity of the point image restoration processing and the sharpening intensity of the sharpening processing (S24), the point image restoration processing based on the restoration intensity after adjustment is performed by the restoration processing unit 38 (S25), and the sharpening processing based on the sharpening intensity after adjustment is performed by the contour enhancement processing unit 39 (S26). Specifically, in a case where the difference between the imaging exposure and the proper exposure is equal to or greater than the threshold value (third threshold value), the sharpening and recovery control unit 37 controls the restoration intensity such that the restoration intensity by the point image restoration processing is lower than in a case where the difference between the imaging exposure and the proper exposure is smaller than the threshold value (third threshold value). The sharpening and recovery control unit 37 may perform control such that the restoration processing unit 38 does not perform the point image restoration processing on source image data in a case where the difference between the imaging exposure and the proper exposure is equal to or greater than the threshold value (third threshold value). The sharpening intensity is controlled such that the total sharpening and restoration rate is maintained constant in consideration of the adjusted restoration intensity.

In a case where the difference between the imaging exposure and the proper exposure is smaller than the threshold value (third threshold value) (No in S23), the sharpening and recovery control unit 37 does not adjust the restoration intensity of the point image restoration processing and the sharpening rate of the sharpening processing, point image restoration processing based on normal restoration intensity is performed by the restoration processing unit 38, and sharpening processing based on normal sharpening intensity is performed by the contour enhancement processing unit 39 (S25 and S26).

Third Embodiment

In this embodiment, the point image restoration recovery rate G reflecting the individual difference information of the lens unit (optical system) 12 mounted in the camera body 14 is input to the automatic intensity adjustment unit 52. Accordingly, the automatic intensity adjustment unit 52 determines the restoration intensity magnification U based on the optical characteristic information including the individual difference information of the optical system and the brightness information Q. The individual difference information is information of each individual lens, and refers to information for use in adjusting the restoration rate or the sharpening rate according to the individual difference of the lens. The individual difference information includes information relating to an error which can individually occur in the optical system due to a manufacturing error or the like. The individual difference information may indicate the individual difference directly or indirectly, and for example, a lot number or a serial number allocated to the optical system may be used as the individual difference information.

Figure 28:
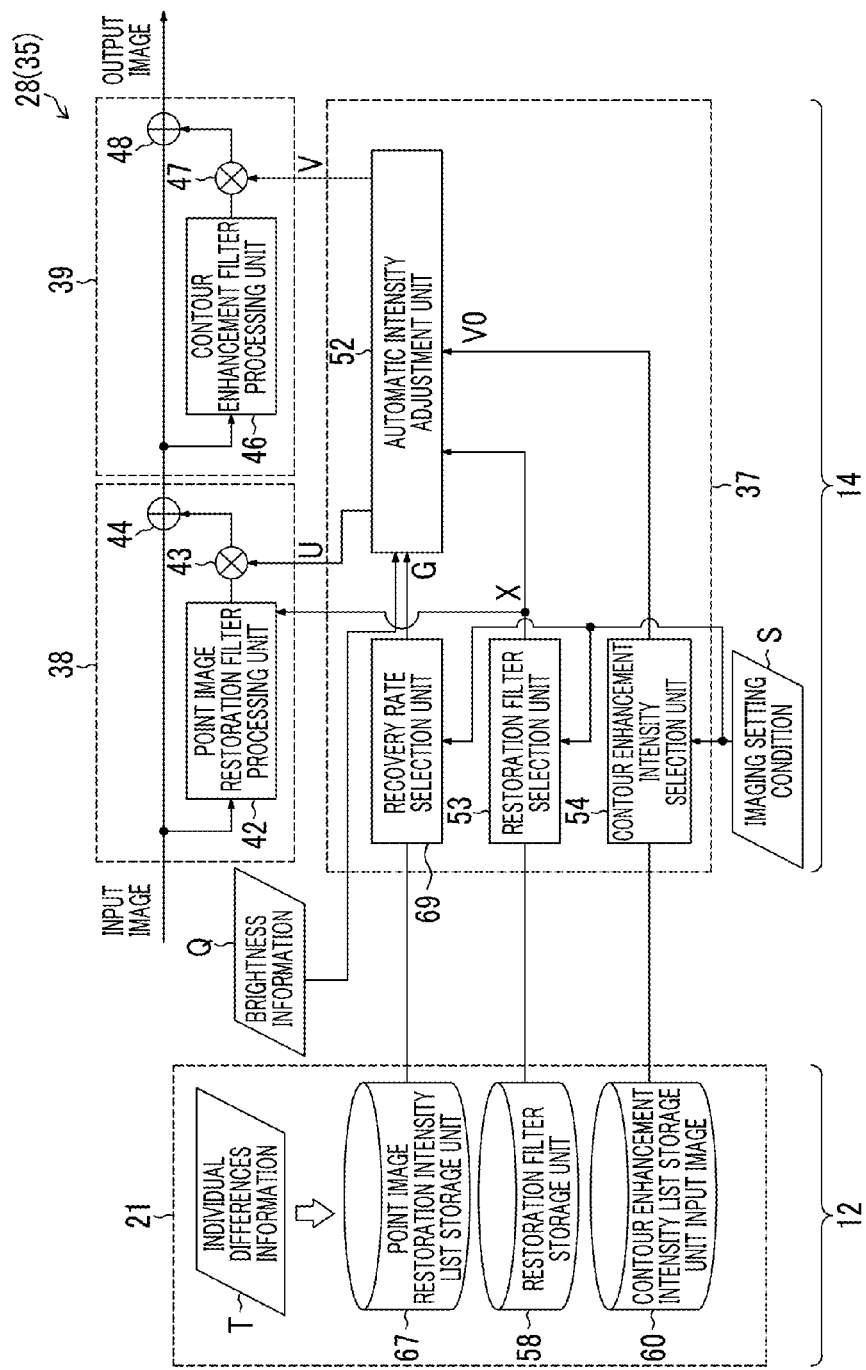
FIG. 28 is a diagram showing the configuration of a processing block for performing point image restoration processing and sharpening processing according to a third embodiment.

FIG. 28 is a diagram showing the configuration of a processing block for performing point image restoration processing and sharpening processing according to a third embodiment.

In this embodiment, the same configurations as those in the first embodiment shown in FIG. 17 are represented by the same reference numerals, and detailed description thereof will not be repeated.

The lens unit 12 (in particular, the optical system, such as the lens 16) has an individual difference regarding the optical characteristics due to a manufacturing error or the like, and the PSF is strictly different for each lens unit 12 depending on the individual difference. Accordingly, if the point image restoration processing is performed while neglecting the individual difference of the lens unit 12 (optical system), the degree of restoration may be different between images captured using the same kind of lens unit 12, and the appearance form of artifact may be different in the restored images.

Ideally, the point image restoration processing is performed based on the PSF truly reflecting the optical characteristics of the lens unit 12, and artifact does not occur in the restored image. However, actually, the influence of the PSF in an image to be processed does not match the PSF constituting the base of the restoration filter used in the point image restoration processing due to the individual difference of the lens unit 12, and artifact may occur in the restored image. As a method which prevents artifact caused by the individual difference, a method which suppresses the degree of restoration by setting the restoration intensity magnification U in the point image restoration processing to a small value is known; however, if the restoration intensity magnification U is made small, an image is not sufficiently restored and desired sharpness is not obtained. As a method which prevent degradation of sharpness, successive adjustment of the sharpening intensity magnification V for realizing desired total sharpness for each individual lens unit 12 is considered; however, such successive adjustment is an operation requiring a lot of effort and is inconvenient.

In this embodiment, the recovery intensity of the point image restoration processing is adjusted for each individual lens (optical system), and the determination of the restoration intensity magnification U and the sharpening intensity magnification V is automated.

That is, in this embodiment, the lens unit storage unit 21 includes the restoration filter storage unit 58 and the contour enhancement intensity list storage unit 60, and further includes a point image restoration intensity list storage unit 67. The point image restoration intensity list storage unit 67 stores the point image restoration recovery rate G specific to the lens unit 12 (optical system), and the point image restoration recovery rate G becomes a value reflecting individual difference information T of the lens unit 12. The restoration filter storage unit 58 also stores the restoration filter X according to the type of the lens unit 12 (optical system). The restoration filter X is used in common for the same type of lens unit 12 (optical system).

The point image restoration recovery rate G stored in the point image restoration intensity list storage unit 67 is read by a recovery rate selection unit 69 in the sharpening and recovery control unit 37 and is supplied to the automatic intensity adjustment unit 52. That is, the recovery rate selection unit 69 reads the point image restoration recovery rate G corresponding to the imaging setting conditions S from the point image restoration intensity list storage unit 67 and supplies the point image restoration recovery rate G to the automatic intensity adjustment unit 52. As in the first embodiment described above, the automatic intensity adjustment unit 52 determines the restoration intensity magnification U from the supplied point image restoration recovery rate G and determines the sharpening intensity magnification V based on the restoration intensity magnification U and the total sharpness evaluation value (total sharpening and restoration rate).

Other configurations are the same as those in the first embodiment shown in FIG. 17.

In this embodiment, since the restoration filter storage unit 58 is provided in the lens unit storage unit 21 (lens unit 12), if the lens unit 12 is replaced, the restoration filter selection unit 53 reads the restoration filter X from the restoration filter storage unit 58 of the new lens unit 12. For this reason, if the restoration filter X reflecting the PSF of the lens unit 12 (optical system) to be mounted is stored in the restoration filter storage unit 58, the restoration filter storage unit 58 which stores the restoration filter X reflecting the PSF of the lens unit 12 is mounted in each lens unit 12. Accordingly, even if a plurality of types of lens units 12 are mountable in the camera body 14, it is possible to supply the restoration filter X optimized for the mounted lens unit 12 to the point image restoration filter processing unit 42. In addition, according to this embodiment, since the point image restoration recovery rate G including the individual difference information T of the lens unit 12 (optical system) mounted in the camera body 14 is supplied to the automatic intensity adjustment unit 52, it is possible to prevent artifact due to PSF mismatching according to the individual difference of the optical system. In particular, in this embodiment, since the point image restoration recovery rate G reflecting the individual difference information T is stored in the lens unit storage unit 21 (lens unit 12), even if the lens unit 12 mounted in the camera body 14 is replaced, the restoration intensity magnification U and the sharpening intensity magnification V can be determined according to the point image restoration recovery rate G based on the individual difference information T of the lens unit 12 after replacement. Since the determined restoration intensity magnification U and sharpening intensity magnification V are used in the respective filter processing, it is possible to obtain desired total sharpness while performing the restoration processing reflecting the individual difference.

In the above-described embodiment, although the point image restoration intensity list storage unit 67, the restoration filter storage unit 58, and the contour enhancement intensity list storage unit 60 are provided in the lens unit 12, these storage units may be provided in the camera body 14. In a case where these storage units are provided in the camera body 14, it is preferable that data corresponding to the mounted lens unit 12 is downloaded from external equipment (a computer 92, a server 97, and the like) to the point image restoration intensity list storage unit 67, the restoration filter storage unit 58, and the contour enhancement intensity list storage unit 60.

In a case where the point image restoration intensity list storage unit 67, the restoration filter storage unit 58, and the contour enhancement intensity list storage unit 60 are provided in the camera body 14, the lens unit 12 sends the individual difference information T to the camera body 14 when being mounted in the camera body 14. Thereafter, as described above, the camera body 14 (sharpening and recovery control unit 37) adjusts the restoration intensity magnification U and the sharpening intensity magnification V using information stored in the point image restoration intensity list storage unit 67, the restoration filter storage unit 58, and the contour enhancement intensity list storage unit 60.

Fourth Embodiment

The image processing unit 35 of this embodiment further includes a nonlinear processing unit which performs nonlinear processing of image data, and nonlinear processing is introduced in a two-stage filter processing system (the restoration processing unit 38 and the contour enhancement processing unit 39). Although the nonlinear processing unit is included in at least one of the restoration processing unit 38 or the contour enhancement processing unit 39, in the following description, an example where the nonlinear processing unit is provided in the restoration processing unit 38 will be described.

In general, nonlinear processing is not constituted only of calculation processing of addition, subtraction, multiplication, and division, and can include, for example, processing accompanied by look-up table (LUT) reference or conditional branch. Nonlinear processing is often performed for the purpose of suppressing artifact or noise, and for example, "clip processing for adjusting a pixel value exceeding a clip threshold value in an image signal" may be performed as nonlinear processing.

FIG. 29 is a diagram showing the configuration of a processing block for performing point image restoration processing and sharpening processing according to a fourth embodiment.

In this embodiment, the same configurations as those in the first embodiment shown in FIG. 17 are represented by the same reference numerals, and detailed description thereof will not be repeated.

The point image restoration processing (restoration processing unit 38) of this example includes a series of processing including application of an enhancement magnification to a point image restoration enhancement component extracted by the restoration filter, application of nonlinear processing to the point image restoration enhancement component after the enhancement magnification application, and synthesis of the point image restoration enhancement component after the nonlinear processing and the source image.

That is, in this embodiment, image data (input image) is input to the point image restoration filter processing unit 42 and is subjected to filtering processing by the restoration filter, and increment/decrement data of image data by the point image restoration processing is calculated. Increment/decrement data is input to the restoration multiplier 43 and is subjected to gain control based on the restoration intensity magnification U, multiplication of increment/decrement data and the restoration intensity magnification U is performed, and increment/decrement data after multiplication is input to the nonlinear processing unit 65.

In the nonlinear processing unit 65, clip processing (nonlinear processing) is performed on input increment/decrement data, and a pixel value exceeding a predetermined clip threshold value in increment/decrement data (image data) is adjusted to the clip threshold value. The clip threshold value may be determined in advance and stored in the nonlinear processing unit 65, or the user may designate the clip threshold value through the user interface 29 directly or indirectly. Increment/decrement data of image data after the clip processing is added to image data (input image) before being input to the point image restoration filter processing unit 42 in the restoration adder 44, and image data after the point image restoration processing is calculated.

The clip processing which is performed by the nonlinear processing unit 65 is processing for restricting image data so as not to take a value equal to or greater than a clip threshold value θ (≥0) as shown in Expression 4 described below.

$$\text{CLIP}(x) = \begin{cases} x & (|x| < \theta) \\ \text{sign}(x) \times \theta & (|x| \geq \theta) \end{cases} \quad \text{(Expression 4)}$$

According to a clip processing function CLIP(x) represented by Expression 4 described above, in a case where the absolute value of image data (pixel data) x is smaller than the clip threshold value θ (|x|<θ), image data is held without being adjusted by the clip processing, and "x" is output from the nonlinear processing unit 65. In a case where the absolute value of image data x is equal to or greater than the clip threshold value θ (|x|≥θ), the signal component thereof is adjusted by a signum function in the clip processing, and "sign(x)×θ" is output from the nonlinear processing unit 65.

Other configurations are the same as those in the first embodiment shown in FIG. 17. For example, the filtering processing by the contour enhancement filter processing unit 46, the multiplication processing by the sharpening multiplier 47, and the addition processing by the sharpening adder 48 in the contour enhancement processing unit 39 are performed in the same manner as in the first embodiment.

In this example, as the frequency characteristic Fa($\omega_x$, $\omega_y$|U,V,$x_{i,j}$) in the entire system, a frequency characteristic which is obtained approximately based on an output in a case where a specific input waveform is input to the system (image processing unit 35) can be used. That is, in a case where there is an image processing unit performing nonlinear processing in a signal processing system, it is not possible to accurately determine the frequency characteristic of the signal processing system in principle, and there is a case where automatic intensity calculation processing of the restoration intensity magnification U and the sharpening intensity magnification V cannot be applied. Accordingly, in a case where nonlinear processing is performed, an internal frequency characteristic is evaluated approximately from an output waveform (output image data) with respect to a specific input waveform (input image data) whose frequency component is recognized in advance, and automatic calculation processing of the restoration intensity magnification U and the sharpening intensity magnification V may be performed using the frequency characteristic obtained by the approximate evaluation. In this case, it is necessary to determine the frequency characteristic Fa($\omega_x$,$\omega_y$|U,V,$x_{i,j}$) of the entire system, and a frequency response approximate expression of the system with respect to a specific input waveform is required to be expressed by a numerical expression. A specific approximate evaluation method is arbitrary, and the accuracy of the frequency response approximate expression of the system depends on a specific content of nonlinear processing.

As an example of the frequency response approximate expression of the system, in an image processing system including clip processing shown in FIG. 29, the inventors have empirically found that, in a case where an input waveform (image signal) whose characteristic is recognized in advance is used, it is assumed that the input waveform is a high-contrast step function, and as in the above-described embodiment, $w_{i,j}(\omega_x,\omega_y)$ is defined so as to have a specific value (total sharpness evaluation value) at a specific frequency f0 (see "Expression 4" described above), the frequency characteristic of the entire image processing system can be approximately represented by Expression 5 described below.

$$F(\omega_x,\omega_y|U,V)=[1+\min(U\times\psi(\omega_x,\omega_y),A]\times[1+V\times\Phi(\omega_x,\omega_y)] \quad \text{(Expression 5)}$$

In Expression 5 described above, "A" is a constant which depends on the clip threshold value θ and sharpness (degree of blur) of the input image signal. Furthermore, "min(U×ψ($\omega_x,\omega_y$),A)" is a function which indicates the smaller value of "U×ψ($\omega_x,\omega_y$)" and "A".

In this example, although the nonlinear processing unit 65 is provided in the restoration processing unit 38, the nonlinear processing unit may be provided only in the contour enhancement processing unit 39, or may be provided in both of the restoration processing unit 38 and the contour enhancement processing unit 39. However, if nonlinear processing is performed in both of the restoration processing unit 38 and the contour enhancement processing unit 39, there is a possibility that the frequency response approximate expression of the entire image processing system becomes complicated, and control for determining the restoration intensity magnification U and the sharpening intensity magnification V while maintaining the total sharpness evaluation value $C(U,V,x_{i,j})$ at a constant value becomes difficult.

The restoration filter used in the point image restoration processing (point image restoration filter processing unit 42) is designed on an assumption that the input image has the assumed frequency characteristic (blur characteristic). However, image data (input image) may have a frequency characteristic (false frequency characteristic) different from as assumed due to a nonlinear phenomenon and signal processing point image restoration processing in an optical system or an image processing system disposed in a pre-stage of the sharpening processing, and artifact may occur in an output image. In order to suppress such artifact, it is preferable to provided the nonlinear processing unit 65 in a post-stage of the filtering processing (point image restoration filter processing unit 42) by the restoration filter.

As described above, according to this embodiment, even in a case where the nonlinear processing is performed in the restoration processing unit 38 and/or the contour enhancement processing unit 39, it is possible to accurately determine the restoration intensity magnification U and the sharpening intensity magnification V. In particular, it is possible to effectively suppress artifact by performing the nonlinear processing.

Other Embodiments

The invention also includes an image processing method which is performed in the image processing device and the imaging device described above.

The invention also includes non-transitory computer readable recording medium storing a program which causes a computer to execute the image processing described above. The invention also includes a storage medium storing program codes.

As the storage medium for supplying the program codes, for example, a Floppy (Registered Trademark) disk, a hard disk, an optical disk, a magneto-optical disk, a CD-ROM, a CD-R, a magnetic tape, a nonvolatile memory card, a ROM, or the like can be used.

The computer executes the read program, thereby realizing the functions of the embodiments described above. The execution of the program also includes a case where an OS or the like running on the computer performs a part or the whole of actual processing based on an instruction of the program.

Next, an application example of the invention will be described below. Hereinafter, as a specific application example, a case where the invention is applied to a motion image, a case where the invention is applied to an EDoF system, and a case where the invention is applied to a smartphone will be sequentially described.

<Application Example to Motion Image>

The invention can also be applied to a motion image. In a case of applying the invention to a motion image, a restoration rate or sharpness is suppressed so as not to be largely changed between motion image frames with respect to change in the imaging condition during capturing of a motion image.

FIG. 30 is a diagram illustrating a "frame to be processed" and a "reference frame" among motion image frames in a time series.

During capturing of a motion image, an object is continuously imaged at a predetermined frame rate through the optical system (lens unit) 12 and the imaging element 26, and image data of a motion image having a plurality of continuous frames in a time series is acquired. The frame rate is the number of frames (the number of images or the number of video frames) per unit time, and is generally represented by the number of frames (unit: frame per second (fps)) generated for one second. For example, the digital camera 10 of this aspect generates 30 images for one second in a case where the frame rate is 30 fps, and generates 60 images for one second in a case where the frame rate is 60 fps.

The motion image has a plurality of continuous frames in a time series, and for example, has a meaning including a recorded motion image and a live view image.

FIG. 30 shows a case where restoration processing is performed on a frame (t) captured at the time t. In this case, the frame (t) becomes a frame to be processed. A frame (t−1) captured at the time t−1, a frame (t−2) captured at the time t−2, and a frame (t−3) captured at the time t−3 are frames (previous frames) before the frame to be processed in a time series. A frame (t+1) captured at the time t+1, a frame (t+2) captured at the time t+2, and a frame (t+3) captured at the time t+3 are frames (subsequent frames) after the frame to be processed in a time series. In FIG. 30, for convenience of description, although a case where only three frames are respectively described as the previous frames and the subsequent frames with respect to the frame to be processed, actually, there are multiple frames according to the imaging time.

The reference frame may include at least one frame of the subsequent frames. The reference frame may be single or plural. For example, in a case where the reference frame is single, the certain frame (t+1) in the subsequent frames of the frame to be processed (frame (t)) is selected as the reference frame. For example, in a case where the reference frame is plural, the subsequent frame (t+1) and the previous frame (t−1) of the frame to be processed (frame (t)) are selected.

In FIG. 30, the previous frame (t−1) is a frame immediately before the frame to be processed in a time series, and the subsequent frame (t+1) is a frame immediately after the frame to be processed in a time series. Such an immediately previous frame (frame (t−1)) or an immediately subsequent frame (frame (t+1)) may be selected as the reference frame.

As a method of selecting the reference frame from among a plurality of continuous frames in a time series, various methods are used. For example, as the method of selecting the reference frame, a method which allows the user to designate a method of selecting the reference frame with the user interface 29 in advance is considered. Furthermore, for example, the method of selecting the reference frame may be determined in advance.

The image processing unit 35 may have an imaging condition acquisition unit which acquires the imaging conditions (imaging information) of the frame to be processed or the reference frame. The imaging condition acquisition unit acquires the imaging conditions (imaging information)

of the frame to be processed or the reference frame and sends the imaging conditions to the sharpening and recovery control unit 37.

The sharpening and recovery control unit 37 adjusts the content of the restoration processing on the frame to be processed based on the imaging information of the reference frame acquired from the imaging condition acquisition unit. The sharpening and recovery control unit 37 adjusts the content of the restoration processing based on the imaging information of the reference frame by various methods in order to realize continuous restoration processing between the frames.

In addition, the sharpening and recovery control unit 37 can adjust the content of the restoration processing on the frame to be processed based on the imaging information of the reference frame and the imaging information of the frame to be processed acquired from the imaging condition acquisition unit. It is possible to perform continuous restoration processing between the frame to be processed and the reference frame and to perform restoration processing suitable for the frame to be processed by performing the restoration processing on the frame to be processed according to the imaging information of the frame to be processed and the imaging information of the reference frame.

Next, a method of adjusting the content of the restoration processing performed by the sharpening and recovery control unit 37 will be described according to a specific example.

The sharpening and recovery control unit 37 can adjust the content of the restoration processing based on a mode value regarding the imaging information including the imaging condition information of the reference frame.

FIG. 31 shows a case where a F number is given as the imaging condition information (imaging information) in each of the frame (t−3) to the frame (t+3) described in FIG. 30. Specifically, in the case shown in FIG. 31, the frame (t−3) is captured with a F number F2, the frame (t−2) is captured with the F number F2, the frame (t−1) is captured with the F number F2, the frame (t) is captured with a F number F2.8, the frame (t+1) is captured with the F number F2, the frame (t+2) is captured with the F number F2, and the frame (t+3) is captured with the F number F2.

A case where the frame to be processed is the frame (t−1) and the reference frames are the frame (t−3), the frame (t−2), the frame (t), and the frame (t+1) will be described. In this case, the frame (t−3), the frame (t−2), the frame (t−1), and the frame (t+1) are captured with the F number F2, and the frame (t) is captured with the F number F2.8. For this reason, the mode value of the F number as the imaging condition information becomes F2 in the frame to be processed and the reference frames. Then, in a case of performing the restoration processing on the frame to be processed (frame (t−1)), a restoration filter for a frame captured with the F number F2 is used.

Similarly, in a case where the frame to be processed is the frame (t) and the frame (t+1), the mode value of the F number of the five frames including the frame to be processed before and after the frame to be processed becomes F2, and in any frame to be processed, a restoration filter for a frame captured with the F number F2 is used.

FIG. 32 shows another example of selecting a reference frame. The frame (t−3) is captured with the F number F2, the frame (t−2) is captured with the F number F2, the frame (t−1) is captured with the F number F2, the frame (t) is captured with the F number F2.8, the frame (t+1) is captured with a F number F1.4, the frame (t+2) is captured with the F number F1.4, and the frame (t+3) is captured with the F number F1.4.

In a case where the frame (t−2), the frame (t−1), the frame (t+1), and the frame (t+2) are the reference frames, and the frame (t) is the frame to be processed, since the frame (t−2) and the frame (t−1) is captured with the F number F2, and the frame (t+1) and the frame (t−2) are captured with the F number F1.4, the mode value of the imaging condition information becomes two values of the F number F2 and the F number F1.4. In this case, since the imaging condition information of the frame to be processed is the F number F2.8, and the imaging condition information of the frame to be processed does not correspond to the mode value, the mode value (in this case, the F number F1.4) of the imaging condition information of the reference frame after the frame to be processed in a time series is used.

In a case where the frame (t−1) and the frame (t+3) are the reference frames, while the mode value of the imaging condition information becomes two values of F2 and F1.4, since the frame (t−1) is closer to the frame to be processed than the frame (t+3) in a time series, the F number F2 which is the imaging condition information of the frame (t−1) is used as the mode value.

Figure 33:
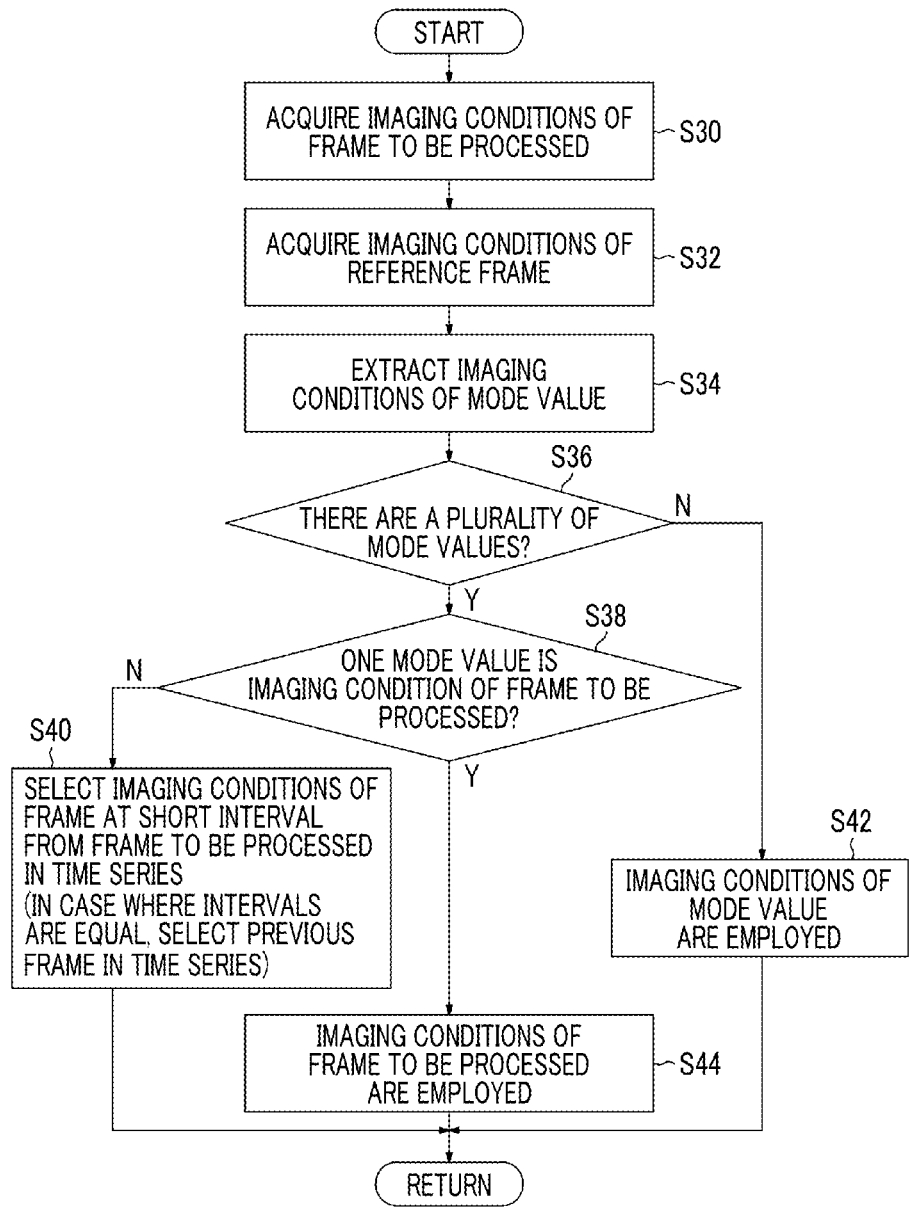
FIG. 33 is a diagram showing an operation flow of the restoration adjustment unit in a case of determining a mode value.

FIG. 33 is a diagram showing an operation flow in which the sharpening and recovery control unit 37 determines the mode value of the imaging condition information (imaging information) of the reference frame.

First, the sharpening and recovery control unit 37 acquires the imaging condition information of the frame to be processed (Step S30). Thereafter, the sharpening and recovery control unit 37 (restoration filter selection unit 53) acquires the imaging condition information of the reference frame (Step S32). The restoration filter selection unit 53 can acquire the imaging condition information of the frame to be processed by various methods, and for example, the restoration filter selection unit 53 can acquire the imaging condition information of the frame to be processed from the device control unit 34 (FIG. 2). The sharpening and recovery control unit 37 extracts the mode value in the imaging condition information of the reference frame (Step S34). The sharpening and recovery control unit 37 determines whether the mode value is single or plural, in a case where the mode value is single (in a case of No in Step S36), the imaging conditions of the mode value are used (Step S38), and the content of the restoration processing is adjusted.

In a case where the mode value is plural (in a case of Yes in Step S36), it is determined whether or not one of a plurality of mode values is the imaging condition information of the frame to be processed. In a case where one of a plurality of mode values is not the imaging condition information of the frame to be processed (in a case of No in Step S38), the sharpening and recovery control unit 37 selects the mode value of a frame close to the frame to be processed in a time series among a plurality of mode values (Step S40). In a case where any mode value among a plurality of mode values has the same interval as the frame to be processed in a time series, the sharpening and recovery control unit 37 selects a mode value including a frame before the frame to be processed in a time series (Step S40). In this way, the mode value including the frame before the frame to be processed in a time series is selected, whereby continuity on a time series is improved.

In a case where one of a plurality of mode values is the imaging condition information of the frame to be processed (in a case of Yes in Step S38), the sharpening and recovery control unit 37 uses the imaging condition information of the frame to be processed as the mode value (Step S44). Thereafter, the processing is performed on the next frame to be processed.

Next, another method of adjusting the content of the restoration processing performed by the sharpening and recovery control unit 37 will be described according to a specific example.

The sharpening and recovery control unit 37 (restoration filter selection unit 53) may determine the imaging condition information as described above based on the imaging condition information of the frame to be processed and the imaging condition information of the reference frame and may acquire a corresponding restoration filter from the restoration filter storage unit 58 by the determined imaging condition information, or may read a restoration filter corresponding to the imaging condition information of the frame to be processed and a restoration filter corresponding to the imaging condition information of the reference frame from the restoration filter storage unit 58 and may acquire a new restoration filter based on a plurality of read restoration filters. The restoration filter selection unit 53 can acquire a new restoration filter from the filter corresponding to the imaging condition information of the frame to be processed and the filter corresponding to the imaging condition information of the reference frame by various methods, and for example, can determine a new restoration filter by weighting and averaging a frame corresponding to the imaging condition information of the frame to be processed and a frame corresponding to the imaging condition information of the reference frame.

With this, change in the restoration filter applied to the frame to be processed is suppressed with respect to change in the imaging condition during capturing of a motion image, such that the restoration rate or sharpness is not largely changed between motion image frames.

<Application Example to EDoF System>

Although the restoration processing in the embodiments described above is image processing for recovering and correcting point spread (point image blur) according to specific imaging condition information (for example, a F number, a focal length, a lens type, a zoom magnification, and the like) to restore an original object image, image restoration processing to which the invention can be applied is not limited to the restoration processing in the embodiments described above. For example, the restoration processing according to the invention can also be applied to restoration processing on image data captured and acquired by an optical system (an imaging lens or the like) having an extended depth of field (focus) (EDoF). Image data of a blurred image captured and acquired in a state where the depth of field (depth of focus) is extended by the EDoF optical system is subjected to the restoration processing, whereby image data of high resolution in a focused state over a wide range can be restored and generated. In this case, the restoration processing is performed using a restoration filter based on a point spread function (PSF, OTF, MTF, PTF, or the like) of the EDoF optical system and having a filter coefficient set such that satisfactory image restoration can be performed within a range of an extended depth of field (depth of focus).

Hereinafter, an example of a system (EDoF system) relating to restoration of image data captured and acquired through the EDoF optical system will be described. In an example described below, although an example where a brightness signal (Y data) obtained from image data (RGB data) after demosaic processing is subjected to restoration processing will be described, the timing of the restoration processing is not particularly limited, and for example, "image data (mosaic image data) before demosaic processing" or "image data (demosaic image data) after demosaic processing and before brightness signal conversion processing" may be subjected to the restoration processing.

Figure 34:
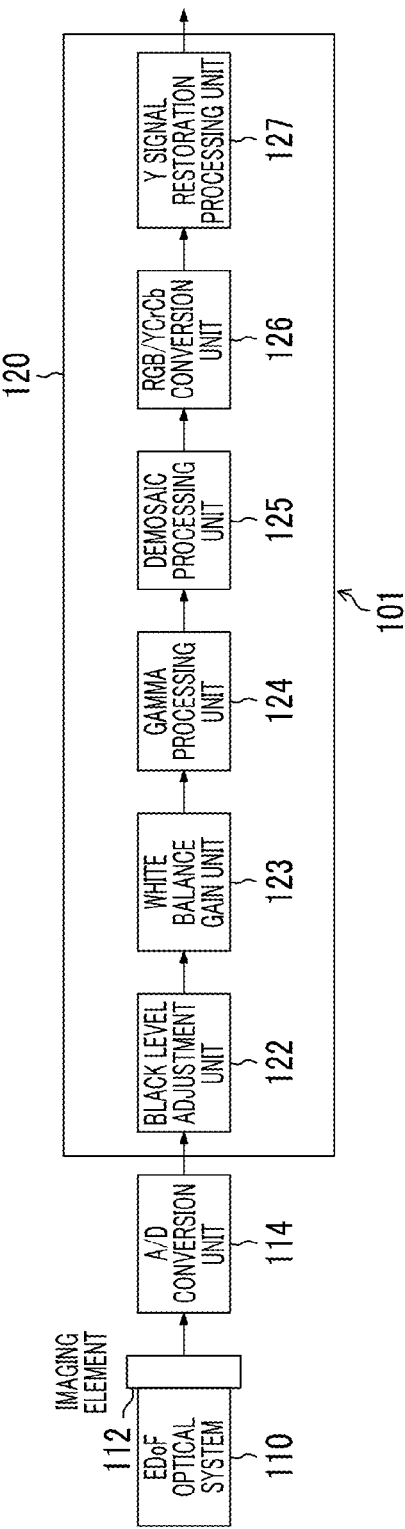
FIG. 34 is a block diagram showing a form of an imaging module comprising an EDoF optical system.

FIG. 34 is a block diagram showing a form of an imaging module 101 including an EDoF optical system. The imaging module (digital camera or the like) 101 of this example includes an EDoF optical system (lens unit) 110, an imaging element 112, an AD conversion unit 114, and a restoration processing block (image processing unit 35) 120.

Figure 35:
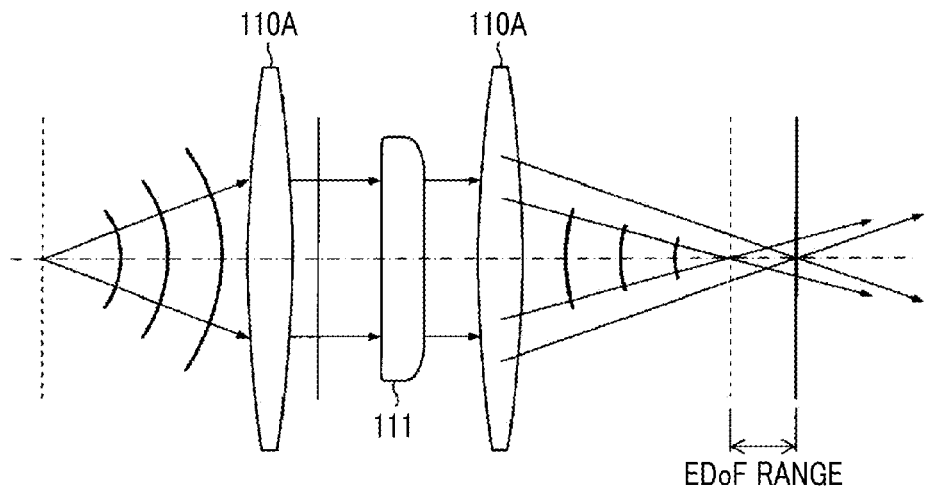
FIG. 35 is a diagram showing an example of the EDoF optical system.

FIG. 35 is a diagram showing an example of an EDoF optical system 110. The EDoF optical system 110 of this example has a single-focus fixed imaging lens 110A, and an optical filter 111 which is arranged at a pupil position. The optical filter 111 modulates a phase, and makes the imaging lens 110A constituting the EDoF optical system 110 have an extended depth of field such that an extended depth of field (depth of focus) (EDoF) is obtained. In this way, the imaging lens 110A and the optical filter 111 constitute a lens unit which modulates a phase to extend a depth of field.

The EDoF optical system 110 includes other components as necessary, and for example, a diaphragm (not shown) is provided near the optical filter 111. The optical filter 111 may be one sheet or may be constituted by combining a plurality of sheets. The optical filter 111 is only an example of optical phase modulation means, and the EDoF of the EDoF optical system 110 (the imaging lens 110A) may be implemented by other means. For example, instead of providing the optical filter 111, the EDoF of the EDoF optical system 110 may be implemented by the imaging lens 110A designed to have the same function as the optical filter 111 of this example.

That is, the EDoF of the EDoF optical system 110 can be implemented by various means for changing the wavefront of imaging on the light receiving surface of the imaging element 112. For example, "an optical element with a variable thickness", "an optical element with a variable refractive index (a refractive index distribution type wavefront modulation lens or the like)", "an optical element with a variable thickness or refractive index coating on the lens surface or the like (a wavefront modulation hybrid lens, an optical element formed on the lens surface as a phase plane, or the like)", or "a liquid crystal element capable of modulating a phase distribution of light (a liquid crystal spatial phase modulation element or the like)" may be used as EDoF means of the EDoF optical system 110. In this way, the invention can be applied to not only a case where image formation can be performed to be regularly dispersed by an optical wavefront modulation element (the optical filter 111 (phase plate)), but also a case where the same dispersed images as the case of using the optical wavefront modulation element can be formed by the imaging lens 110A itself without using the optical wavefront modulation element.

The EDoF optical system 110 shown in FIG. 35 can be reduced in size since a focus adjustment mechanism which performs focus adjustment mechanically can be omitted, and can be suitably mounted in a camera-equipped mobile phone or a mobile information terminal portable.

An optical image after passing through the EDoF optical system 110 having the EDoF is formed on the imaging element 112 shown in FIG. 34 and is converted to an electrical signal here.

The imaging element 112 is constituted of a plurality of pixels arranged in a matrix by a predetermined pattern array (Bayer array, G stripe R/G full checkered pattern, X-Trans (Registered Trademark) array, honeycomb array, or the like), and each pixel includes a microlens, a color filter (in this example, an RGB color filter), and a photodiode. An optical image incident on the light receiving surface of the imaging element 112 through the EDoF optical system 110 is converted to a signal charge in the amount according to the amount of incident light by each photodiode arranged on the light receiving surface. The signal charge of R, G, and B accumulated in each photodiode is sequentially output as a voltage signal (image signal) for each pixel.

The AD conversion unit 114 converts the analog R, G, and B image signals output from the imaging element 112 for each pixel to digital RGB image signals. The digital image signals converted to the digital image signals by the AD conversion unit 114 are applied to the restoration processing block 120.

The restoration processing block 120 includes, for example, a black level adjustment unit 122, a white balance gain unit 123, a gamma processing unit (gamma correction processing unit) 124, a demosaic processing unit 125, an RGB/YCrCb conversion unit 126, and a Y signal restoration processing unit 127.

The black level adjustment unit 122 subjects the digital image signals output from the AD conversion unit 114 to black level adjustment. For the black level adjustment, a known method may be used. For example, in a case of focusing on a certain effective photoelectric conversion element, the average of signals for dark current amount acquisition corresponding to a plurality of OB photoelectric conversion elements included in a photoelectric conversion element line including the effective photoelectric conversion element is determined, and the black level adjustment is performed by subtracting the average from the signal for dark current amount acquisition corresponding to the effective photoelectric conversion element.

The white balance gain unit 123 performs gain adjustment according to a white balance gain of each of the color signals of RGB included in the digital image signals with adjusted black level data.

The gamma processing unit 124 performs gamma correction to perform gradation correction, such as halftone, such that the R, G, and B image signals subjected to the white balance adjustment have desired gamma characteristics.

The demosaic processing unit 125 subjects the R, G, and B image signals after gamma correction to demosaic processing. Specifically, the demosaic processing unit 125 subjects the R, G, and B image signals to color interpolation processing to generate a set of image signals (R signal, G signal, and B signal) output from the respective light receiving pixels of the imaging element 112. That is, although a pixel signal from each light receiving pixel is one of the R, G, and B image signals before color demosaic processing, a set of three pixel signals of R, G, and B signals corresponding to each light receiving pixel is output after color demosaic processing.

The RGB/YCrCb conversion unit 126 converts the R, G, and B signals of each pixel subjected to the demosaic processing to a brightness signal Y and color difference signals Cr and Cb and outputs the brightness signal Y and the color difference signals Cr and Cb of each pixel.

The Y signal restoration processing unit 127 subjects the brightness signal Y output from the RGB/YCrCb conversion unit 126 to restoration processing based on a restoration filter stored in advance. The restoration filter is constituted of, for example, a deconvolution kernel (corresponding to the number of taps of M=7 and N=7) having a kernel size of 7×7, and a calculation coefficient (corresponding to restoration gain data, filter coefficient) corresponding to the deconvolution kernel, and is used for deconvolution processing (reverse convolution calculation processing) of phase modulation of the optical filter 111. For the restoration filter, one corresponding to the optical filter 111 is stored in a memory (not shown) (for example, a memory incidentally attached with the Y signal restoration processing unit 127). The kernel size of the deconvolution kernel is not limited to 7×7. The Y signal restoration processing unit 127 has the function of the sharpening and recovery unit 36 described above.

Figure 36:
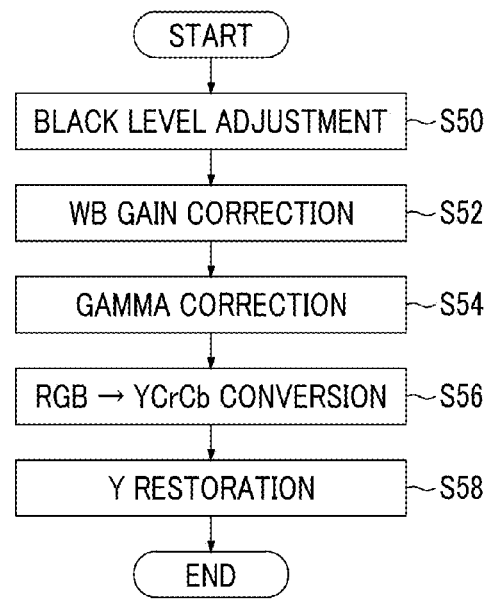
FIG. 36 is a diagram showing an example of a restoration processing flow in a restoration processing block shown in FIG. 34.

Next, the restoration processing by the restoration processing block 120 will be described. FIG. 36 is a diagram showing an example of a restoration processing flow by the restoration processing block 120 shown in FIG. 34.

The digital image signal is applied from the AD conversion unit 114 to one input of the black level adjustment unit 122, black level data is applied to the other input of the black level adjustment unit 122, and the black level adjustment unit 122 subtracts black level data from the digital image signal and outputs the digital image signal black level data subtracted to the white balance gain unit 123 (Step S50). With this, no black level component is included in the digital image signal, and a digital image signal indicating a black level becomes 0.

Image data after the black level adjustment is sequentially subjected to the processing by the white balance gain unit 123 and the gamma processing unit 124 (Step S52 and Step S54).

The R, G, and B signals subjected to gamma correction are subjected to the demosaic processing in the demosaic processing unit 125 and are then converted to the brightness signal Y and the color different signals signals Cr and Cb in the RGB/YCrCb conversion unit 126 (Step S56).

The Y signal restoration processing unit 127 subjects the brightness signal Y to the restoration processing to apply the deconvolution processing of phase modulation of the optical filter 111 of the EDoF optical system 110 (Step S58). That is, the Y signal restoration processing unit 127 performs the deconvolution processing (reverse convolution calculation processing) of a brightness signal (in this case, a brightness signal of 7×7 pixels) corresponding to a pixel group of a predetermined unit centering on an arbitrary pixel to be processed and the restoration filter (the 7×7 deconvolution kernel and the calculation coefficient) stored in the memory or the like in advance. The Y signal restoration processing unit 127 performs the restoration processing for removing image blur of the entire image by repeating the deconvolution processing of each pixel group of the predetermined unit so as to cover the entire area of the imaging surface. The restoration filter is determined according to the position of the center of the pixel group subjected to the deconvolution processing. That is, the common restoration filter is applied to adjacent pixel groups. In addition, in order to simplify the restoration processing, it is preferable to apply the common restoration filter to all pixel groups.

Figure 37:
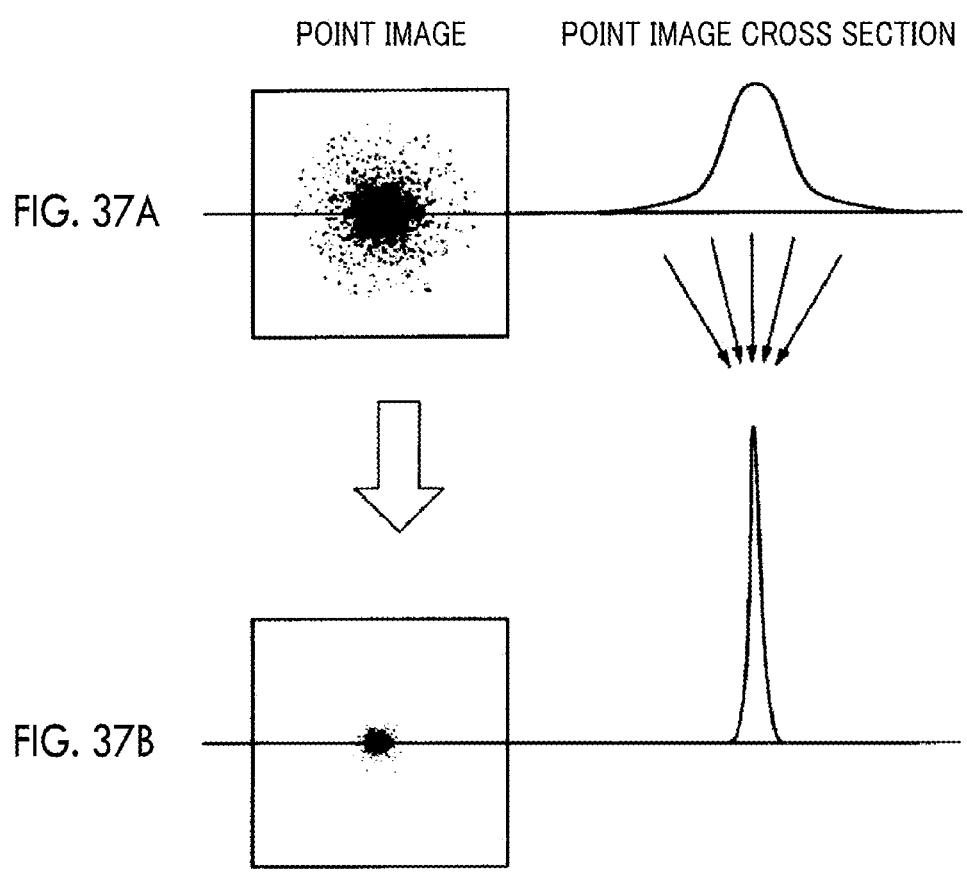
FIGS. 37A and 37B are diagrams showing a restoration example of an image acquired through the EDoF optical system.

As shown in FIG. 37A, a point image (optical image) of the brightness signal after passing through the EDoF optical system 110 is formed on the imaging element 112 as a great point image (blurred image), but is restored to a small point image (image of high resolution) by the deconvolution processing in the Y signal restoration processing unit 127 as shown in FIG. 37B.

As described above, the restoration processing is applied to the brightness signal after the demosaic processing, whereby it is not necessary to separately provide the parameters of the restoration processing for RGB, and it is possible to accelerate the restoration processing. Furthermore, instead of putting together the R, G, and B image signals corresponding to the R, G, and B pixels at discrete positions in one unit and performing the deconvolution processing, the brightness signals of adjacent pixels are put together in a predetermined unit and the common restoration filter is applied to this unit and the deconvolution processing is performed; therefore, the accuracy of the restoration processing is improved. In regards to the color difference signals Cr and Cb, resolution does not need to be increased by the restoration processing in terms of image quality because of the visual characteristic of human eyes. Furthermore, in a case of recording an image in a compression format, such as JPEG, the color difference signals are compressed at a higher compression rate than the brightness signal; therefore, there is less necessity to increase resolution by the restoration processing. Consequently, it is possible to achieve improvement of restoration accuracy and simplification and acceleration of the processing.

The point image restoration processing according to the respective embodiments described above can be applied to the restoration processing of the EDoF system described above.

An aspect to which the invention can be applied is not limited to the digital camera 10, the computer 60C, and the server 80, and the invention can be applied to mobile devices having an imaging function and functions (call handling function, communication function, and other computer functions) other than imaging, in addition to cameras having imaging as a major function. As another aspect to which the invention can be applied, for example, mobile phones having a camera function, smartphones, personal digital assistants (PDAs), and portable game machines are given. Hereinafter, an example of a smartphone to which the invention can be applied will be described.

Application Example to Smartphone

Figure 38:
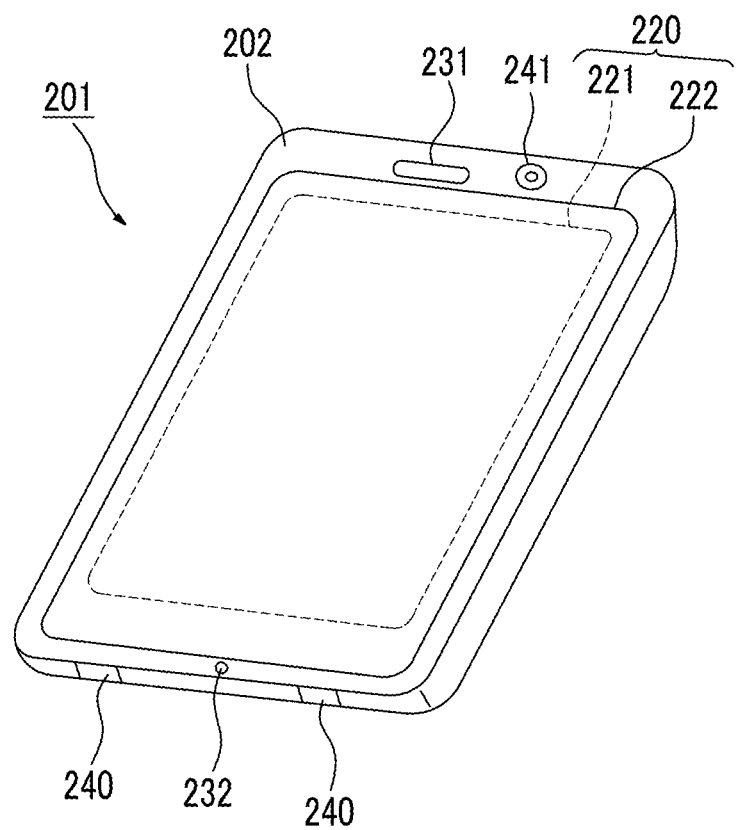
FIG. 38 is an appearance diagram of a smartphone.

FIG. 38 shows the appearance of a smartphone 201 which is an embodiment of an imaging device of the invention. The smartphone 201 shown in FIG. 38 has a flat plate-like housing 202, and includes, on one surface of the housing 202, a display input unit 220 in which a display panel 221 as a display unit and an operation panel 222 as an input unit are integrated. The housing 202 includes a speaker 231, a microphone 232, an operating unit 240, and a camera unit 241. The configuration of the housing 202 is not limited thereto, and for example, a configuration in which a display unit and an input unit are separated can be used, or a configuration in which a folding structure or a slide mechanism is provided.

Figure 39:
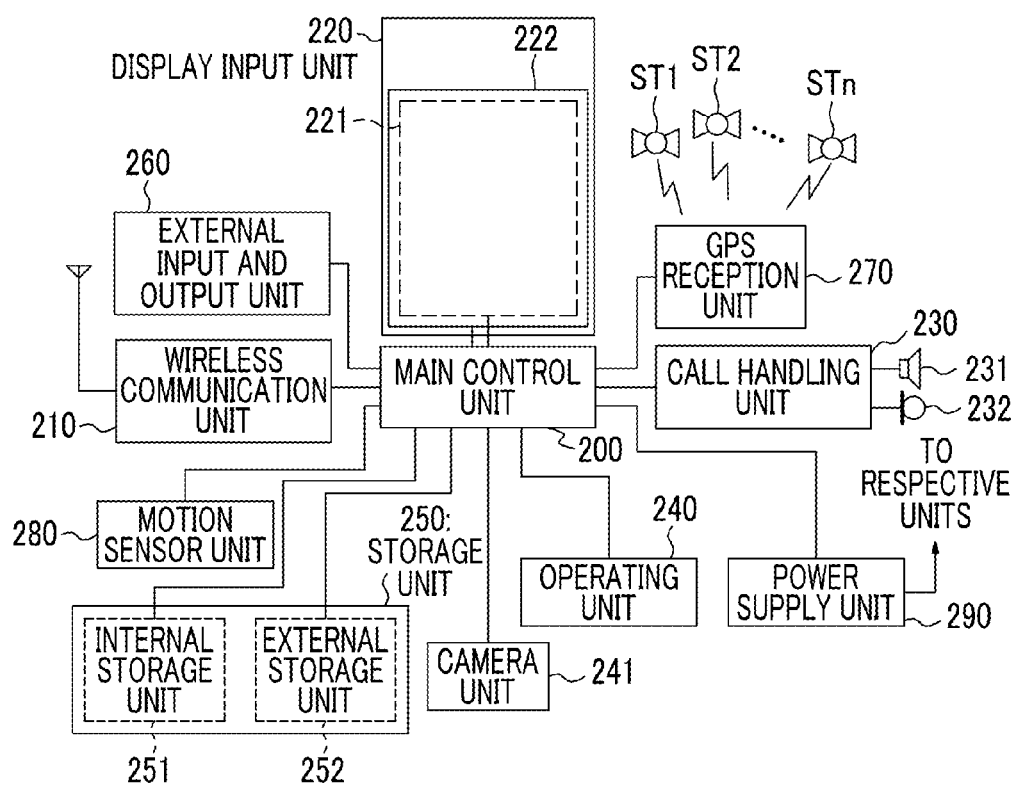
FIG. 39 is a block diagram showing the configuration of the smartphone shown in FIG. 38.

FIG. 39 is a block diagram showing the configuration of the smartphone 201 shown in FIG. 38. As shown in FIG. 39, the smartphone includes, as major components, a wireless communication unit 210, a display input unit 220, a call handling unit 230, an operating unit 240, a camera unit 241, a storage unit 250, an external input/output unit 260, a global positioning system (GPS) reception unit 270, a motion sensor unit 280, a power supply unit 290, and a main control unit 200 (including the camera body controller 28 described above). The smartphone 201 has, as a major function, a wireless communication function of performing mobile wireless communication through a base station device BS and a mobile communication network NW.

The wireless communication unit 210 performs wireless communication with the base station device BS in the mobile communication network NW according to an instruction of the main control unit 200. Transmission/reception of various kinds of file data, such as speech data or image data, electronic mail data, and the like, or reception of Web data, streaming data, or the like is performed using wireless communication.

The display input unit 220 is a so-called touch panel which displays images (still image and motion image), character information, or the like under the control of the main control unit 200 to visually transfer information to the user and detects a user's operation on the displayed information, and includes the display panel 221 and the operation panel 222.

The display panel 221 uses a liquid crystal display (LCD) or an organic electro-luminescence display (OELD) as a display device. The operation panel 222 is a device which is placed such that an image displayed on the display surface of the display panel 221 is visible, and detects one or a plurality of coordinates operated with the finger of the user or a stylus. If the device is operated with the finger of the user or the stylus, a detection signal generated due to the operation is output to the main control unit 200. Next, the main control unit 200 detects the operation position (coordinates) on the display panel 221 based on the received detection signal.

As shown in FIG. 38, the display panel 221 and the operation panel 222 of the smartphone 201 illustrated as an embodiment of an imaging device of the invention are integrated to constitute the display input unit 220, and the operation panel 222 is arranged so as to completely cover the display panel 221. In a case where this arrangement is used, the operation panel 222 may have a function of detecting a user's operation in an area outside the display panel 221. In other words, the operation panel 222 may include a detection area (hereinafter, referred to as a display area) for a superimposed portion overlapping the display panel 221 and a detection area (hereinafter, referred to as a non-display area) for an outer edge portion not overlapping the display panel 221.

Although the size of the display area may completely match the size of the display panel 221, both do not necessarily match each other. The operation panel 222 may include two sensitive areas of an outer edge portion and an inside portion. In addition, the width of the outer edge portion is appropriately designed according to the size of the housing 202 or the like. Furthermore, as a position detection system which is used in the operation panel 222, a matrix switch system, a resistive film system, a surface acoustic wave system, an infrared system, an electromagnetic induction system, an electrostatic capacitance system, or the like is given, and any system can be used.

The call handling unit 230 includes a speaker 231 and a microphone 232, converts speech of the user input through the microphone 232 to speech data processable in the main control unit 200 and outputs speech data to the main control unit 200, or decodes speech data received by the wireless communication unit 210 or the external input/output unit 260 and outputs speech from the speaker 231. As shown in FIG. 38, for example, the speaker 231 can be mounted on the same surface as the surface on which the display input unit 220 is provided, and the microphone 232 may be mounted on the side surface of the housing 202.

The operating unit 240 is a hardware key, such as a key switch, and receives an instruction from the user. For example, as shown in FIG. 38, the operating unit 240 is a push button-type switch which is mounted on the side surface of the housing 202 of the smartphone 201, and is turned on when pressed with a finger or the like and is turned off by a restoration force of the panel or the like if the finger is released.

The storage unit 250 stores a control program or control data of the main control unit 200, application software, address data in association with the name, telephone number, and the like of a communication partner, data of transmitted and received electronic mail, Web data downloaded by Web browsing, downloaded content data, or temporarily stores streaming data or the like. The storage unit 250 is constituted of an internal storage unit 251 embedded in the smartphone and an external storage unit 252 which has a detachable external memory slot. The internal storage unit 251 and the external storage unit 252 constituting the storage unit 250 are implemented using a memory (for example, MicroSD (Registered Trademark) memory or the like) of a flash memory type, a hard disk type, a multimedia card micro type, or a card type, or a storage medium, such as a random access memory (RAM) or a read only memory (ROM).

The external input/output unit 260 plays a role of an interface with all external devices connected to the smartphone 201, and is provided for direct or indirect connection to other external devices by communication or the like (for example, universal serial bus (USB), IEEE1394 or the like), or a network (for example, Internet, wireless LAN, Bluetooth (Registered Trademark), radio frequency identification (RFID), infrared data association (IrDA) (Registered Trademark), ultra wideband (UWB) (Registered Trademark), ZigBee (Registered Trademark), or the like).

The external device connected to the smartphone 201 is, for example, a wired or wireless headset, a wired or wireless external charger, a wired or wireless data port, a memory card connected through a card socket, a subscriber identity module (SIM)/user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone, or the like. The external input/output unit can transfer data transmitted from the external devices to the respective components in the smartphone 201, or can transmit data in the smartphone 201 to the external devices.

The GPS reception unit 270 receives GPS signals transmitted from GPS satellites ST1 to STn according to an instruction of the main control unit 200, executes positioning calculation processing based on a plurality of received GPS signals, and detects the position of the smartphone 201 having latitude, longitude, and altitude. When positional information can be acquired from the wireless communication unit 210 or the external input/output unit 260 (for example, a wireless LAN), the GPS reception unit 270 may detect the position using the positional information.

The motion sensor unit 280 includes, for example, a three-axis acceleration sensor or the like, and detects physical motion of the smartphone 201 according to an instruction of the main control unit 200. The moving direction or acceleration of the smartphone 201 can be detected by detecting physical motion of the smartphone 201. The detection result is output to the main control unit 200.

The power supply unit 290 supplies power stored in a battery (not shown) to the respective units of the smartphone 201 according to an instruction of the main control unit 200.

The main control unit 200 includes a microprocessor, operates according to the control program or control data stored in the storage unit 250, and integrally controls the respective units of the smartphone 201. The main control unit 200 has a mobile communication control function of controlling the respective units of a communication system in order to perform speech communication or data communication through the wireless communication unit 210, and an application processing function.

The application processing function is implemented by the main control unit 200 operating according to application software stored in the storage unit 250. The application processing function is, for example, an infrared communication function of controlling the external input/output unit 260 to perform data communication with a device facing the smartphone 201, an electronic mail function of transmitting and receiving electronic mail, a Web browsing function of browsing Web pages, or the like.

The main control unit 200 has an image processing function of displaying video on the display input unit 220, or the like based on image data (still image or motion image data), such as received data or downloaded streaming data. The image processing function refers to a function of the main control unit 200 decoding image data, subjecting the decoding result to image processing, and displaying an image on the display input unit 220.

The main control unit 200 executes display control on the display panel 221, and operation detection control for detecting a user's operation through the operating unit 240 and the operation panel 222.

With the execution of the display control, the main control unit 200 displays an icon for activating application software or a software key, such as a scroll bar, or displays a window for creating electronic mail. The scroll bar refers to a software key for receiving an instruction to move a display portion of an image which is too large to fit into the display area of the display panel 221.

With the execution of the operation detection control, the main control unit 200 detects a user's operation through the operating unit 240, receives an operation on the icon or an input of a character string in an entry column of the window through the operation panel 222, or receives a scroll request of a display image through the scroll bar.

Furthermore, with the execution of the operation detection control, the main control unit 200 has a touch panel control function of determining whether an operation position on the operation panel 222 is the superimposed portion (display area) overlapping the display panel 221 or the outer edge portion (non-display area) not overlapping the display panel 221, and controlling the sensitive area of the operation panel 222 or the display position of the software key.

The main control unit 200 may detect a gesture operation on the operation panel 222 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the operations.

The camera unit 241 is a digital camera which electronically captures an image using an imaging element, such as a complementary metal oxide semiconductor (CMOS) or a charge-coupled device (CCD). The camera unit 241 can convert image data obtained by imaging to compressed image data, such as joint photographic coding experts group (JPEG), and can record image data in the storage unit 250 under the control of the main control unit 200. Furthermore, the camera unit 241 can output image data through the input/output unit 260 or the wireless communication unit 210. As shown in FIG. 38, in the smartphone 201, the camera unit 241 is mounted on the same surface of the display input unit 220; however, the mounting position of the camera unit 241 is not limited thereto, and the camera unit 241 may be mounted on the rear surface of the display input unit 220, or a plurality of camera units 241 may be mounted. In a case where a plurality of camera units 241 are mounted, the camera unit 241 which is used to capture an image is switched from one to another and captures an image alone, or a plurality of camera units 241 are simultaneously used to capture images.

The camera unit 241 is used for various functions of the smartphone 201. For example, an image acquired by the camera unit 241 can be displayed on the display panel 221, or an image in the camera unit 241 can be used as one operation input on the operation panel 222. When the GPS reception unit 270 detects the position, the position may be detected with reference to an image from the camera unit 241. In addition, the optical axis direction of the camera unit 241 of the smartphone 201 may be determined or the current use environment can be determined with reference to an image from the camera unit 241 without using the three-axis acceleration sensor, or using the three-axis acceleration sensor. Of course, an image from the camera unit 241 may be used in application software.

In addition, image data of a still image or a motion image can be attached with positional information acquired by the GPS reception unit 270, speech information acquired by the microphone 232, speech information (may be text information through speech-text conversion in the main control unit or the like), posture information acquired by the motion sensor unit 280, or the like and can be recorded in the storage unit 250, or may be output through the input/output unit 260 or the wireless communication unit 210.

In the smartphone 201 described above, the respective processing units described above in connection with the point image restoration processing can be appropriately implemented by, for example, the main control unit 200, the storage unit 250, and the like. For example, the image processing unit 35 (FIG. 2) described above is provided in the main control unit.

The invention is not limited to the embodiments described above, and various modifications can be made without departing from the spirit of the invention.

EXPLANATION OF REFERENCES

10: digital camera
12: lens unit
14: camera body
16: lens
17: diaphragm
18: optical system operating unit
20: lens unit controller
21: lens unit storage unit
22: lens unit input/output unit
26: imaging element
28: camera body controller
29: user interface
30: camera body input/output unit
32: input/output interface
33: gamma correction processing unit
34: device control unit
35: image processing unit
36: sharpening and recovery unit
37: sharpening and recovery control unit
38: restoration processing unit
39: contour enhancement processing unit
40: brightness information acquisition unit
42: point image restoration filter processing unit
43: restoration multiplier
44: restoration adder
46: contour enhancement filter processing unit
47: sharpening multiplier
48: sharpening adder
52: automatic intensity adjustment unit
53: restoration filter selection unit
54: contour enhancement intensity selection unit
58: restoration filter storage unit
60: contour enhancement intensity list storage unit
60C: computer
62: computer input/output unit
64: computer controller
65: nonlinear processing unit
66: display
67: point image restoration intensity list storage unit
69: recovery rate selection unit
70: Internet
80: server
82: server input/output unit
84: server controller
91: proper exposure acquisition unit
92: computer
97: server
101: imaging module
110: EDoF optical system
200: main control unit
201: smartphone

What is claimed is:

1. An image processing device which subjects source image data acquired by capturing an object image using an optical system to restoration processing using a restoration filter based on a point spread function of the optical system to acquire recovered image data, the image processing device comprising:
a gradation correction unit which subjects the source image data to gradation correction by logarithmic processing;
a restoration processing unit which performs the restoration processing by applying the restoration filter having a filter coefficient corresponding to source image data before the logarithmic processing to the source image data subjected to the gradation correction;
a sharpening processing unit which subjects the source image data subjected to the gradation correction to sharpening processing using a sharpening filter;
a sharpening and recovery control unit which is able to adjust a restoration rate of the restoration processing and a sharpening rate of the sharpening processing by controlling the restoration processing unit and the sharpening processing unit, acquires a total sharpening and restoration rate based on the restoration rate and the sharpening rate and one rate of the restoration rate and the sharpening rate, and calculates the other rate of the restoration rate and the sharpening rate based on the total sharpening and restoration rate; and
a brightness information acquisition unit which acquires brightness information of a source image based on the source image data,
wherein the sharpening and recovery control unit adjusts the restoration rate and the sharpening rate according to the acquired brightness information.

2. The image processing device according to claim 1, wherein the brightness information acquisition unit acquires brightness values of respective pixels constituting the source image and the distribution of the brightness values as the brightness information.

3. The image processing device according to claim 2, wherein the brightness information acquisition unit acquires information relating to a saturated pixel obtained from the acquired brightness values as the brightness information.

4. The image processing device according to claim 3, wherein the sharpening and recovery control unit adjusts at least one of the restoration rate or the sharpening rate in the saturated pixel and pixels in the periphery of the saturated pixel according to the information relating to the saturated pixel obtained from the acquired brightness values.

5. The image processing device according to claim 3, wherein the brightness information acquisition unit acquires the brightness values of pixels in the periphery of the saturated pixel as the brightness information.

6. The image processing device according to claim 4, wherein the brightness information acquisition unit acquires the brightness values of pixels in the periphery of the saturated pixel as the brightness information.

7. The image processing device according to claim 1, wherein the sharpening and recovery control unit acquires individual difference information of the optical system and adjusts at least one of the restoration rate or the sharpening rate according to the acquired individual difference information and brightness information.

8. The image processing device according to claim 2, wherein the sharpening and recovery control unit acquires individual difference information of the optical system and adjusts at least one of the restoration rate or the sharpening rate according to the acquired individual difference information and brightness information.

9. The image processing device according to claim 3, wherein the sharpening and recovery control unit acquires individual difference information of the optical system and adjusts at least one of the restoration rate or the sharpening rate according to the acquired individual difference information and brightness information.

10. The image processing device according to claim 1, wherein the brightness information acquisition unit acquires imaging exposure information as the brightness information.

11. The image processing device according to claim 2, wherein the brightness information acquisition unit acquires imaging exposure information as the brightness information.

12. The image processing device according to claim 3, wherein the brightness information acquisition unit acquires imaging exposure information as the brightness information.

13. The image processing device according to claim 1, wherein the brightness information acquisition unit acquires a histogram of the brightness values of the respective pixels of the source image as the brightness information.

14. The image processing device according to claim 2, wherein the brightness information acquisition unit acquires a histogram of the brightness values of the respective pixels of the source image as the brightness information.

15. The image processing device according to claim 3, wherein the brightness information acquisition unit acquires a histogram of the brightness values of the respective pixels of the source image as the brightness information.

16. The image processing device according to claim 13, wherein the brightness information acquisition unit acquires a median value of the histogram as the brightness information.

17. The image processing device according to claim 1, wherein, in a case where the source image data is data of one frame among a plurality of frames constituting a motion image,
the image processing device further comprises an imaging condition acquisition unit which acquires imaging conditions of a frame corresponding to the source image data and a previous frame or a subsequent frame of the frame corresponding to the source image data in a time series, and
the sharpening and recovery control unit adjusts at least one of the restoration rate or the sharpening rate according to the imaging conditions acquired by the imaging condition acquisition unit and the brightness information.

18. An imaging device comprising:
the image processing device according to claim 1.

19. An image processing method using the image processing device according to claim 1 which subjects source image data acquired by capturing an object image using an optical system to restoration processing using a restoration filter based on a point spread function of the optical system to acquire recovered image data, the image processing method comprising:
a gradation correction step of subjecting the source image data to gradation correction by logarithmic processing;
a restoration processing step of performing the restoration processing by applying the restoration filter having a filter coefficient corresponding to the source image data before the logarithmic processing to the source image data subjected to the gradation correction;
a sharpening processing step of subjecting the source image data subjected to the gradation correction to sharpening processing using a sharpening filter;
a sharpening and recovery control step of being able to adjust a restoration rate of the restoration processing and a sharpening rate of the sharpening processing by controlling the restoration processing step and the sharpening processing step, acquiring a total sharpening and restoration rate based on the restoration rate and the sharpening rate and one rate of the restoration rate and the sharpening rate, and calculating the other rate of the restoration rate and the sharpening rate based on the total sharpening and restoration rate; and
a brightness information acquisition step of acquiring brightness information of a source image based on the source image data,
wherein, in the sharpening and recovery control step, the restoration rate and the sharpening rate are adjusted according to the acquired brightness information.

20. Non-transitory computer readable recording medium storing a program which causes a computer to subject source image data acquired by capturing an object image using an optical system to restoration processing using a restoration filter based on a point spread function of the optical system to acquire recovered image data, the program causing the computer to execute the image processing method according to claim 19, comprising:
a gradation correction step of subjecting the source image data to gradation correction by logarithmic processing;
a restoration processing step of performing the restoration processing by applying the restoration filter having a filter coefficient corresponding to the source image data before the logarithmic processing to the source image data subjected to the gradation correction;

a sharpening processing step of subjecting the source image data subjected to the gradation correction to sharpening processing using a sharpening filter;

a sharpening and recovery control step of being able to adjust a restoration rate of the restoration processing and a sharpening rate of the sharpening processing by controlling the restoration processing step and the sharpening processing step, acquiring a total sharpening and restoration rate based on the restoration rate and the sharpening rate and one rate of the restoration rate and the sharpening rate, and calculating the other rate of the restoration rate and the sharpening rate based on the total sharpening and restoration rate; and a brightness information acquisition step of acquiring brightness information of a source image based on the source image data, wherein, in the sharpening and recovery control step, the restoration rate and the sharpening rate are adjusted according to the acquired brightness information.

* * * * *